US012271982B2

(12) United States Patent
Boyd et al.

(10) Patent No.: US 12,271,982 B2
(45) Date of Patent: Apr. 8, 2025

(54) GENERATING MODIFIED USER CONTENT THAT INCLUDES ADDITIONAL TEXT CONTENT

(71) Applicant: Snap Inc., Santa Monica, CA (US)

(72) Inventors: Nathan Kenneth Boyd, Los Angeles, CA (US); Andrew Grosvenor Cooper, Los Angeles, CA (US); Suraj Vindana Samaranayake, New York, NY (US); Vu Tran, Bellevue, WA (US); Yamill Vallecillo, Los Angeles, CA (US); Yiwen Zhan, Venice, CA (US)

(73) Assignee: SNAP INC., Santa Monica, CA (US)

(*) Notice: Subject to any disclaimer, the term of this patent is extended or adjusted under 35 U.S.C. 154(b) by 23 days.

(21) Appl. No.: 17/709,257

(22) Filed: Mar. 30, 2022

(65) Prior Publication Data

US 2022/0319082 A1   Oct. 6, 2022

Related U.S. Application Data

(60) Provisional application No. 63/169,090, filed on Mar. 31, 2021.

(51) Int. Cl.
*G06T 11/60* (2006.01)
*G06F 3/0482* (2013.01)
*G06Q 50/00* (2012.01)

(52) U.S. Cl.
CPC ............ *G06T 11/60* (2013.01); *G06F 3/0482* (2013.01); *G06Q 50/01* (2013.01); *G06T 2200/24* (2013.01)

(58) Field of Classification Search
CPC ..... G06T 11/60; G06T 2200/24; G06T 11/00; G06F 3/0482; G06Q 50/01
See application file for complete search history.

(56) References Cited

U.S. PATENT DOCUMENTS

| 5,986,657 A * | 11/1999 | Berteig ................. G06F 3/0481 715/802 |
| 9,116,596 B2 * | 8/2015 | Roman ................. G06F 3/0481 |

(Continued)

FOREIGN PATENT DOCUMENTS

| CN | 117280337 A | 12/2023 |
| IE | 20130122 A1 | 10/2014 |

(Continued)

OTHER PUBLICATIONS

Vartiainen, Elina, and Kaisa Vaananen-Vainio-Mattila. "User experience of mobile photo sharing in the cloud." Proceedings of the 9th International Conference on Mobile and Ubiquitous Multimedia. 2010. (Year: 2010).*

(Continued)

*Primary Examiner* — Kieu D Vu
*Assistant Examiner* — Blaine T Basom
(74) *Attorney, Agent, or Firm* — SCHWEGMAN LUNDBERG & WOESSNER, P.A.

(57) ABSTRACT

In one or more implementations, user content items generated using a client application may be shared with users that are not contacts of the user within the client application. A user interface that indicates a number of recipients of the user content item may be generated that also includes a first section that displays the user content item and a second section to add text content to the user content item. In various examples, one or more classifications may be associated with the user content item.

20 Claims, 24 Drawing Sheets

(56) References Cited

U.S. PATENT DOCUMENTS

| | | | |
|---|---|---|---|
| 9,720,894 B1* | 8/2017 | Pasko | G06F 40/169 |
| 9,836,464 B2* | 12/2017 | Larsen | G06F 16/487 |
| 10,942,978 B1* | 3/2021 | Paul | G06Q 50/01 |
| 11,100,182 B1* | 8/2021 | Paul | G06Q 50/01 |
| 2006/0167872 A1* | 7/2006 | Parikh | G06F 3/0237 |
| 2007/0028171 A1 | 2/2007 | MacLaurin | |
| 2012/0278387 A1* | 11/2012 | Garcia | G06F 3/0481 |
| | | | 709/204 |
| 2012/0324002 A1* | 12/2012 | Chen | G06F 16/51 |
| | | | 709/204 |
| 2014/0047386 A1* | 2/2014 | Lynch | G06F 16/48 |
| | | | 715/810 |
| 2014/0075335 A1* | 3/2014 | Hicks | G06Q 10/10 |
| | | | 715/753 |
| 2014/0129627 A1* | 5/2014 | Baldwin | H04L 67/306 |
| | | | 709/204 |
| 2014/0298256 A1* | 10/2014 | Schulz | G06Q 40/02 |
| | | | 715/808 |
| 2017/0359318 A1* | 12/2017 | Wei | H04L 63/062 |
| 2019/0318521 A1* | 10/2019 | Kurosawa | G06F 40/166 |
| 2020/0066046 A1* | 2/2020 | Stahl | G06T 19/006 |
| 2020/0311165 A1* | 10/2020 | Shukl | G06F 16/9537 |
| 2021/0295271 A1* | 9/2021 | Benz | G06F 3/04895 |

FOREIGN PATENT DOCUMENTS

| | | |
|---|---|---|
| WO | WO-2010028169 A2 | 3/2010 |
| WO | WO-2022212672 A1 | 10/2022 |

OTHER PUBLICATIONS

"International Application Serial No. PCT/US2022/022779, International Search Report mailed Jul. 27, 2022", 5 pgs.

"International Application Serial No. PCT/US2022/022779, Written Opinion mailed Jul. 27, 2022", 6 pgs.

Morgan, Ames, et al., "Why we tag", Proceedings of the SIGCHI Conference on Human Factors in Computing Systems, CHI 2007 Association for Computing Machinery US, (Apr. 29, 2007), 25 pgs.

"International Application Serial No. PCT/US2022/022779, International Preliminary Report on Patentability mailed Oct. 12, 2023", 8 pgs.

* cited by examiner

GENERATING MODIFIED USER CONTENT THAT INCLUDES ADDITIONAL TEXT CONTENT

CROSS-REFERENCE TO RELATED APPLICATION

This patent application claims the benefit of U.S. Provisional Patent Application No. 63/169,090, filed Mar. 31, 2021, entitled "GENERATING MODIFIED USER CONTENT THAT INCLUDES ADDITIONAL TEXT CONTENT", which is incorporated by reference herein in its entirety.

BACKGROUND

Applications executed on client devices may be used to generate content. For example, client applications may be used to generate messaging content, image content, video content, audio content, media overlays, documents, creative artwork, combinations thereof, and the like. In various situations, this content may be exchanged between client devices via a computational system that enables the communication of content between client devices.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some implementations are illustrated by way of example, and not limitation.

DETAILED DESCRIPTION

Figure 1:
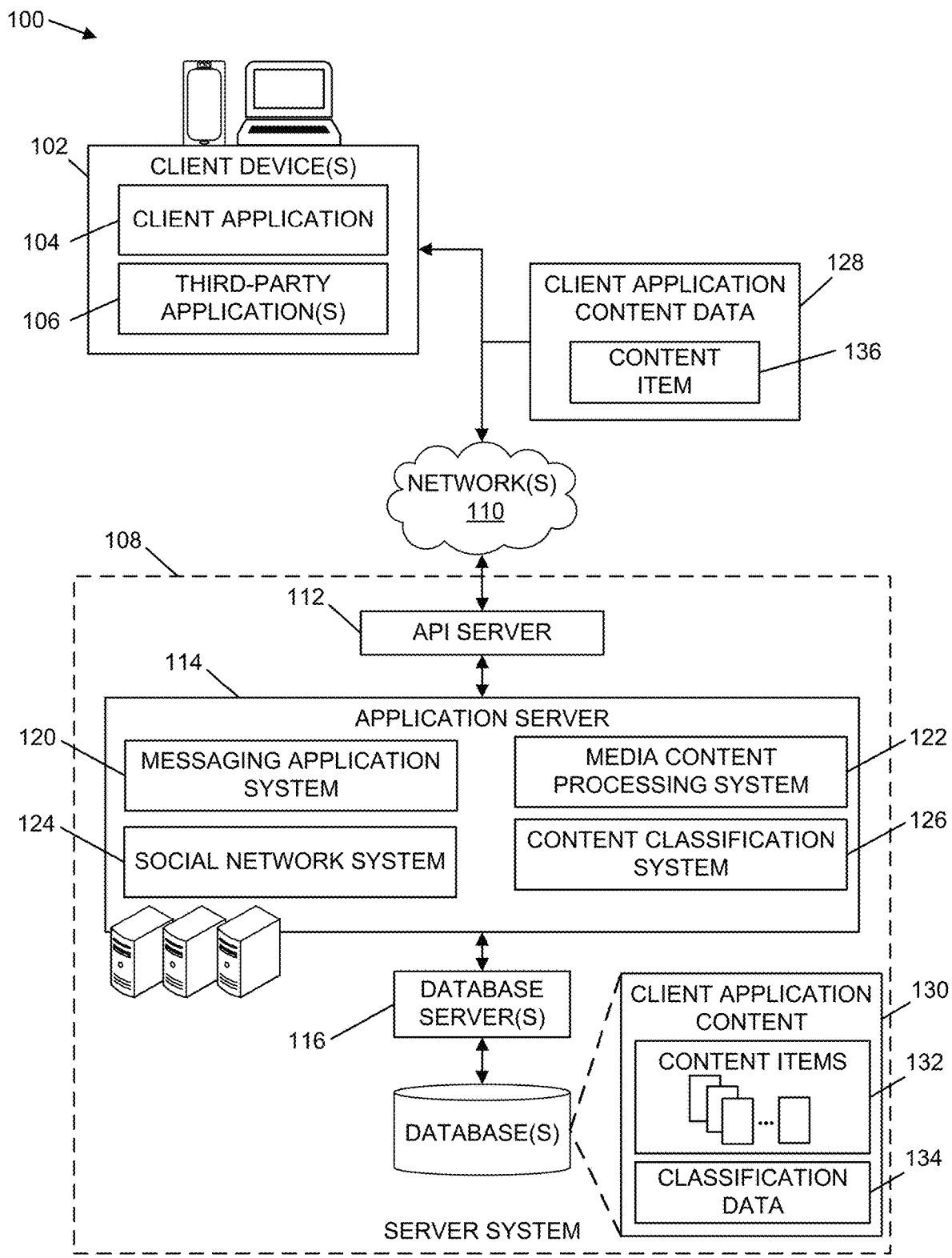
FIG. 1 is a diagrammatic representation of an architecture for exchanging data (e.g., messages and associated content) over a network, according to one or more example implementations.

Content may be created using applications that are executed by client devices. For example, a client application may be used to create messages that can be exchanged between client devices of users. In these situations, the client application can include at least one of a messaging application or a social networking application. The messages may include content, such as text content, video content, audio content, image content, or one or more combinations thereof. Client applications may also be used outside of a messaging context to generate at least one of text content, image content, video content, or audio content that can be shared between client devices.

Client applications may be implemented by a large number of users, such as thousands of users, up to millions of users, to generate content. Thus, the volume of content generated using a client application can be large. The content generated using the client applications may be varied and be associated with a number of different topics, such as locations, events, various objects, individuals, or animals. In many situations, the content created using client applications is shared with a number of other users. In conventional systems, though, the large amounts of content are not curated in a manner that enables individuals to easily discover content that they might be interested in. Additionally, it can be challenging for users to publish their content in a way that is discoverable by additional users. Typically, conventional systems are limited in the ways that content is classified and in the channels that may be used to discover content that is of interest to users. For example, typical social networking platforms enable users to post content to a personal page or account that may include content that is accessible publicly. However, the content that is publicly posted by users is often discovered based on the identity of the user and not based on a topic that is related to the content. Additionally, the number of ways that content may be categorized by conventional systems is also limited and may be dependent on user input.

The systems, methods, techniques, instruction sequences, and computing machine program products described herein are directed to the classification of content generated using client applications and to accessing content based on one or more classifications associated with the content. Content may be generated by a client application executed by a client device of a content creator and sent to a server system that may distribute the content to one or more additional client devices of recipients of the content. The server system may also determine one or more classifications for content and aggregate content having a same classification. Content associated with a classification may be accessible to other users based on the classification. In various examples, content may be accessible without providing an identifier of the user that created the content.

In various implementations, content may be created by users of a client application. The client application may include social networking functionality. Additionally, the client application may provide messaging functionality. In one or more implementations, a client device may capture content, such as image content or video content, in conjunction with a client application. The client application may utilize one or more input devices, such as at least one of one or more cameras or one or more microphones of the client device, and control operation of the one or more input devices within the client application. Data corresponding to the content may be used to determine one or more classifications for the content. In one or more illustrative examples, a user of the client application may provide data that is used to determine one or more classifications of the content. For example, a user of the client application may provide text for a caption, comment, annotation, or message corresponding to an image or video that may be used to determine one or more classifications for the content. In at least some examples, the text may include an explicit classification for the content that may be marked by one or more symbols, such as a "#" symbol. Further, a user of the client application may implement a creative tool with respect to the content and one or more classifications for the content may be determined based on the creative tool. The creative tool may alter the appearance of image content or video content, add an overlay to at least one of image or video content, add an animation to image content or video content, or one or more combinations thereof. One or more classifications for content may also be determined according to the selection of at least one classification identifier for the content from a list of classification identifiers corresponding to a number of classifications.

In additional examples, data related to the content may be analyzed to implicitly determine one or more classifications of the content. To illustrate, image recognition techniques may be used to determine one or more objects included in image content or video content. A classification for the content may then be based on at least one of the objects included in the image content or video content. In addition, location data corresponding to a client device may be used to determine one or more classifications of content. In one or more examples, location data may be used to identify one or more events that may be taking place at or near the location and one or more classifications may be determined based on one or more events that are related to the content.

In one or more implementations, a server system may obtain content from a number of client devices of users of a client application and aggregate content having one or more classifications. In this way, the system may produce repositories of content having a same or similar classification. Users of the client application may access content associated with a classification of content by providing an identifier corresponding to the classification. In various examples, an order that the content is presented to a respective user may be based on a ranking of content that is determined based on one or more characteristics of the user. For example, the server system may analyze information of a user of the client application in relation to one or more characteristics of content associated with a classification to determine a level of interest of at least a portion of the content items having the classification. Based on the individual levels of interest, the server system may determine a ranking of a number of content items having the classification and cause the content items to be accessible to the user according to the ranking, such that content items having a relatively high level of interest for the user are presented to the user in one or more user interfaces of the client application before content items having a lower level of interest.

Accordingly, the systems, methods, techniques, instruction sequences, and computing machine program products described herein provide various implementations to classify content in a manner that makes content accessible to a greater number of users, if desired by the creator of the content, by providing discovery mechanisms for content that are lacking in conventional systems. Additionally, a number of different types of data and input may be used to determine classifications for content, which provides flexibility for content classification that is not found in conventional techniques and systems. For example, rather than relying on user input to determine classifications for content items, classifications of content items may be determined according to characteristics of content that are determined through an analysis of data associated with the content. In additional examples, classifications of content may be identified based on one or more characteristics of overlays included in content items.

FIG. 1 is a diagrammatic representation of an architecture 100 for exchanging data (e.g., messages and associated content) over a network. The architecture 100 may include multiple client devices 102. The client devices 102 may individually comprise, but are not limited to, a mobile phone, a desktop computer, a laptop computing device, a portable digital assistant (PDA), smart phone, tablet computing device, ultrabook, netbook, multi-processor system, microprocessor-based or programmable consumer electronic system, game console, set-top box, computer in a vehicle, a wearable device, one or more combinations thereof, or any other communication device that a user may utilize to access one or more components included in the architecture 100.

Each client device 102 may host a number of applications, including a client application 104 and one or more third-party applications 106. A user may use the client application 104 to create content, such as video, images (e.g., photographs), audio, and media overlays. In one or more illustrative examples, the client application 104 may include a social networking functionality that enables users to create and exchange content. In various examples, the client application 104 may include messaging functionality that may be used to send messages between instances of the client application 104 executed by various client devices 102. The messages created using the client application 104 may include video, one or more images, audio, media overlays, text, content produced using one or more creative tools, annotations, and the like. In one or more implementations, the client application 104 may be used to view and generate interactive messages, view locations of other users of the client application 104 on a map, chat with other users of the client application 104, and so forth.

One or more users may be a person, a machine, or other means of interacting with a client device, such as the first client device 102. In example implementations, the user may not be part of the architecture 100 but may interact with one or more components of the architecture 100 via a client device 102 or other means. In various examples, users may provide input (e.g., touch screen input or alphanumeric input) to a client device 102 and the input may be communicated to other entities in the architecture 100. In this instance, the other entities in the architecture 100, responsive to the user input, may communicate information to a client device 102 to be presented to the users. In this way, users may interact with the various entities in the architecture 100 using the client device 102.

Each instance of the client application 104 is able to communicate and exchange data with at least one of another instance of the client application 104, one or more third-party applications 106, or a server system 108. The data exchanged between instances of the client applications 104, between the third-party applications 106, and between instances of the client application 104 and the server system 108 includes functions (e.g., commands to invoke functions) and payload data (e.g., text, audio, image, video, or other multimedia data). Data exchanged between instances of the client applications 104, between the third-party applications 106, and between at least one instance of the client application 104 and at least one third-party application 106 may be exchanged directly from an instance of an application executed by a client device 102 and an instance of an application executed by an additional client device 102. Further, data exchanged between the client applications 104, between the third-party applications 106, and between at least one client application 104 and at least one third-party application 106 may be communicated indirectly (e.g., via one or more intermediate servers) from an instance of an application executed by a client device 102 to another instance of an application executed by an additional client device 102. In one or more illustrative examples, the one or more intermediate servers used in indirect communications between applications may be included in the server system 108.

The third-party application(s) 106 may be separate and distinct from the client application 104. The third-party application(s) 106 may be downloaded and installed by the client device 102 separately from the client application 104. In various implementations, the third-party application(s) 106 may be downloaded and installed by the client device 102 before or after the client application 104 is downloaded and installed. The third-party application(s) 106 may be an application that is provided by an entity or organization that is different from the entity or organization that provides the client application 104. The third-party application(s) 106 may be accessed by the client device 102 using separate login credentials than the client application 104. Namely, the third-party application(s) 106 may maintain a first user account and the client application 104 may maintain a second user account. In an implementation, the third-party application(s) 106 may be accessed by the client device 102 to perform various activities and interactions, such as listening to music, videos, track exercises, view graphical elements (e.g., stickers), communicate with other users, and so forth. As an example, the third-party application(s) 106 may include a social networking application, a dating application, a ride or car sharing application, a shopping application, a trading application, a gaming application, an imaging application, a music application, a video browsing application, an exercise tracking application, a health monitoring application, a graphical element or sticker browsing application, or any other suitable application.

The server system 108 provides server-side functionality via one or more networks 110 to the client application 104. The server system 108 may be a cloud computing environment, according to some example implementations. For example, the server system 108, and one or more servers associated with the server system 108, may be associated with a cloud-based application, in one illustrative example. In one or more implementations, the one or more client devices 102 and the server system 108 may be coupled via the one or more networks 110. One or more portions of the one or more networks 110 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of a public switched telephone network (PSTN), a cellular telephone network, a wireless network, a WI-FI network, a WiMax network, another type of network, or a combination of two or more such networks.

The server system 108 supports various services and operations that are provided to the client application 104. Such operations include transmitting data to, receiving data from, and processing data generated by the client application 104. This data may include message content, media content, client device information, geolocation information, media annotation and overlays, message content persistence conditions, social network information, and live event information, as examples. Data exchanges within the architecture 100 are invoked and controlled through functions available via user interfaces (UIs) of the client application 104.

While certain functions of the architecture 100 are described herein as being performed by either a client application 104 or by the server system 108, the location of functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 includes an Application Programming Interface (API) server 112 that is coupled to, and provides a programmatic interface to, an application server 114. The application server 114 is communicatively coupled to a database server 116 that facilitates access to one or more databases 118. The one or more databases 118 may store data associated with information processed by the application server 114. The one or more databases 118 may be storage devices that store information such as untreated media content, original media content from users (e.g., high-quality media content), processed media content (e.g., media content that is formatted for sharing with client devices 102 and viewing on client devices 102), context data related to a media content item, context data related to a user device (e.g., a computing or client device 102), media overlays, media overlay smart widgets or smart elements, user data, user device information, media content (e.g., video and images), media content data (e.g., data associated with video and images), computing device context data, serialized data, session data items, user device location data, mapping information, interactive message usage data, interactive message metrics data, and so forth. The one or more databases 118 may further store information related to third-party servers, client devices 102, client applications 104, users, third-party applications 106, and so forth.

The API server 112 receives and transmits data (e.g., commands and message payloads) between client devices 102 and the application server 114. Specifically, the Application Program Interface (API) server 112 provides a set of interfaces (e.g., routines and protocols) that can be called or queried by the client application 104 in order to invoke functionality of the application server 114. The Application Program Interface (API) server 112 exposes various functions supported by the application server 114, including account registration, login functionality, the sending of messages, via the application server 114, from one instance of the client application 104 to another instance of the client application 104, the sending of media files (e.g., images, audio, video) from a client application 104 to the application server 114, and for possible access by another client application 104, the setting of a collection of media content (e.g., a gallery, story, message collection, or media collection), the retrieval of a list of friends of a user of a client device 102, the retrieval of such collections, the retrieval of messages and content, the adding and deletion of friends to a social graph, the location of friends within a social graph, and opening an application event (e.g., relating to the client application 104).

The application server 114 hosts a number of applications and subsystems, including a messaging application system 120, a media content processing system 122, a social network system 124, and a content classification system 126. The messaging application system 120 implements a number of message processing technologies and functions, particularly related to the aggregation and other processing of content (e.g., textual and multimedia content) included in messages received from multiple instances of the client application 104. For example, the messaging application system 120 may deliver messages using electronic mail (email), instant messaging (IM), Short Message Service (SMS), text, facsimile, or voice (e.g., Voice over IP (VoIP)) messages via wired networks (e.g., the Internet), plain old telephone service (POTS), or wireless networks (e.g., mobile, cellular, WIFI, Long Term Evolution (LTE), or Bluetooth). The messaging application system 120 may aggregate text and media content from multiple sources into collections of content. These collections are then made available, by the messaging application system 120, to the client application 104. Other processor- and memory-intensive processing of data may also be performed server-side by the messaging application system 120, in view of the hardware requirements for such processing.

The media content processing system 122 is dedicated to performing various media content processing operations, typically with respect to images, audio, or video received within the payload of a message or other content item at the messaging application system 120. The media content processing system 122 may access one or more data storages (e.g., the database(s) 118) to retrieve stored data to use in processing media content and to store results of processed media content.

The social network system 124 supports various social networking functions and services, and makes these functions and services available to the messaging application system 120. To this end, the social network system 124 maintains and accesses an entity graph within the database(s) 118. Examples of functions and services supported by the social network system 124 include the identification of other users of the client application 104 with which a particular user has relationships or is "following", and also the identification of other entities and interests of a particular user. The social network system 124 may access location information associated with each of the user's friends to determine where they live or are currently located geographically. In addition, the social network system 124 may maintain a location profile for each of the user's friends indicating the geographical location where the user's friends live.

The content classification system 126 may determine one or more classifications for content that is generated using the client application 104. The content may include text content, image content, video content, audio content, content annotations, or combinations thereof, that are produced using the client application 104. In one or more illustrative examples, the content may include image content having one or more annotations. The one or more annotations may include overlays that include at least one of text content, content produced using one or more creative tools of the client application 104, one or more additional images, or one or more animations. After a user of the client device 102 has generated the content by providing input via the client application 104, the client device 102 may send data corresponding to the content to the server system 108. In various examples, client application content data 128 may be communicated between the client device 102 and the server system 108. The client application content data 128 may include data that corresponds to content generated using the client application 104 and sent to the server system 108 from the client device 102. In addition, the client application content data 128 may include data sent from the server system 108 to the client device 102 in relation to the client application 104. For example, the client application content data 128 may include data corresponding to content identified by the server system 108 based on one or more requests obtained from the client device 102. In addition, the client application content data 128 may include data corresponding to content for which a user of the client device 102 is a recipient.

The server system 108 may store at least a portion of the client application content data 128 in the database(s) 118 as client application content 130. The client application content 130 may include a number of content items 132. Each content item 132 may include one or more images, one or more videos, text, audio, one or more content annotations, or one or more combinations thereof. In various examples, an individual content item 132 may include a collection of images, videos, text, audio, content annotations, or combinations thereof. Additionally, the client application content 130 may include classification data 134. The classification data 134 may correspond to one or more classifications associated with respective content items 132. In one or more illustrative examples, the classification data 134 may include identifiers that correspond to respective classifications. At least a portion of the one or more classifications for a respective content item 132 may be determined by the content classification system 126. In further examples, at least one classification for a respective content item 132 may be determined by the client application 104.

In one or more implementations, the content classification system 126 may analyze portions of the client application content data 128 obtained from the client device 102 to determine one or more classifications of content generated by the client application 104. In various examples, the client application content data 128 may include a content item 136 that corresponds to a content item generated by the client application 104 and sent to the server system 108. The content classification system 126 may analyze data related to the content item 136 to determine one or more classifications corresponding to the content item. In one or more examples, data of the content item 136 may include image data and the content classification system 126 may analyze the image data to determine one or more objects that are included in the image. In these scenarios, the content classification system 126 may determine one or more classifications for the content item based on at least one object included in the image. In one or more additional examples, the content classification system 126 may determine one or more recommendations for classifications of the content item based on one or more objects included in the image.

Additionally, the content classification system 126 may analyze data corresponding to overlays of images. For example, users of the client application 104 may produce text content using the client application 104 that may overlay an image that is at least one of captured by the client device or stored by the client device 102. In further examples, users of the client application 104 may overlay additional image content or additional video content atop an image or video. In various examples, an overlay may be generated by one or more creative tools of the client application 104. In one or more examples, an overlay associated with an image may include an identifier of a classification. To illustrate, an overlay may include text that corresponds to an identifier of a classification. In one or more illustrative examples, the identifier of the classification may be identifiable by the use of a symbol, such as a "#" symbol. In these situations, the content classification system 126 may determine a classification for the content item 136 based on the identifier of the classification included in the overlay. The content classification system 126 may also determine a classification of the content item 136 based on a creative tool used to generate at least one of an overlay or an identifier of the overlay. In one or more implementations, an overlay may be associated with an identifier based on input from a creator of the overlay or a service provider that makes the overlay available to users of the client application 104. In one or more illustrative examples, an identifier of an overlay may include "Current Time" or "Current Temperature". In these situations, a classification of the content item 136 may correspond to the identifier associated with the overlay.

In one or more implementations, the content classification system 126 may determine a classification of the content item 136 based on selection of one or more classification identifiers by a user of the client device 102 with respect to the content item 136. For example, the client application 104 may generate a user interface that includes one or more identifiers of classifications for the content item 136. The one or more identifiers may include one or more recommendations of classifications for the content item 136. In various examples, the classification identifiers included in a user interface that may be selectable by a user of the client application 104 may be determined by at least one of the client application 104 or the content classification system 126 based on at least one of overlays related to the content item 136, image content data of the content item 136, such as objects included in an image of the content item 136, text data of the content item 136, additional annotation data for the content item 136, video data of the content item 136, or audio data of the content item 136. In one or more illustrative examples, identifiers of classifications may be included in a user interface generated by the client application 104 when a user of the client application 104 is selecting one or more recipients for the content item 136. In these scenarios, a user interface element corresponding to a classification identifier may be selectable to classify the content item 136 according to the classification related to the classification identifier.

After determining one or more classifications for the content item 136, the content classification system 126 may store the content item in the database(s) 118 as part of the content items 132. The content classification system 126 may also store one or more classification identifiers related to the content item 136 as part of the classification data 134. In one or more examples, the content classification system 126 may store the content item 136 in association with one or more classifications such that the content item 136 may be retrievable based on identifiers of the one or more classifications associated with the content item 136. To illustrate, the content item 136 may be retrieved in response to a request for content items corresponding to a classification identifier related to at least one classification of the content item 136. In this way, the content item 136 may be provided to users of the client application 104 as part of a collection of content items associated with at least one classification of the content item 136.

In one or more illustrative examples, the content item 136 may be associated with a classification of "classic cars". In these scenarios, the content item 136 may be stored in the database(s) 118 with respect to an identifier corresponding to "classic cars". In response to a request for content items associated with "classic cars", the content classification system 126 may identify the content item 136 and provide the content item 136 such that the content item 136 may be displayed in a user interface in conjunction with one or more additional content items related the classification "classic cars". In one or more implementations, the content classification system 126 may determine rankings for content items associated with one or more classifications before providing one or more of the content items in response to a request for content having the one or more classifications. The rankings for the content items may be based on information related to a user that is requesting content associated with the one or more classifications. For example, profile information of a user of the client application 104 that requests content related to "classic cars" may be analyzed by the content classification system 126 in relation to information of a number of content items associated with the classification "classic cars" to determine an order in which at least a portion of the content items associated with the classification "classic cars" is to be provided to the user via the client application 104.

Figure 2:
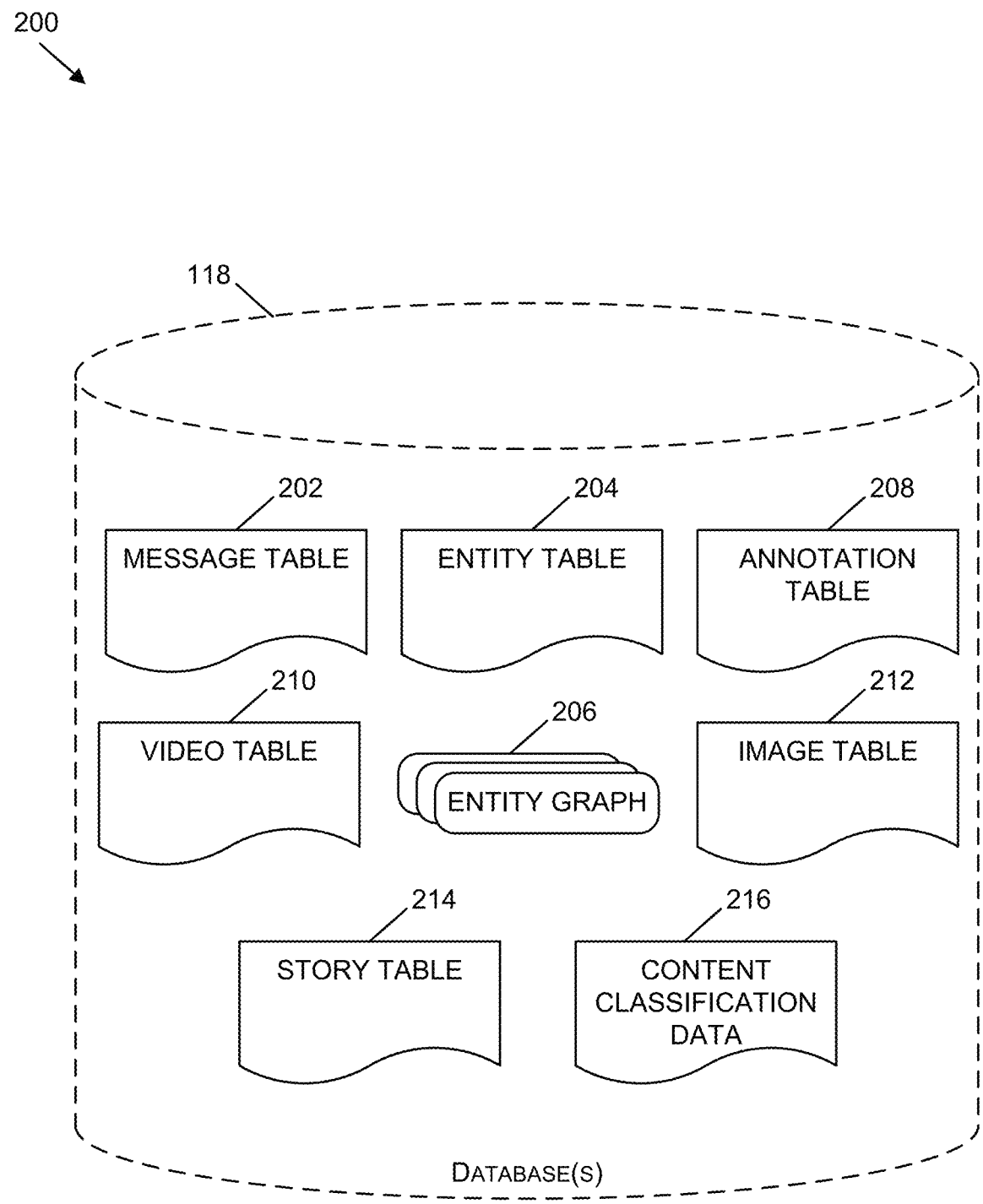
FIG. 2 is a schematic diagram illustrating data that may be stored in a database of a server system, according to one or more example implementations.

FIG. 2 is a schematic diagram illustrating data structures 200 which may be stored in the database(s) 118 of the server system 108, according to one or more example implementations. While the content of the database(s) 118 is shown to comprise a number of tables, it will be appreciated that the data could be stored in other types of data structures (e.g., as an object-oriented database).

The database(s) 118 may include message data stored within a message table 202. In various examples, the message data may correspond to one or more ephemeral messages that are stored for a limited duration. The entity table 204 may store entity data, including an entity graph 206. Entities for which records are maintained within the entity table 204 may include individuals, corporate entities, organizations, objects, places, events, etc. Regardless of type, any entity regarding which the server system 108 stores data may be a recognized entity. Each entity is provided with a unique identifier, as well as an entity type identifier (not shown).

The entity graph 206 furthermore stores information regarding relationships and associations between entities. Such relationships may be social, professional (e.g., work at a common corporation or organization) interest-based, or activity-based, merely for example.

The database(s) 118 may also store annotation data, in the example form of filters, in an annotation table 208. Filters for which data is stored within the annotation table 208 are associated with and applied to videos (for which data is stored in a video table 210) or images (for which data is stored in an image table 212). Filters, in one example, are overlays that are displayed as overlaid on an image or video during presentation to a recipient user. Filters may be of various types, including user-selected filters from a gallery of filters presented to a sending user by the client application 104 when the sending user is composing a message. Other types of filters include geolocation filters (also known as geo-filters) which may be presented to a sending user based on geographic location. For example, geolocation filters specific to a neighborhood or special location may be presented within a user interface by the client application 104, based on geolocation information determined by a GPS unit of a client device 102. Another type of filter is a data filter, which may be selectively presented to a sending user by the client application 104, based on other inputs or information gathered by a client device 102 during the message creation process. Examples of data filters include current temperature at a specific location, a current speed at which a sending user is traveling, battery life for a client device 102, or the current time.

Other annotation data that may be stored within the image table 212 are augmented reality content items (e.g., corresponding to applying Lenses or augmented reality experiences). An augmented reality content item may be a real-time special effect and sound that may be added to an image or a video.

As described above, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various implementations, different methods for achieving such transformations may be used. For example, some implementations may involve generating a three-dimensional mesh model of the object or objects, and using transformations and animated textures of the model within the video to achieve the transformation. In other implementations, tracking of points on an object may be used to place an image or texture (which may be two dimensional or three dimensional) at the tracked position. In still further implementations, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some implementations, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more implementations, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various implementations, any combination of such modifications or other similar modifications may be used. For certain models to be animated, some characteristic points can be selected as control points to be used in determining the entire state-space of options for the model animation.

In some implementations of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other implementations, other methods and algorithms suitable for face detection can be used. For example, in some implementations, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some implementations, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some implementations, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Implementations of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example implementations, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some implementations, a modified image or video stream may be presented in a graphical user interface displayed on the mobile client device as soon as the image or video stream is captured, and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some implementations, the graphical user interface, presenting the modification performed by the transform system, may supply the user with additional interaction options. Such options may be based on the interface used to initiate the content capture and selection of a particular computer animation model (e.g., initiation from a content creator user interface). In various implementations, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some implementations, individual faces, among a group of multiple faces, may be individually modified or such modifications may be individually toggled by tapping or selecting the individual face or a series of individual faces displayed within the graphical user interface.

As mentioned above, the video table 210 stores video data which, in one or more implementations, is associated with messages for which records are maintained within the message table 202. Similarly, the image table 212 stores image data associated with messages for which message data is stored in the entity table 204. The entity table 204 may associate various annotations from the annotation table 208 with various images and videos stored in the image table 212 and the video table 210.

A story table 214 stores data regarding collections of messages and associated image, video, or audio data, which are compiled into a collection (e.g., a story or a gallery). The creation of a particular collection may be initiated by a particular user (e.g., each user for which a record is maintained in the entity table 204). A user may create a "personal story" in the form of a collection of content that has been created and sent/broadcast by that user. To this end, one or more user interfaces generated by the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location event at a particular time may, for example, be presented with an option, via a user interface of the client application 104, to contribute content to a particular live story. The live story may be identified to the user by the client application 104, based on a user location. The end result is a "live story" told from a community perspective.

A further type of content collection is known as a "location story", which enables a user whose client device 102 is located within a specific geographic location (e.g., on a college or university campus) to contribute to a particular collection. In some implementations, a contribution to a location story may require a second degree of authentication to verify that the end user belongs to a specific organization or other entity (e.g., is a student on the university campus).

The database(s) 118 may also store content classification data 216 that indicates classifications of content items produced by the client application 104. For example, the content classification data 216 may include one or more identifiers of respective classifications of content items. In one or more examples, the content classification data 216 may include one or more lists of classification identifiers that may be applied to respective content items. In various implementations, the content classification data 216 may indicate a number of content items that are associated with a respective content identifier. For example, the content classification data 216 may indicate a first number of content items that are associated with a first content identifier (e.g., "keto diet") and a second number of content items that are associated with a second content identifier (e.g., "plant-based diet"). Additionally, the content classification data 216 may indicate one or more classification identifiers that are associated with respective content items. To illustrate, the content classification data 216 may indicate a first content item that is associated with one or more first content identifiers and a second content item that is associated with one or more second content identifiers. In one or more illustrative examples, at least one first content identifier of the one or more first content identifiers may be different from at least one second content identifier of the one or more second content identifiers.

Figure 3:
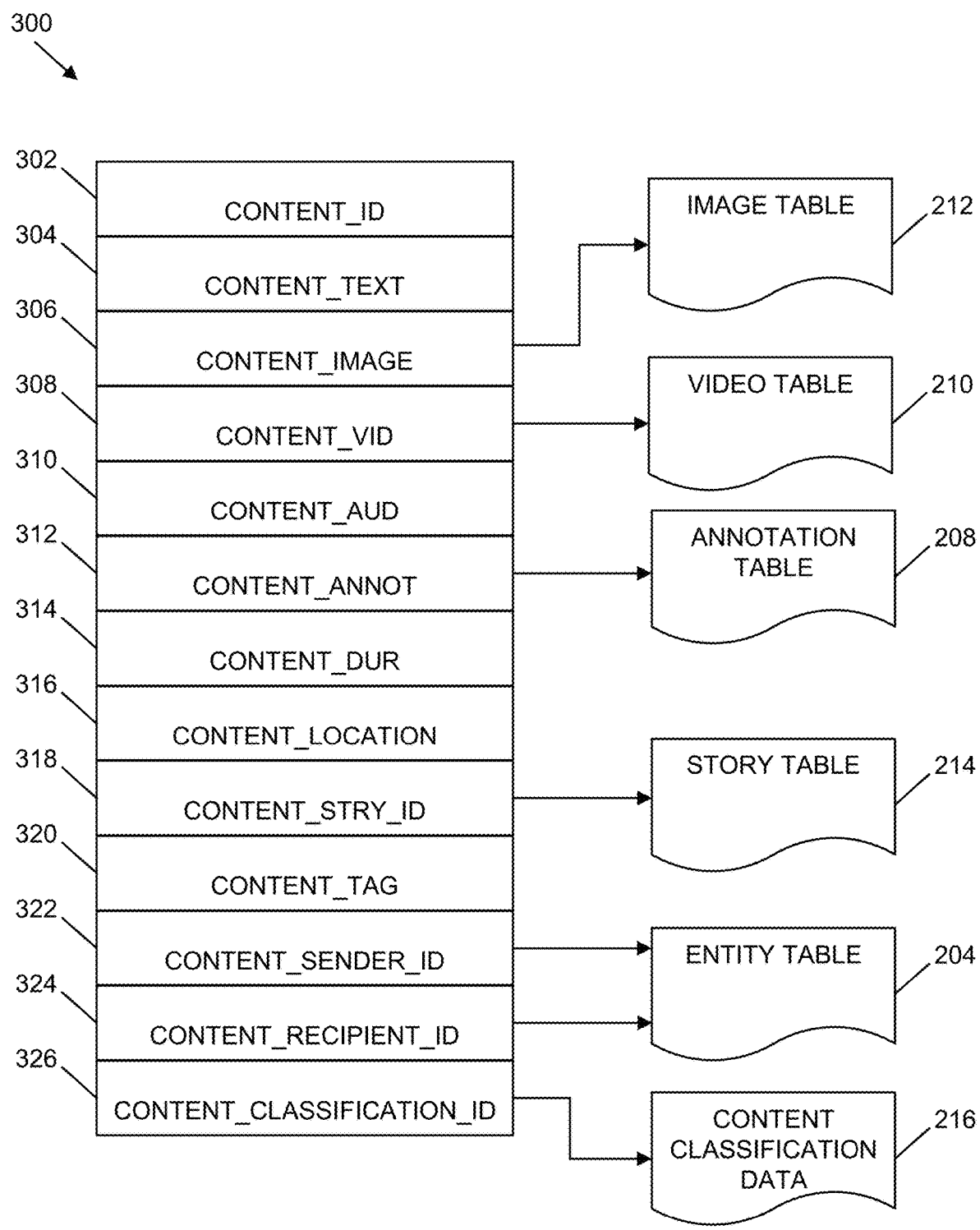
FIG. 3 is a schematic diagram illustrating an example framework for content that may be generated by a client application, in accordance with one or more example implementations.

FIG. 3 is a schematic diagram illustrating an example framework for content 300, according to some implementations. The content 300 may be generated by the client application 104. In various examples, the content 300 may be generated by a first instance of the client application 104 and communicated to at least one of a second instance of the client application 104 or the server system 108. In situations where the content 300 includes a message, the content 300 may be used to populate the message table 202 stored within the database(s) 118 and accessible by the application server 114. In one or more implementations, the content 300 may be stored in memory as "in-transit" or "in-flight" data of at least one of client devices 102 or the application server 114. The content 300 is shown to include the following components:

- A content identifier 302: a unique identifier that identifies the content 300.
- A content text payload 304: text, to be generated by a user via a user interface of the client application 104 and that may be included in the content 300.
- A content image payload 306: image data, captured by a camera component of a client device 102 or retrieved from a memory component of a client device 102, and that is included in the content 300.
- A content video payload 308: video data, captured by a camera component or retrieved from a memory component of a client device 102, and that is included in the content 300.
- A content audio payload 310: audio data, captured by a microphone or retrieved from a memory component of a client device 102, and that is included in the content 300.
- Content annotations 312: annotation data (e.g., filters, stickers, overlays, or other enhancements) that represents annotations to be applied to content image payload 306, content video payload 308, or content audio payload 310 of the content 300.
- A content duration parameter 314: parameter value indicating, in seconds, the amount of time for which the content 300 (e.g., the content image payload 306, content video payload 308, content audio payload 310) is to be presented or made accessible to a user via the client application 104.
- A content geolocation parameter 316: geolocation data (e.g., latitudinal and longitudinal coordinates) associated with the payload of the content 300. Multiple values of the geolocation parameter 316 may be included in the payload with each of the values of the geolocation parameter 316 being associated with respect to content items included in the content 300 (e.g., a specific image within the content image payload 306, or a specific video in the content video payload 308).
- A content story identifier 318: identifier values identifying one or more content collections (e.g., "stories") with which a particular content item in the content image payload 306 of the content 300 is associated. For example, multiple images within the content image payload 306 may each be associated with multiple content collections using identifier values.

A content tag 320: content 300 may be tagged with multiple tags, each of which is indicative of the subject matter of one or more content items included in the payload of the content 300. For example, where a particular image included in the content image payload 306 depicts an animal (e.g., a lion), a tag value may be included within the content tag 320 that is indicative of the relevant animal. Tag values may be generated manually, based on user input, or may be automatically generated using, for example, image recognition.

A content sender identifier 322: an identifier (e.g., a system identifier, email address, or device identifier) indicative of a user of a client device 102 on which the content 300 was generated and from which the content 300 was generated or sent.

A content recipient identifier 324: an identifier (e.g., a system identifier, email address, or device identifier) indicative of a user of another client device 102 to which the content 300 is addressed or otherwise accessible.

A content classification identifier 326: an identifier of a classification of a content item included in the content 300. The content item classification identifier 326 may be one of a plurality of classification identifiers associated with the content 300. In one or more illustrative examples, the content classification identifier 326 may correspond to one or more alphanumeric characters or symbols.

The data (e.g., values) of the various components of content 300 may correspond to pointers to locations in tables within which the data is stored. For example, an image value in the content image payload 306 may be a pointer to (or address of) a location within an image table 212. Similarly, values within the content video payload 308 may point to data stored within a video table 210, values stored within the annotations 312 may point to data stored in an annotation table 208, values stored within the content story identifier 318 may point to data stored in a story table 214, and values stored within the content sender identifier 322 and the content recipient identifier 324 may point to user records stored within an entity table 204. Further, values of the content classification identifier 326 may point to data stored within a data structure that includes content classification data 216.

Figure 4:
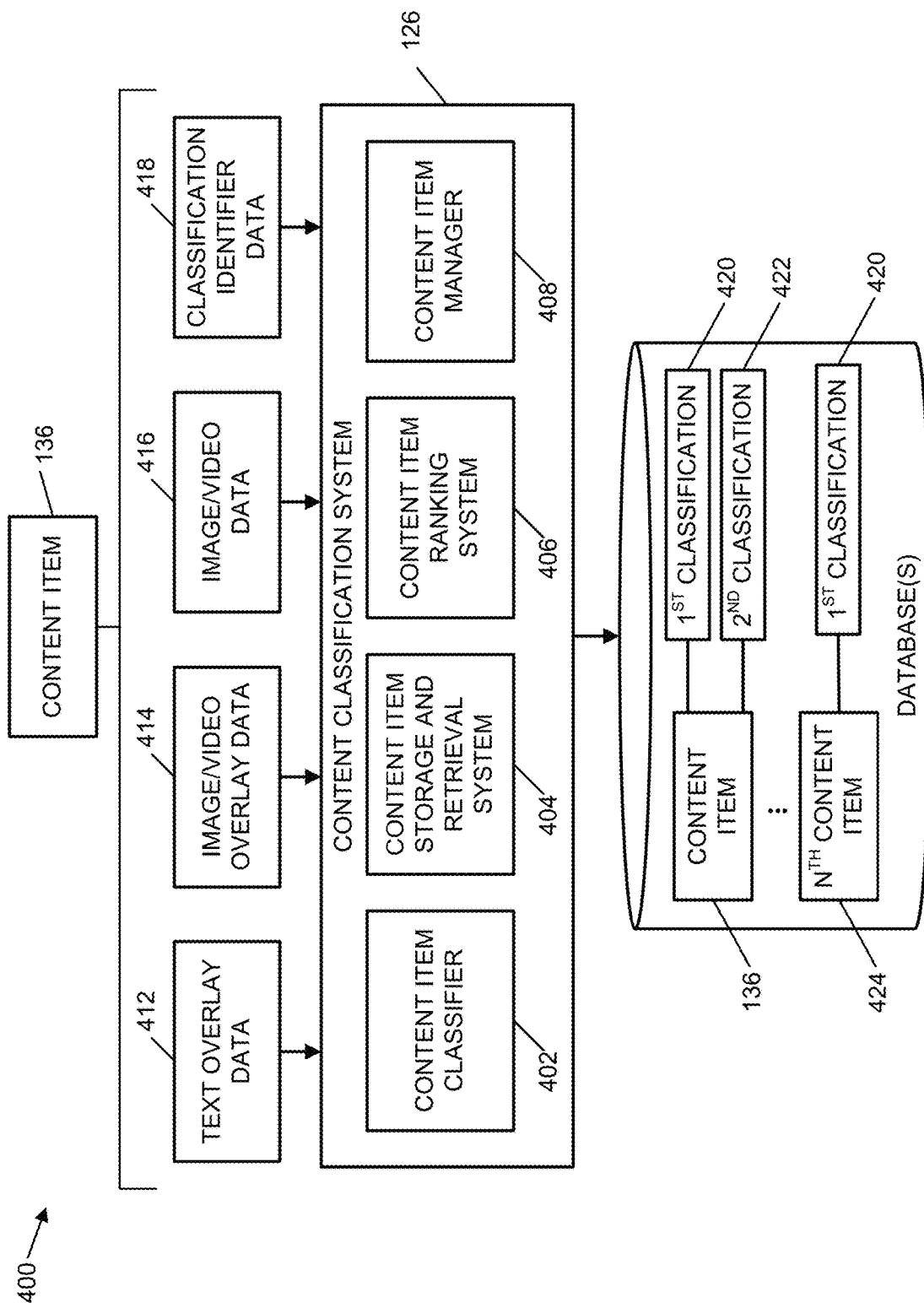
FIG. 4 is a diagrammatic representation illustrating an architecture that may determine classifications for content items and make content items accessible to users based on content item classifications, in accordance with one or more example implementations.

FIG. 4 is a diagrammatic representation illustrating an architecture 400 that may determine classifications for content items and make content items accessible to users based on content item classifications. The architecture 400 includes the content classification system 126. The content classification system 126 includes a content item classifier 402, a content item storage and retrieval system 404, a content item ranking system 406, and a content item manager 408.

The content item classifier 402 may analyze the data related to the content item 136 to determine one or more classifications for the content item 136. The data related to the content item 136 may be obtained by the content classification system 126 from an instance of the client application 104 executed by the client device 102. The data analyzed by the content item classifier 402 with respect to the content item 136 may include at least one of text overlay data 412, image or video overlay data 414, image or video data 416, or classification identifier data 418. In various examples, at least a portion of the classifications determined by the content item classifier 402 with respect to the content item 136 may be recommendations for classifications of the content item 136. Recommendations for classifications of the content item 136 may be accepted or rejected by a user of the client application 104 based on input obtained via one or more user interfaces displayed in conjunction with the client application 104.

The text overlay data 412 may correspond to data related to text content that overlays image content or video content of the content item 136. The text overlay data 412 may indicate one or more alphanumeric characters, one or more symbols, or combinations thereof, that are included in text that overlays at least one of the image content or video content of the content item 136. In one or more examples, the text overlay data 412 may indicate one or more identifiers of one or more classifications. For example, the text overlay data 412 may indicate at least one of words, letters, or symbols that correspond to one or more classification identifiers. In one or more illustrative examples, the text overlay data 412 may include a symbol indicating an identifier of a classification for content, such as a "#".

In various examples, the content item classifier 402 may analyze text of the text overlay data 412 to determine at least one of letters, words, or symbols related to at least one text overlay of the content item 136. In various examples, the content item classifier 402 may implement one or more natural language processing techniques to determine at least one of letters, words, or symbols of a text overlay. The content item classifier 402 may then determine a level of similarity between at least a portion of the text included in a text overlay of the content item 136 and at least one of letters, words, or symbols of a plurality of identifiers of classifications. The level of similarity may indicate a number of at least one of letters, words, or symbols of the text overlay of the content item 136 that correspond to a number of letters, words, symbols, or combinations thereof, of at least one classification identifier. The level of similarity may also correspond to an order in which groups of letters, words, symbols, or combinations thereof, appear in a text overlay of the content item 136 with respect to groups of at least one of letters, words, or symbols of classification identifiers. A level of similarity between text of an overlay of the content item 136 and a classification identifier may increase as the number of words, letters, symbols, or combinations thereof, of text of an overlay of the content item 136 increases that are in common with and have an order that corresponds to words, letters, symbols, or combinations thereof, of a classification identifier. Based on a level of similarity between text included in an overlay of the content item 136 and text of classification identifiers, the content item classifier 402 may determine one or more classifications to associate with the content item 136. In one or more illustrative examples, the content item classifier 402 may determine that at least a portion of a text overlay of the content item 136 corresponds to a classification identifier based on a level of similarity between the classification identifier and the at least a portion of the text overlay is greater than a threshold level of similarity. In additional examples, the content item classifier 402 may determine one or more classification identifiers having relatively high levels of similarity with at least a portion of a text overlay of the content item 136 in relation to other classification identifiers and determine that the classification(s) corresponding to the one or more classification identifiers are associated with the content item 136.

The content item classifier 402 may also analyze image or video overlay data 414 of the content item 136 to determine one or more classifications for the content item 136. An image overlay may include at least a portion of an image captured using a camera device. The image overlay may be related to an image captured by a user of the client application 104 that also produced the content item 136 using the client application 104. In additional examples, the image overlay may be obtained from an additional user of the client application 104 or from a service provider that produces images that may be used as overlays for content items produced using the client application 104. Further, the image overlay may be produced by at least one user of the client application 104 or a service provider using one or more creative tools of the client application 104. For example, at least one of one or more drawing tools or one or more painting tools may be used to create an image overlay for the content item 136. A video overlay may include video captured by one or more users of the client application 104 using a camera device. Additionally, a video overlay may include video produced by a service provider that generates video overlays for content items. In one or more implementations, a video overlay may include animated content.

In various examples, the image or video overlay data 414 may indicate an identifier of at least one of an image overlay or a video overlay of the content item 136. The identifier of at least one of an image overlay or a video overlay may correspond to a creative tool that is used to generate the at least one of the image overlay or the video overlay. Additionally, an identifier of an image overlay or a video overlay may be assigned by a creator of the overlay, such as a user of the client application 104 or a service provider that produces at least one of image overlays or video overlays for content items. In scenarios where the image or video overlay data includes an identifier that corresponds to the image overlay or video overlay, the content item classifier 402 may determine a classification of the content item based on the identifier of the overlay.

Additionally, the content item classifier 402 may analyze the image or video overlay data to determine one or more characteristics of an image or video overlay of the content item 136. The one or more characteristics may include one or more objects included in an image overlay or a video overlay, one or more locations of an image overlay or a video overlay, one or more individuals included in an image overlay or a video overlay, or one or more combinations thereof. In one or more illustrative examples, the content item classifier 402 may implement object recognition techniques to determine at least one of objects or individuals included in at least one of an image overlay or a video overlay of the content item 136. In one or more implementations, the content item classifier 402 may implement one or more machine learning techniques to identify at least one of objects or individuals included in an image overlay or a video overlay of the content item 136. In various examples, the content item classifier 402 may analyze one or more template images stored by the database(s) 118 to determine at least one of one or more objects or one or more individuals included in an image overlay or a video overlay of the content item 136.

The content item classifier 402 may determine at least one classification for the content item 136 based on one or more characteristics of an image overlay or a video overlay of the content item 136. For example, the content item classifier 402 may determine one or more keywords related to a characteristic of an image overlay or a video overlay and analyze the one or more keywords related to the characteristic with respect to one or more classification identifiers. In various implementations, one or more keywords related to a respective object, an individual, or a location may be stored by the database(s) 118 and used by the content item classifier 402 to determine a classification of the content item 136. In one or more illustrative examples, the content item classifier 402 may determine one or more keywords related to at least one of an object, an individual, or a location of an image overlay or a video overlay of the content item 136 and determine a level of similarity between the one or more keywords and one or more classification identifiers. Based on the levels of similarity with respect to one or more threshold levels of similarity or with respect to a ranking of the levels of similarity, the content item classifier 402 may determine at least one classification identifier that corresponds to the content item 136 in relation to at least one of an image overlay or a video overlay for the content item 136.

Further, the content item classifier 402 may determine one or more classifications for the content item 136 based on at least one of image data or video data 416 of the content item 136. In one or more examples, the content item 136 may comprise one or more images, one or more videos, or both one or more images and one or more videos. For example, a user of the client application 104 may capture at least one of one or more images or one or more videos using a camera device of a client device 102 and use the client application 104 to generate the content item 136 such that the content item 136 includes the one or more images or the one or more videos. In a manner similar to that described previously with respect to the image or video overlay data 414, the content item classifier 402 may analyze at least one of one or more images or one or more videos included in the content item 136 to determine one or more objects, one or more individuals, one or more locations, or one or more combinations thereof included in at least one of one or more images or one or more videos included in the content item 136. For example, the content item classifier 402 may implement one or more object recognition techniques to determine at least one of one or more objects or one or more individuals included in at least one of one or more images or one or more videos of the content item 136. The content item classifier 402 may then determine one or more keywords corresponding to an object or individual included in an image or video of the content item 136 and analyze the one or more keywords in relation to identifiers of classifications for content items. Based on the analysis, such as a similarity analysis, the content item classifier 402 may determine one or more classifications for the content item 136 according to one or more characteristics of at least one of images or videos of the content item 136.

The content item classifier 402 may also analyze classification identifier data 418 of the content item 136 to determine one or more classifications for the content item 136. For example, when the content item 136 is being generated using the client application 104, the client application 104 may associate one or more classification identifiers with the content item 136. In various examples, an instance of a client application 104 executed by a client device 102 may implement at least a portion of the operations performed by the content item classifier 402 to determine one or more classifications of the content item 136 and assign identifiers of the one or more classifications to the content item 136. To illustrate, the client application 104 may analyze at least one of text overlay data 412, image or video overlay data 414, or image or video data 416 to determine one or more classifications of the content item 136. The client application 104 may send identifiers of the one or more classifications of the content item 136 to the content classification system 126 as classification identifier data 418. Further, the classification identifier data 418 may include identifiers of classifications selected by a user of the client application 104. In one or more illustrative examples, the client application 104 may cause one or more user interfaces to be displayed that may include user interface elements that are selectable to associate a classification to the content item 136. The one or more user interfaces may include a list of classifications that may be selectable for the content item 136. In one or more examples, the one or more user interfaces may include one or more recommendations for classifications of the content item 136. Selection of a user interface element corresponding to a classification identifier may cause the client application 104 to associate a corresponding classification with the content item 136. In these scenarios, the classification identifier data 418 may indicate one or more identifiers of at least one classification selected by a user of the client application 104 for the content item 136.

After determining one or more classifications for the content item 136, the content item classifier 402 may operate in conjunction with the content item storage and retrieval system 404 to store data related to the content item 136 in the database(s) 118 in association with the one or more classifications. For example, the content item classifier 402 may determine that a first classification 420 and a second classification 422 correspond to the content item 136. The content item storage and retrieval system 404 may store the content item 136 in the database(s) 118 in association with the first classification 420 and the second classification 422. In various examples, the content item 136 may be stored in a data structure indicating that the content item 136 corresponds to the first classification 420 and the second classification 422. In one or more illustrative examples, the content item 136 may be stored in a database table that includes one or more fields corresponding to classifications associated with the content item 136, such as the first classification 420 and the second classification 422. The database(s) 118 may store data related to a number of additional content items up to an Nth content item 424 that is associated with one or more classifications, such as the first classification 420.

In one or more implementations, the content item storage and retrieval system 404 may retrieve data corresponding to content items based on requests received from client devices 102 executing instances of the client application 104. In various examples, the content item storage and retrieval system 404 may retrieve data related to content items stored by the database(s) 118 responsive to requests for content related to one or more classification identifiers. For example, the server system 108 may receive a request from a client device 102 executing an instance of the client application 104 for content related to a respective classification identifier, such as "spring flowers". In one or more examples, the classification identifier may be entered by a user of the client application 104 into one or more user interface elements generated by the client application 104. In additional examples, the classification identifier may be selected by a user of the client application 104 via selection of a user interface element corresponding to the classification identifier that is displayed in a user interface generated by the client application 104.

In response to receiving a request for content related to one or more classifications, the content item storage and retrieval system 404 may obtain content item data from the database(s) 118 that are stored in association with the one or more classifications. In various examples, the content item storage and retrieval system 404 may query the database(s) 118 to retrieve one or more content items that correspond to a classification identifier included in a request for content. In one or more illustrative examples, the server system 108 may obtain a request for content items corresponding to the first classification 420. The content item storage and retrieval system 404 may retrieve data corresponding to at least a portion of the content items related to the first classification 420, such as the content item 136 and the Nth content item 424.

In various implementations, the content item ranking system 406 may determine rankings of content items that indicate a level of interest of the content items to one or more users of the client application 104. In one or more examples, the content item ranking system 406 may analyze one or more characteristics of a number of content items in relation to characteristics of a user of the client application 104 to determine a respective ranking for an individual content item with respect to other content items. To illustrate, the content item ranking system 406 may analyze profile information of a user of the client application 104, account information of the user, content viewed by the user, an amount of time a user views one or more content items, location of the user, classifications of content viewed by the user, characteristics of additional users of the client application 104 that the user is following, characteristics of additional users of the client application 104 that are following the user, one or more combinations thereof and the like, to determine one or more characteristics of the user of the client application 104. Additionally, the content item ranking system 406 may analyze one or more classifications of content items, one or more locations related to content items, one or more objects related to content items, one or more individuals included in the content items, characteristics of users of the client application 104 that created the content items, a number of times that content items have been viewed, an amount of time that content items have been viewed, characteristics of users of the client application 104 that viewed the content items, one or more combinations thereof, and so forth, to determine one or more characteristics of individual content items. Based on the characteristics of a user of the client application 104 and the characteristics of a number of content items, the content item ranking system 406 may determine a ranking for individual content items with respect to the user that indicates a level of interest of the user in viewing the respective content items. In one or more illustrative examples, the ranking of a respective content item for the user may correspond to an order in which the content item is presented to the user in a user interface of the client application 104. For example, a first content item having a first ranking that is higher than a second ranking of a second content item may be presented to the user in a user interface of the client application 104 before the second content item. In one or more implementations, the second ranking of the second content item may correspond to a level of interest that is less than a level of interest of the first content item.

The content item ranking system 406 may implement one or more computational techniques to determine rankings of content items with respect to one or more users of the client application 104. For example, the content item ranking system 406 may implement one or more statistical techniques to determine rankings of content items with respect to one or more users of the client application 104. In one or more illustrative examples, the content item ranking system 406 may implement one or more linear regression modeling techniques to determine rankings of content items for a user of the client application 104. Additionally, the content item ranking system 406 may implement one or more gradient descent techniques to determine rankings of content items with respect to a user of the client application 104. Further, the content item ranking system 406 may implement one or more machine learning techniques to determine rankings of content items for a user of the client application 104. To illustrate, the content item ranking system 406 may implement one or more neural networks, such as one or more convolutional neural networks, to determine rankings for content items with respect to a user of the client application 104. In one or more examples, one or more neural networks may be implemented by the content item ranking system 406 to determine characteristics of users of the client application 104 that may indicate at least a threshold level of interest in one or more content items associated with a content item classification.

In one or more implementations, the content item storage and retrieval system 404 may operate in conjunction with the content item ranking system 406 to provide content items in response to requests for content related to a given classification. For example, the content item ranking system 406 may determine rankings for individual content items retrieved by the content item storage and retrieval system 404 in response to a request for content related to one or more classifications. To illustrate, in response to a request for content related to the first classification 420, the content item storage and retrieval system 404 may obtain at least a portion of the content items stored by the database(s) 118 that correspond to the first classification 420. The content item ranking system 406 may then determine rankings for the content items retrieved by the content item storage and retrieval system 404. In various examples, the content item ranking system 406 may determine rankings for a number of content items based on one or more characteristics of a user requesting the content having a respective classification. In this way, the content item storage and retrieval system 404 and the content item ranking system 406 may operate to provide a number of content items in response to a request by a user of the client application 104 for content related to a classification that may be of more interest to the user than other content items having the classification. Accordingly, ranking content items having a classification for individual users of the client application 104 may be used to customize the presentation of content items for the user based on a level of interest for a respective user in content items associated with the classification.

The content item manager 408 may enable users of the client application 104 to at least one of view, organize, share, or manage content items generated using the client application 104 that have been associated with a classification. For example, the content item manager 408 may operate in conjunction with the content item storage and retrieval system 404 to provide content items generated by a user of the client application 104 having one or more classifications to a client device 102 of the user. To illustrate, the content item manager 408 may receive a request to view content items created by the user having one or more classifications where the request is sent in response to one or more inputs provided via one or more user interfaces displayed by the client application 104. The content item manager 408 may then cause data corresponding to the content items of the user corresponding to the request to be sent to the client device 102 of the user for display by the client application 104. The content item manager 408 may also cause content items to be added to at least one of an account or profile of a user of the client application 104 or deleted from at least one of an account or profile of the user based on input obtained by the content item manager 408 via the client application 104.

In various examples, the content item manager 408 may provide content items to a client device 102 of a user of the client application 104 such that the content items of the user that are associated with one or more classifications are displayed in one or more pages of the client application 104 that are dedicated to displaying content items of the user having one or more classifications. In one or more illustrative examples, content items created by the user that are not associated with at least one classification may not be displayed in the one or more pages. In one or more implementations, the content items created by a user of the client application 104 that are associated with at least one classification determined by the content classification system 126 may be publicly accessible to other users of the client application 104 and content items created by the user that are not associated with a classification determined by the content classification system 126 may have limited accessibility to users of the client application 104. To illustrate, content items that are not associated with a particular classification identifier may be limited to access by recipients of the content items as specified by the user creating the content items.

Figure 5:
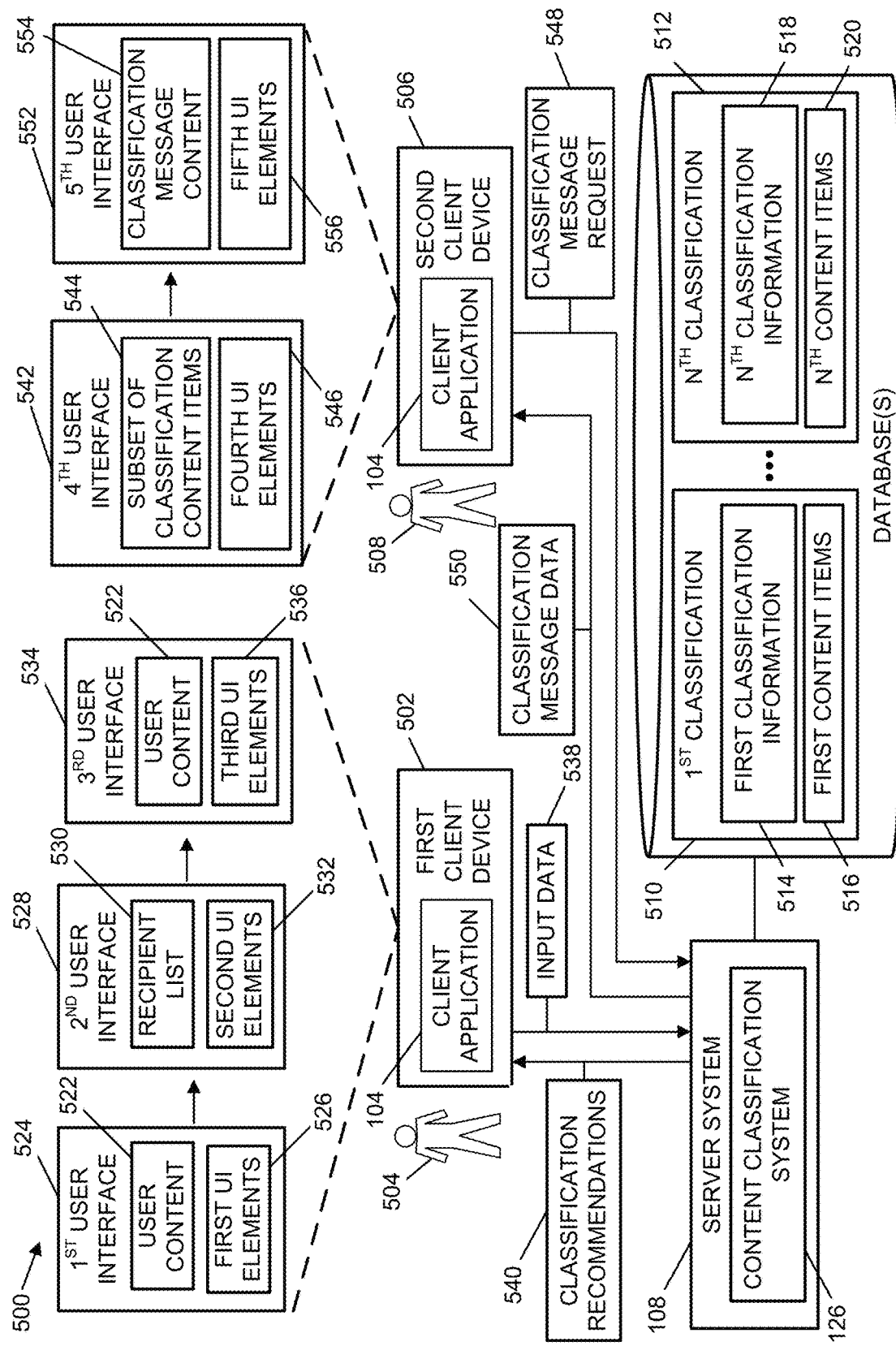
FIG. 5 is a diagrammatic representation illustrating an architecture to provide information related to classifications of content items, in accordance with one or more example implementations.

FIG. 5 is a diagrammatic representation illustrating an architecture 500 to provide information related to classifications of content items, in accordance with one or more example implementations. The architecture 500 may include a first client device 502 that is operated by a first user 504. The architecture 500 may also include a second client device 506 that may be operated by a second user 508. The first client device 502 and the second client device 506 may store and execute an instance of the client application 104. The first client device 502 and the second client device 506 may also include one or more cameras that may capture at least one of image content or video content. The first client device 502 may also include one or more input devices that capture audio content that may correspond to video content captured by the camera. The camera may capture a camera view that may include a live view of content being captured by the camera. The client application 104 may cause a number of user interfaces to be displayed via one or more display devices of the client device 102.

In addition, the architecture 500 may include the server system 108. The server system 108 may implement the content classification system 126. The server system 108 may be coupled to the database 118. The database 118 may store information related to a number of classifications of content items. For example, the database 118 may store information related to a first classification 510 up to an Nth classification 512. For example, the database 118 may store first classification information 514. In one or more examples, the first classification information 514 may indicate an identifier of the first classification 510. To illustrate, an identifier of the first classification 510 may indicate a string of text characters that correspond to the first classification 510. The string of text characters may include a number of alphanumeric characters. In one or more additional examples, the first classification information 514 may indicate at least one of image content, video content, or audio content that identifies the first classification 510. In addition, the first classification 510 may correspond to first content items 516.

In various examples, the first classification information 514 may indicate an amount of usage of the first classification 510. The amount of usage of the first classification 510 may indicate a number of content items that correspond to the first classification 510. Additionally, the amount of usage of the first classification 510 may indicate at least one of a number of times that the first classification 510 has been shared with users of the client application 104 or a number of times that content items corresponding to the first classification 510 have been shared with users of the client application 104. Further, the amount of usage of the first classification 510 may indicate a number of times that a page or dedicated user interface within the client application 104 that includes content items corresponding to the first classification 510 has been accessed.

The database 118 may also store Nth classification information 518 that corresponds to the Nth classification 512. In one or more examples, the Nth classification information 518 may indicate an identifier of the Nth classification 512 that is different from the identifier of the first classification 510. To illustrate, an identifier of the Nth classification 512 may indicate a string of text characters that correspond to the Nth classification 512. The string of text characters may include a number of alphanumeric characters. In one or more additional examples, the Nth classification information 518 may indicate at least one of image content, video content, or audio content that identifies the Nth classification 512. In addition, the Nth classification 512 may correspond to Nth content items 520.

In various examples, the Nth classification information 518 may indicate an amount of usage of the Nth classification 512. The amount of usage of the Nth classification 512 may indicate a number of content items that correspond to the Nth classification 512. Additionally, the amount of usage of the Nth classification 5102 may indicate at least one of a number of times that the Nth classification 512 has been shared with users of the client application 104 or a number of times that content items corresponding to the Nth classification 512 have been shared with users of the client application 104. Further, the amount of usage of the Nth classification 512 may indicate a number of times that a page or dedicated user interface within the client application 104 that includes content items corresponding to the Nth classification 512 has been accessed.

The first content items 516 may include user content generated using the client application 104 that has been tagged or otherwise associated with the first classification 510. Additionally, the Nth content items 520 may include user content generated using the client application 104 that has been tagged or otherwise associated with the Nth classification 512. In this way, the first content items 516 may be stored in the database 118 in association with the first classification 510 and the Nth content items 520 may be stored in the database 118 in association with the Nth classification 512. In response to requests for content received from client devices executing the client application 104, the content classification system 126 may determine at least a subset of the first content items 516 or a subset of the Nth content items 520 to be displayed via the client application 104. In one or more examples, requests to access content related to the first classification 510 may cause the content classification system 126 to determine a subset of the first content items 516 and cause a user interface to be displayed within the client application 104 that includes the subset of the first content items 516. In various examples, the subset of the first content items 516 may be determined by the content classification system 126 based on characteristics of the users making the requests. In one or more illustrative examples, the content classification system 126 may determine a group of the first content items 516 that may be of interest to a user making a request to access content related to the first classification 510 based on characteristics of the user, such as demographic information of the user, location information of the user, previous content accessed by the user, one or more combinations thereof, and the like. The content classification system 126 may then cause the group of the first content items 516 to be accessible to the user via the client application 104.

In one or more illustrative examples, the first user 504 may operate the first client device 502 to generate user content 522 within the client application 104. The user content 522 may include at least one of video content, audio content, image content, or augmented reality content. In various examples, the user content 522 may be captured using one or more cameras of the first client device 502. The user content 522 may be displayed or otherwise accessed via a first user interface 524 of the client application 104. In one or more examples, the client application 104 may display a camera view of an environment, the client device 102 may generate the user content 522 based on capturing at least one of an image, a video, or audio of at least a portion of the environment. In various examples, the user content 522 may include modifications to initial user content generated using the client application 104. For example, one or more augmented reality content items may be implemented with respect to an image and/or video of the initial user content to generate the user content 522. In at least some scenarios, at least a portion of the user content 522 may be stored by memory of the first client device 502. In one or more further examples, at least a portion of the user content 522 may be stored in one or more data storage devices that are located remotely with respect to the first client device 502 and are accessible to the first client device 502.

The first user interface 524 may also include one or more first user interface (UI) elements 526. The one or more first user interface elements 526 may include a user interface element that is selectable to make the user content 522 accessible to one or more recipients. The one or more first user interface elements 526 may also include one or more additional user interface elements that are selectable to modify the user content 522. To illustrate, the one or more first user interface elements 526 may include one or more user interface elements that are selectable to add at least one of text content, image content, animation content, video content, or audio content to the user content 522. Additionally, the one or more first user interface elements 526 may include one or more user interface elements that are selectable to apply one or more artistic tools to the user content 522, such as adding lines, shapes, colors, and the like to the user content 522. Further, the one or more first user interface elements 526 may include one or more user interface elements that are selectable to execute one or more augmented reality content items with respect to the user content 522.

In response to selection of a first user interface element 526 to make the user content 522 accessible to one or more recipients, a second user interface 528 may be displayed within the client application 104. The second user interface 528 may include a recipient list 530. The recipient list 530 may include one or more recipients that may access content related to the first user 504. In one or more examples, the recipient list 530 may include one or more additional users of the client application 104. In scenarios where one or more additional users are selected from the recipient list 530 to receive the user content 522, one or more messages may be generated that include the user content 522 and are made accessible to the one or more additional users. In addition, the recipient list 530 may include one or more content collections that are accessible via the client application 104. In instances where one or more content collections are selected from the recipient list 530, the user content 522 may be added to the one or more content collections included in the recipient list 530 such that one or more additional users of the client application 104 may access the user content 522 as part of the one or more content collections. In various examples, the one or more content collections may include a content collection that includes content items that are posted by the first user 504. In these situations, the content collection may be specific to the first user 504 and be a personal content collection of the first user 504. In one or more additional examples, a content collection included in the recipient list 530 may include content items that are provided by a number of different users of the client application 104. For example, one or more content collections included in the recipient list 530 may include content items provided by a specified group of users of the client application 104 that includes the first user 504. Further, one or more content collections that included in the recipient list 530 may include content items that are made accessible to a majority of users of the client application 104 or to all of the users of the client application 104. In still other examples, one or more content collections included in the recipient list 530 may include content items curated by an entity that at least one of controls, maintains, or created the client application 104.

The second user interface 528 may also include one or more second user interface elements 532. The one or more second user interface elements 532 may include one or more user interface elements that are selectable to add a recipient included in the recipient list 530 to one or more recipients of the user content 522. Additionally, the one or more second user interface elements 532 may include one or more user interface elements that are selectable to add a classification to the user content 522. For example, the one or more second user interface elements 532 may include one or more user interface elements that are selectable to cause the user content 522 to be stored in association with one or more classifications.

In one or more illustrative examples, in response to selection of a second user interface element 532 to add a classification to the user content 522, the client application 104 may display a first version of the third user interface 534. The first version of the third user interface 534 may include the user content 522 and one or more third user interface elements 536. The one or more third user interface elements 536 may include a user interface element that is configured to capture input related to a classification for the user content 522. In one or more examples, the user interface element configured to accept input related to the classification for the user content 522 may be an overlay of the user content. In one or more illustrative examples, a third user interface element 536 may be dedicated to capturing input related to one or more classifications of the user content 522. Additionally, the one or more user third user interface elements 536 may include a keyboard or other user interface element to enter input related to the classification of the user content 522. In various examples, the input captured by at least one of the third user interface elements 536 may include text input. In one or more additional scenarios, the text input may include one or more alphanumeric characters. In at least some examples, a classification for the user content 522 may be designated by entering a symbol, such as a "#" to begin input captured by a third user interface element 536 configured to capture user input related to classification of the user content 522.

In one or more additional illustrative examples, in response to selection of a second user interface element 532 to add the user content 522 to a content collection, the client application 104 may display a second version of the third user interface 534. In these scenarios, the content collection may include a curated collection of content items. In various examples, the content collection may include content items that are created by a specified group of content creators. In one or more examples, the specified group of content creators may be selected by an entity that at least one of maintains, controls, updates, or created the client application 104. In response to user input to add the user content 522 to the content collection, a third user interface element 536 may be displayed to capture text related to the user content 522. In various examples, the third user interface element 536 may capture text, image, or video annotations related to the user content. In one or more illustrative examples, the third user interface element 536 may capture at least one of a description, commentary, or social networking post that corresponds to the user content 522. In these situations, the input provided using the third user interface element 536 may include alphanumeric characters related to one or more content classifications, but may not be dedicated to capturing alphanumeric characters that correspond to content classifications.

In various examples with respect to at least one of the first version of the third user interface 534 or the second version of the third user interface 534, the alphanumeric characters may be displayed in conjunction with one or more recommendations for a classification that corresponds to the user content 522 and to the input entered using the one or more third user interface elements 536. In one or more examples, input data 538 may be generated in response to input captured by the one or more third user interface elements 536. In one or more illustrative examples, the input data 538 may correspond to alphanumeric characters that correspond to one or more selections of alphanumeric characters entered by the first user 504. In at least some implementations, the input data 538 may correspond to partially completed classifications. That is, as input is captured by the one or more third user interface elements 536, the input data 538 may be created and updated. In this way, the input data 538 may include successive input captured by the one or more third user interface elements 536. For example, a first portion of the input data 538 may include "#b", a second portion of the input data 538 may include "#br", a third portion of the input data 538 may include "#bru", a fourth portion of the input data 538 may include "#brun", a fifth portion of the input data 538 may include "#brunc", and a sixth portion of the input data 538 may include "#brunch".

In one or more examples, the content classification system 126 may generate classification recommendations 540 based on the input data 538. To illustrate, as the server system 108 receives the input data 538, the content classification system 126 may generate classification recommendations 540 and send the classification recommendations 540 to the first client device 502. The classification recommendations 540 may be displayed in the third user interface 534. In various examples, the classification recommendations 540 may be displayed in the third user interface 534 in conjunction with the input data 538 that is captured by one or more of the third user interface elements 536.

The content classification system 126 may analyze the input data 538 to determine the one or more classification recommendations 540. For example, the content classification system 126 may analyze alphanumeric characters included in the input data 538 with respect to alphanumeric characters of a number of content classifications to determine a similarity metric between the alphanumeric characters included in the input data 538 and alphanumeric characters of one or more content classifications. The content classification system 126 may determine that a content classification corresponds to the input data 538 based on determining that the similarity metric between the alphanumeric characters of the input data 538 and the alphanumeric characters of the content classification is at least a threshold similarity metric. In one or more examples, the content classification system 126 may determine that multiple content classifications correspond to the input data 538 based on measures of similarity between alphanumeric characters of the input data 538 and alphanumeric characters of the content classifications are at least the threshold similarity metric. In one or more illustrative examples, the content classification system 126 may implement at least one of one or more natural language processing techniques or one or more machine learning techniques to determine one or more classification recommendations based on the input data 538.

The classification recommendations 540 that correspond to the input data 538 may be modified as the input data 538 is modified. To illustrate, as additional alphanumeric characters are added to the input data 538, the content classification system 126 may determine one or more additional classification recommendations 540 to be displayed via the third user interface 534. In one or more illustrative examples, the input data 538 may include one or more first alphanumeric characters. In these scenarios, the content classification system 126 may determine one or more first classification recommendations 540 that correspond to the one or more first alphanumeric characters. Subsequently, the input data 538 may include a number of second alphanumeric characters as additional input is captured by one or more of the third user interface elements 536 and the content classification system 126 may determine one or more second classification recommendations 540 based on the number of second alphanumeric characters. In this way, as the number of alphanumeric characters included in the input data 538 increases, the content classification system 126 may determine additional sets of classification recommendations 540 that may be more similar to an intended classification being entered by the first user 504 using one or more of the third user interface elements 536. In at least some examples, the number of alphanumeric characters included in the input data 538, such as in response to one or more character deletion inputs, and the content classification system 126 may generate one or more further classification recommendations 540 based on the new alphanumeric characters included in the input data 538 after the one or more deletions have taken place.

In various examples, the input data 538 may correspond to a series of alphanumeric characters that are a misspelling of a content classification. In one or more examples, the misspelling may be an error on the part of the first user 504. In one or more additional examples, the misspellings may be deliberate on the part of the first user 504 in an attempt to cause content items to be mischaracterized or to steer content items away from one classification to another classification. In at least some examples, the threshold level of similarity implemented by the content classification system 126 may identify a set of alphanumeric characters that are not an exact match with the alphanumeric characters of a content classification and may account for at least a threshold number of characters being different from the alphanumeric characters of a given content classification. In one or more scenarios, the threshold number of differences between an alphanumeric characters included in the input data 538 and the alphanumeric characters of a content classification may be based on a total number of alphanumeric characters included in the content classification. In one or more illustrative examples, the content classifications that may be associated with content items may be a group of curated content classifications that are at least one of maintained, controlled, or updated by an entity associated with the server system 108 and/or the client application 104. In these situations, input data 538 that includes alphanumeric characters that have at least the threshold similarity with the group of curated content classifications The content classification system 126 may also analyze one or more criteria in addition to the similarity metric between alphanumeric characters of the input data with respect to alphanumeric characters of content classifications to determine the classification recommendations 540. For example, the content classification system 126 may analyze content item viewing history of the first user 504 to determine one or more classification recommendations 540. The content item viewing history of the first user 504 may indicate at least one of categories of content items viewed by the first user 504 via the client application 104 or classifications of content items viewed by the first user 504 via the client application 104. In one or more additional examples, the content classification system 126 may analyze at least one of content classifications previously used by the first user 504 or content classifications previously used by users of the client application 104 that have characteristics that are similar to characteristics of the first user 504 to determine the classification recommendations 540. The content classification system 126 may also analyze content classifications that were recently used by the first user 504 to determine the classification recommendations 540. To illustrate, the content classification system 126 may determine content classifications used by the first user 504 within a period of time, such as the past one hour, the past two hours, the past three hours, the past six hours, the past twelve hours, the past twenty four hours, the past forty eight hours, and the like, to determine one or more classification recommendations 540. In one or more further examples, the content classification system 126 may determine at least a portion of the classification recommendations 540 based on content classifications that have at least a threshold amount of use by users of the client application 104. In at least some examples, content classifications having at least the threshold amount of use by users of the client application 104 may be considered to be trending content classifications within the client application 104.

In one or more examples, the content classification system 126 may determine a ranked list of classification recommendations. The content classification system 126 may analyze a number of candidate classifications based on the input data 538 and based on one or more characteristics of the first user 504 to determine a likelihood of individual candidate classifications being associated with the user content 522. The content classification system 126 may rank at least a portion of the candidate classifications based on individual likelihoods that respective classifications may be associated with the user content 522 to generate the ranked list of classification recommendations. The ranked list of classification recommendations may indicate classifications having a highest likelihood of being associated with the user content 522 to classifications having a lower likelihood of being associated with the user content 522. In various examples, the content classification system 126 may analyze at least one of content classifications previously selected by the first user 504, content classifications viewed by the first user 504, additional content classifications similar to content classifications selected by the first user 504, additional content classifications selected by users of the client application 104 having similar profile information with respect to profile information of the first user 504, content classifications selected by the first user within a given period of time, or one or more classifications of additional user content having similar characteristics with respect to the user content 522 to determine the ranked list of candidate classifications in relation to the user content 522.

The content recommendations 540 may be displayed within the third user interface 534 as selectable options. For example, as the input data 538 is being captured by one or more of the third user interface elements 536, at least a portion of the classification recommendations 540 may be displayed in the third user interface 534 before or after the first user 504 has completed entering alphanumeric characters of an intended classification for the user content 522. In situations where the classification recommendations 540 include a ranked list of candidate classifications, the candidate classifications may be displayed in the third user interface 534 in the order included in the ranked list of candidate classifications. In response to selection of an option that corresponds to a classification recommendation 540, the content classification system 126 may determine that the user content 522 is stored by the database(s) 118 in association with the selected classification recommendation 540. In this way, the entire string of alphanumeric characters that correspond to a given classification does not have to be present in the input data 538 before a content classification is associated with the user content 522.

In one or more illustrative examples, the input data 538 may be analyzed with respect to classification information stored by the database(s) 118 in relation to one or more classifications. For example, the content classification system 126 may analyze one or more alphanumeric characters included in the input data 538 with one or more alphanumeric characters included in the first classification information 514 to determine a first level of similarity between the input data 538 and the first classification 510. In addition, the content classification system 126 may analyze one or more alphanumeric characters included in the input data 538 with one or more alphanumeric characters included in the Nth classification information 518 to determine a second level of similarity between the input data 538 and the Nth classification 512. In one or more examples, the content classification system 126 may determine that the first level of similar is at least a threshold level of similarity and that the second level of similarity is less than the threshold level of similarity. In these scenarios, the content classification system 126 may determine that the first classification 510 is included in the classification recommendations 540. The content classification system 126 may also determine that the first classification 510 is included in the classification recommendations 540 based on the first classification 510 corresponding to content items recently viewed by the first user 504 or based on the first classification 510 being recently used by the first user 504. In response to selection of the first classification 510 from among the classification recommendations 540 displayed in the third user interface 534, the user content 522 may be included in the first content items 516 that are stored in association with the first classification 510.

In various examples, the client application 104 may display additional user interfaces related to classifications of content items that are accessible via the client application 104. For example, in relation to the second client device 506, the client application 104 may display a fourth user interface 542. The fourth user interface 542 may include a subset of classification content items 544. To illustrate, the fourth user interface 542 may include a subset of content items that correspond to a classification of content items, such as the first classification 510 or the Nth classification 512. In one or more examples, the fourth user interface 542 may be displayed in response to a request received by the server system 108 from the second client device 506 to view content items related to the classification. In one or more illustrative examples, the fourth user interface 542 may include one or more pages of the client application that are dedicated to displaying content items related to a given classification. In one or more additional illustrative examples, the subset of classification content items 544 may include representations of content items associated with the classification, such as thumbnails that include an image of at least a portion of individual content items corresponding to the classification.

The fourth user interface 542 may also include one or more fourth user interface elements 546. The one or more fourth user interface elements 546 may be selectable to share content related to the subset of classification content items 544. For example, the one or more fourth user interface elements 546 may include a user interface element that is selectable to share the classification associated with the fourth user interface 542 with other users of the client application 104. In this way, the second user 508 may provide an option for other users of the client application 104 to access content items related to the classification corresponding to the content items included in the fourth user interface 542. In one or more additional examples, the one or more fourth user interface elements 546 may include a user interface element that is selectable to share one or more of the content items displayed in the fourth user interface 542 and included in the subset of classification content items 544. As a result, the second user 508 may provide access by one or more additional users of the client application 104 to one or more of the content items related to the classification associated with the fourth user interface 542. In various examples, representations of individual content items included in the subset of classification content items 544 may be selectable to share the individual content items with one or more additional users of the client application 104.

In one or more examples, selection of a fourth user interface element 546 may cause a classification message request 548 to be generated and sent to the server system 108. The classification message request 548 may be a request to share a classification related to the subset of classification content items 544 based on selection of a fourth user interface element 546 to share the classification with at least one additional user of the client application 104. In one or more additional examples, the classification message request 548 may be a request to share one or more content items related to a classification corresponding to the subset of classification content items 544. In various examples, selection of one or more of the subset of classification content items 544 may generate the classification message request 548 to share the one or more content items with an additional user of the client application 104.

Responsive to the classification message request 548, the server system 108 may generate classification message data

550. The classification message data 550 may include representations of one or more content items that correspond to selections included in the classification message request 548. The classification message data 550 may also include an identifier of the classification. In one or more further examples, the classification message data 550 may include additional information about the classification, such as a number of content items that are associated with the classification. The classification message data 550 may be used by the client application 104 to cause display of a fifth user interface 552. The fifth user interface 552 may include classification message content 554. The classification message data 550 may indicate a representation of a content item related to the classification corresponding to the subset of classification content items 544. In one or more additional examples, the classification message data 550 may indicate a representation of a content item that is being shared with an additional user of the client application 104. The classification message content 554 of the fifth user interface 552 may include the representation of the content item included in the classification message data 550. The classification message content 554 may also include an identifier of the classification corresponding to the representation of the content item included in the classification message data 550 and additional information that may be included in the classification message data 550.

The fifth user interface 552 may also include one or more fifth user interface elements 556. The one or more fifth user interface elements 556 may include a user interface element to enter text content, image content, video content, or animation content related to the classification message content 554. In various examples, the one or more fifth user interface elements 556 may include a user interface element to capture a message that is to be sent in conjunction with the classification being shared or in conjunction with one or more content items related to a classification that are being shared. In one or more examples, the one or more fifth user interface elements may include a keyboard user interface element to enter text that is displayed in a message content user interface element. The one or more fifth user interface elements 556 may also include one or more user interface elements that are selectable to indicate recipients of the classification message content 554. The recipients of the classification message content 554 may include at least one of one or more additional users of the client application 104, one or more content collections, one or more groups of additional users of the client application 104, or one or more additional client applications that may be used to access the classification message content 554. Responsive to selection of at least one recipient for the classification message content 554, the server system 108 may cause the classification message content 554 to be accessible to the at least one recipient.

FIGS. 6-10 illustrate flowcharts of processes to classify and discover content created using a client application 104. The processes may be embodied in computer-readable instructions for execution by one or more processors such that the operations of the processes may be performed in part or in whole by the functional components of the at least one of the client application 104 or the server system 108. Accordingly, the processes described below are by way of example with reference thereto, in some situations. However, in other implementations, at least some of the operations of the processes described with respect to FIGS. 6-10 may be deployed on various other hardware configurations. The processes described with respect to FIG. 6-10 are therefore not intended to be limited to the server system 108 or client device 102 and can be implemented in whole, or in part, by one or more additional components. Some or all of the operations of the processes described with respect to FIGS. 6-10 can be performed in parallel, out of order, or entirely omitted, in various implementations.

Figure 6:
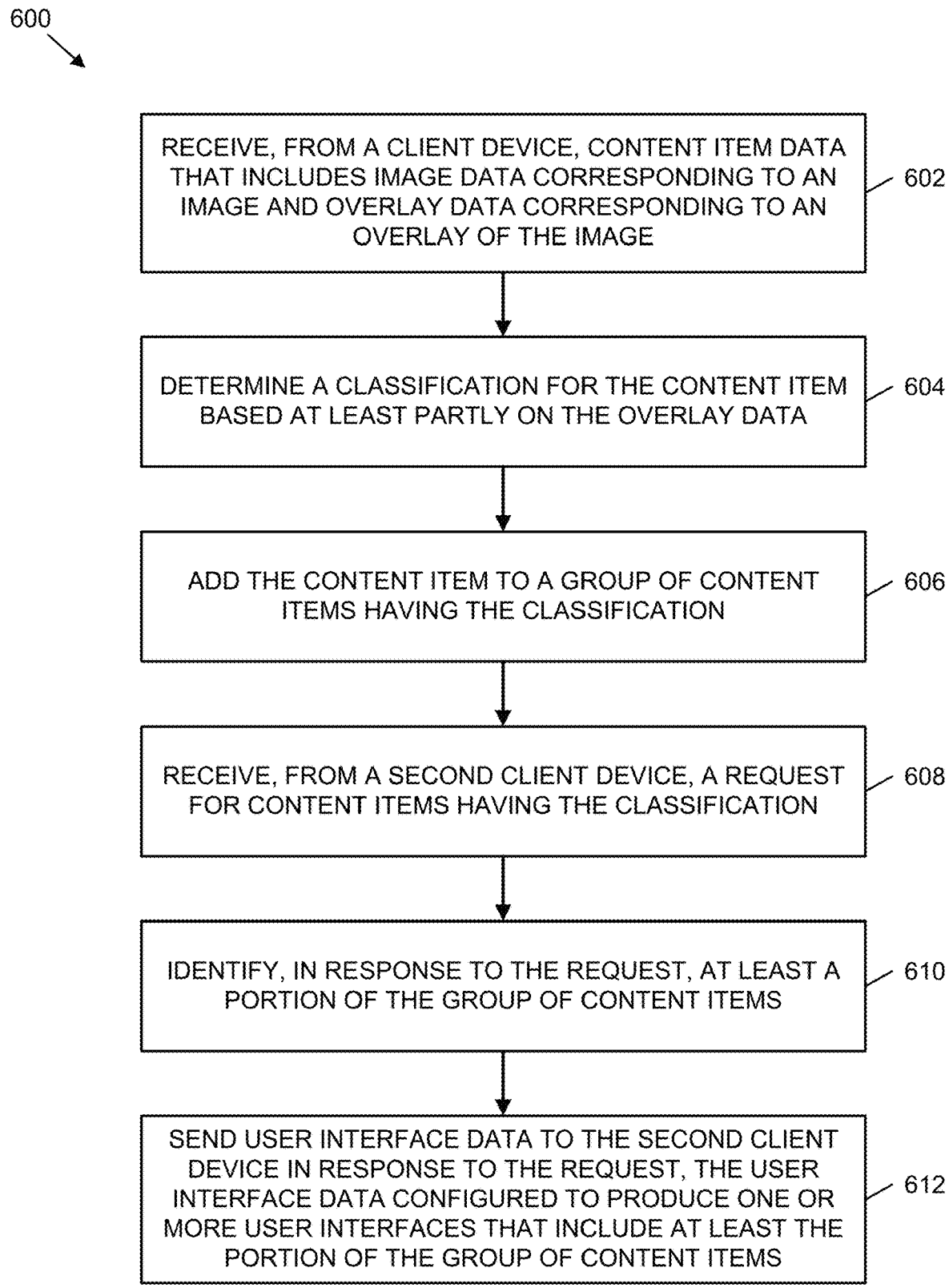
FIG. 6 is a flowchart illustrating example operations performed by a server system for content item classification based on data corresponding to overlays of content items, according to one or more example implementations

FIG. 6 is a flowchart illustrating example operations of a process 600 performed by a server system for content item classification based on data corresponding to overlays of content items, according to one or more example implementations. At operation 602, the process 600 includes receiving, from a client device, content item data. The content item data may be produced by an instance of a client application executed by the client device. In one or more implementations, the content item data may include image data corresponding to an image. The content item data may also include overlay data indicating an overlay of the image. In one or more examples, the image may be captured by at least one camera device of the client device in response to input of a user of the client device obtained via one or more user interfaces displayed by the client application. Additionally, the overlay may be produced by the input obtained from a user of the client application. The overlay may include text content that includes at least one of words, letter, symbols, or numbers that are related to the image. Further, the overlay may include content generated using one or more creative tools of the client application. To illustrate, the overlay may include artwork, drawings, illustrations, animations, or one or more combinations thereof, generated by a user of the client application.

The process 600 may also include, at operation 604, determining a classification for the content item based at least partly on the overlay data. The overlay data may be analyzed to identify classification identifiers that may be included in the overlay. In one or more examples, the overlay may include text data that indicates a classification identifier. Additionally, a classification of the overlay may be determined based on a creative tool used to produce the overlay. Further, a classification of the overlay may be determined based on an identifier of an overlay, such as a name of the overlay specified by a creator of the overlay. In various examples, the overlay may be associated with a location and a classification of the overlay may be determined based on the location.

In addition, at operation 606, the process 600 may include adding the content item to a group of content items having the classification. In one or more implementations, the content item may be stored in a database in association with the classification. In various examples, individual content items associated with the classification may be stored in association with an identifier of the classification. At operation 608, the process 600 may include receiving, from a second client device, a request for content items having the classification. For example, a request including an identifier of the classification may be received from an instance of the client application executed by the second client device.

The process 600 may include, at operation 610, identifying, in response to the request, at least a portion of the group of content items having the classification. In various examples, at least a portion of the group of content items having the classification may be retrieved from a database using an identifier of the classification. In one or more examples, the content items retrieved from the database having the classification may be ranked. The rankings for content items having the classification may be determined based on an analysis of characteristics of the content items having the classification in relation to characteristics of a user of the client application to determine content items having the classification that may have at least a threshold level of interest for the user. In one or more implementations, the ranking of a content item may be based at least partly on characteristics of a creator of the content item. To illustrate, creators of content items having a public profile with respect to the client application may be weighted in favor of relatively higher rankings than content items produced by creators that do not have public profiles in relation to the client application.

In additional implementations, a ranking of content items may be determined according to input provided by one or more representatives of a service provider that provides services in relation to the client application. For example, a representative of the service provider may indicate a level of interest of a content item with respect to one or more users of the client application. In these scenarios, a weighting of the content item with respect to other content items may be modified based on the input obtained from the representative of the service provider. In various examples, content items for which input is obtained from a representative of the service provider that indicates a relatively high level of interest may be ranked more highly than content items for which input from a representative of the service provider is not obtained. Further, input from a representative of a service provider may also indicate a lower level of interest for users of the client application, such as in situations where the content item includes content that may be inappropriate for users of the client application. In these situations, the content item may be ranked lower than content items for which service provider representative input is not obtained.

At operation 612, the process 600 may include sending user interface data to the second client device in response to the request. The user interface data may be configured to produce one or more user interfaces that include at least the portion of the content items. In various examples, the one or more user interfaces may display a page of content items that is dedicated to the classification. In one or more implementations, the content items may be presented in the user interface in relation to rankings of the content items having the classification. For example, content items having a relatively higher ranking with respect to the user of the second client device may be presented at a top portion of a page displayed in the user interface. To access content items having relatively lower rankings, a user of the second client device may scroll down the page.

Figure 7:
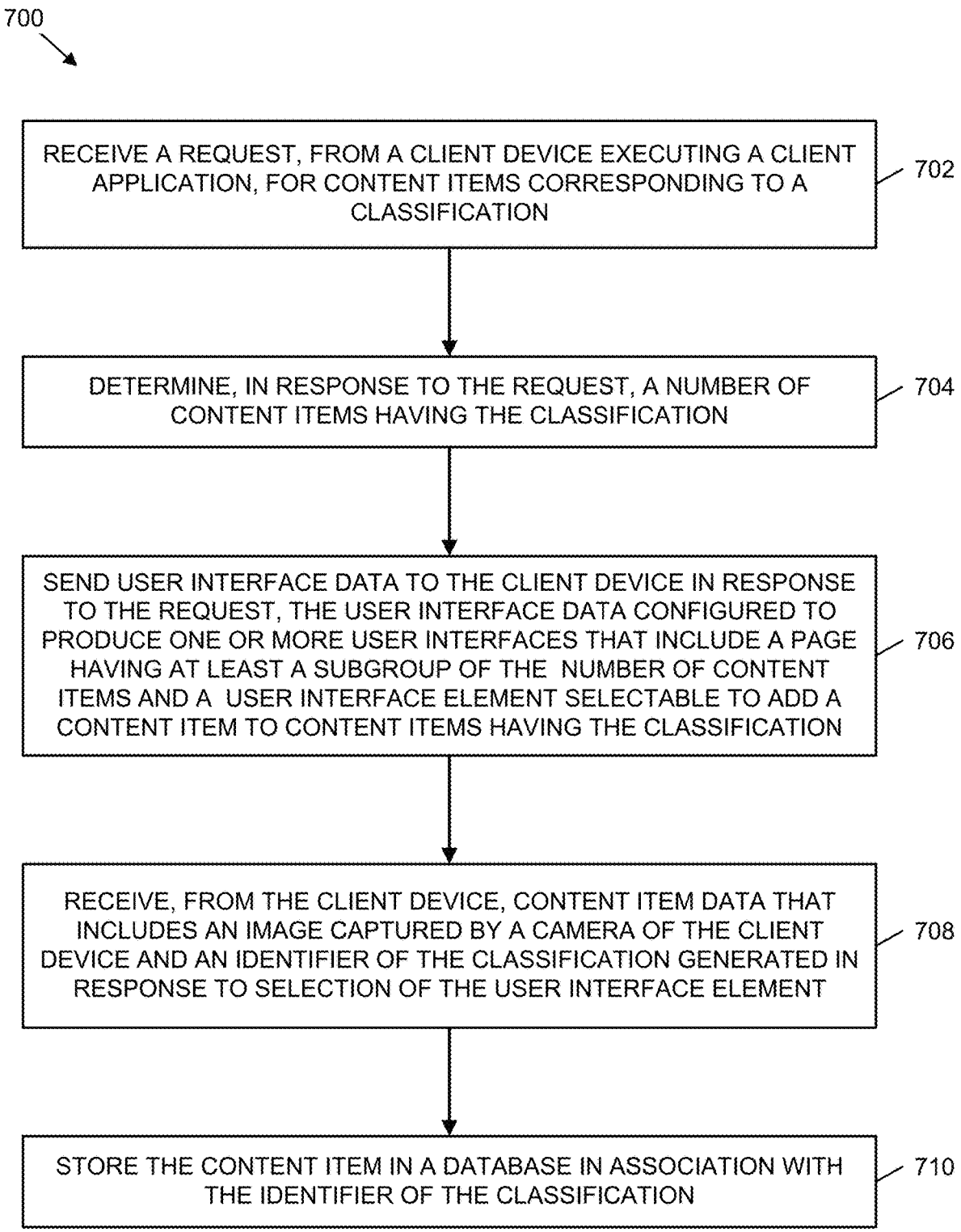
FIG. 7 is a flowchart illustrating example operations performed by a server system to add content to a classification from a page displaying content items associated with the classification, according to one or more example implementations.

FIG. 7 is a flowchart illustrating example operations of a process 700 performed by a server system to add content to a classification from a page displaying content items associated with the classification, according to one or more example implementations. The process 700 includes, at operation 702, receiving, from a client device executing a client application, a request for a number of content items having a classification. The request may include at least one of one or more keywords corresponding to the classification or an identifier of the classification. At operation 704, in response to the request, a number of content items having the classification may be determined. The number of content items may be retrieved from a database storing content items according to respective classifications of the content items. In various examples, a query to the database that includes at least one of the one or more keywords or the identifier of the classification may be used to retrieve the content items from the database. Additionally, rankings may be determined for the number of content items having the classification that indicate a level of interest of respective content items in relation to a user of the client device making the request.

Further, at operation 706, the process 700 may include sending user interface data to the client device in response to the request. The user interface data may be configured to produce one or more user interfaces that include a page having at least a subgroup of the number of content items having the classification. In one or more examples, a subgroup of content items displayed in the page may have rankings that are higher than rankings of additional content items that are not included in the page. In addition, the one or more user interfaces may include a user interface element that is selectable to add a content item to content items having the classification. In one or more implementations, selection of the user interface element may cause at least one camera of the client device to become active. The at least one camera may be used to capture an image that is included in the content item. Further, due to the image being captured in relation to selection of the user interface element that is included in a page dedicated to content items having a respective classification, the classification may also be associated with the content item that includes the image.

At operation 708, the process 700 may include receiving, from the client device, content item data that includes the image captured by a camera of the client device. The content item data may also indicate an identifier of the classification. The process 700 may also include, at operation 710, storing the content item in a database in association with the identifier of the classification. In this way, the content item may be retrieved in association with the classification identifier in response to subsequent requests for content items having the classification. In one or more implementations, the content item may include an overlay that is produced using one or more creative tools of the client application.

Figure 8:
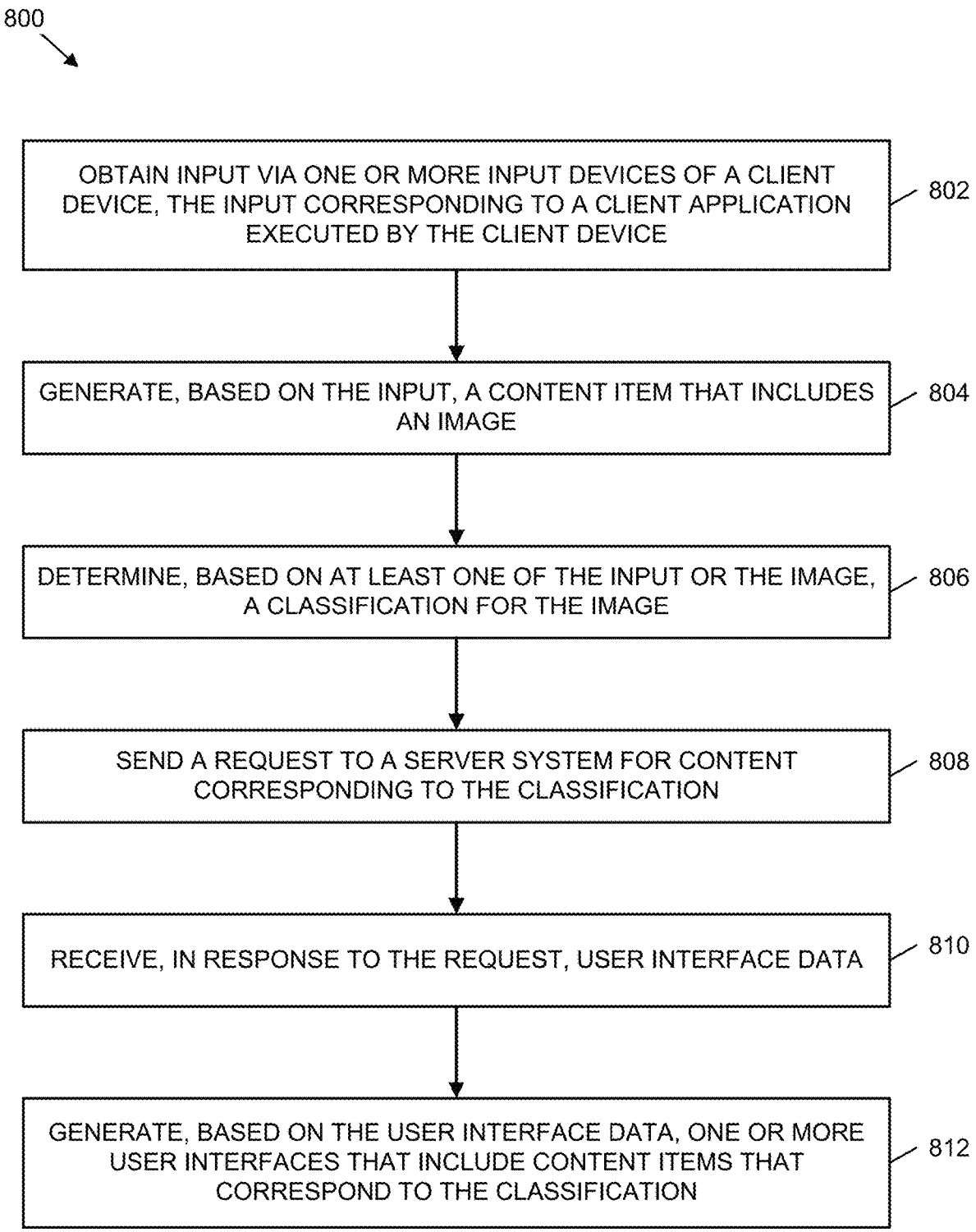
FIG. 8 is a flowchart illustrating example operations performed by a client device to generate content items that are accessible based on classification, according to one or more example implementations.

FIG. 8 is a flowchart illustrating example operations of a process 800 performed by a client device to generate content items that are accessible based on respective classifications of the content items, according to one or more example implementations. The process 800 may include, at operation 802, obtaining input via one or more input devices of a client device. The input may be provided in conjunction with an instance of a client application that is executed by the client device. In various examples, the input may be directed to capturing an image using at least one camera of the client device. The image may be captured using one or more user interface elements that are displayed in at least one user interface of the client application. The input may also be directed to producing one or more annotations. In various examples, the annotations may be produced using one or more creative tools of the client application. Further, the input may be directed to selection of one or more classification identifiers.

At operation 804, the process 800 may include generating, based on the input, a content item that includes an image. In addition to the image, the content item may include one or more annotations related to the image. The one or more annotations may include at least one overlay that is displayed atop the image. The at least one overlay may include text content. In various examples, the at least one overlay may include content produced using the one or more creative tools of the client application. Further, at operation 806, the process 800 may include determining, based on at least one of the input or the image, a classification for the image. The classification of the image may be determined according to input indicating at least one identifier of the classification. In various examples, the classification may also be determined based on an overlay of the image. In one or more implementations, the classification may be determined according to at least one of objects or individuals included in the image.

The process 800 may include, at operation 808, sending a request to a server system for content corresponding to the classification. The request may include an identifier of the classification. In one or more examples, the request may be generated and sent in response to selection of a user interface element that is displayed in a user interface that includes a number of selectable user interface elements with each user interface element corresponding to a respective classification. Additionally, the process 800 may include, at operation 810, receiving, in response to the request, user interface data and, at operation 812, the process 800 may include generating, based on the user interface data, one or more user interfaces that include content items that correspond to the classification. In one or more illustrative examples, the one or more user interfaces may include a number of images that correspond to the content items. The content items may be ranked such that content items having a greater level of interest for a user of the client device may be displayed at a top of a page included in the one or more user interfaces with content items having a lower level of interest being displayed at a bottom of the page. In one or more implementations, the one or more user interfaces may include at least one content item created by a user of the client device.

Figure 9:
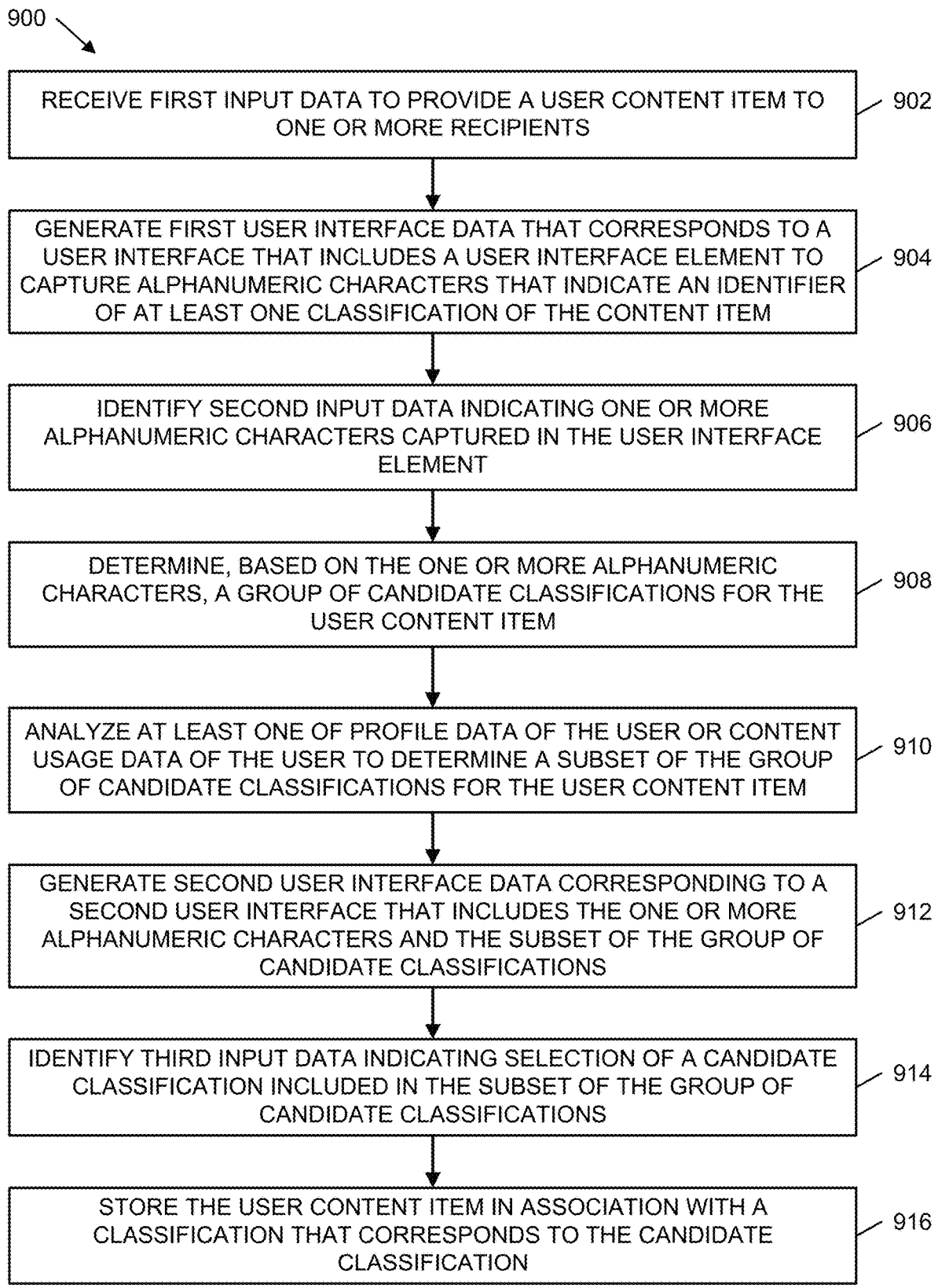
FIG. 9 is a flowchart illustrating example operations to determine recommendations for classifications of content items based on user input and at least one of user profile data or classification usage data, according to one or more example implementations.

FIG. 9 is a flowchart illustrating example operations of a process 900 to determine recommendations for classifications of content items based on user input and at least one of user profile data or classification usage data, according to one or more example implementations. The process 900 can include, at operation 902, receiving first input data to provide a content item to one or more recipients. The content item can include at least one of image content, video content, or audio content captured via a client application. In various examples, an instance of the client application may be executed by a client device of a user of the client application. In one or more examples, the content item may be associated with an account of the user of the client application. The content item may be captured using one or more input devices of the client device, such as at least one of a camera or microphone. The content item may be displayed in a user interface of the client application. The user interface may include a user interface element that is selectable to request that the content item is sent to one or more recipients. In one or more illustrative examples, the one or more recipients may include one or more additional users of the client application. In one or more additional illustrative examples, the one or more recipients may include a repository of content items that corresponds to a classification of content items. In these scenarios, a number of content items having a same or similar classification may be stored with a common identifier and accessed by users of the client application.

In addition, at operation 904, the process 900 can include generating first user interface data that corresponds to a first user interface. The first user interface may include a user interface element to capture alphanumeric characters that indicate an identifier of at least one classification of the content item. The first user interface may also include a display of a keyboard or other alphanumeric character entry device that may be used to select alphanumeric characters related to the at least one classification of the content item. The process 900 can also include, at operation 906, identifying second input data indicating one or more alphanumeric characters captured in the user interface element.

Further, at operation 908, the process 900 can include determining, based on the one or more alphanumeric characters, a group of candidate classifications for the content item. In various examples, a similarity metric may be determined with respect to the one or more alphanumeric characters entered into the user interface element and alphanumeric characters of a number of candidate classifications. In one or more examples, the group of candidate classifications may have at least a threshold similarity metric with respect to the one or more alphanumeric characters entered into the user interface element. In one or more illustrative examples, the similarity metric may be determined according to a number of the one or more alphanumeric characters entered into the user interface element that correspond to alphanumeric characters of candidate classifications. In one or more additional illustrative examples, the similarity metric may be determined according to an order of the one or more alphanumeric characters entered into the user interface element with respect to alphanumeric characters of the classifications. For example, the similarity metric may be determined based on a number of the one or more alphanumeric characters entered into the user interface element that match corresponding alphanumeric characters of the candidate classifications of the content item.

At operation 910, the process 900 can include analyzing at least one of profile data of the user or content usage data of the user to determine a subset of the group of candidate classifications for the content item. In one or more examples, candidate classifications having a similarity metric that satisfies one or more criteria may be included in the subset of the group of candidate classifications. The one or more criteria may correspond to a threshold similarity metric that indicates a number of the one or more alphanumeric characters entered into the user interface element that are the same as one or more alphanumeric characters of the candidate classifications. In various examples, the threshold similarity metric may also indicate a that an order in which the one or more alphanumeric characters entered into the user interface element corresponds to an order of alphanumeric characters of the classifications.

In one or more additional examples, frequency of use of classifications may be used to determine the subset of the group of candidate classifications from among a larger group of candidate classifications. For example, a number of selections by users of the client application over a period of time may be determined for individual classifications that users have associated with respective content items. The number of times that a classification is selected to be associated with content items over a period of time may correspond to the frequency of use of the classification. In one or more examples, classifications having at least at threshold frequency of use may be included in the subset of the group of candidate classifications.

In various examples, classifications of additional content items viewed by the user of the client application within a period of time may be used to determine the subset of the group of candidate classifications for the content item. To illustrate, classifications of additional content items viewed within a threshold period of time from a current time may be determined. In this way, classifications of content item recently viewed by the user of the client application may be used to determine at least a portion of the subset of the group of candidate classifications.

In one or more further examples, classifications of content items previously selected by the user of the client application with respect to additional content items of the user may be determined. In one or more illustrative examples, one or more classifications previously selected by the user of the client application with respect to additional content items of the user may be identified. The classifications of content items selected by the user of the client application may be used to determine at least a portion of the subset of the group of candidate classifications.

In one or more illustrative examples, the subset of the group of candidate classifications may be determined according to a combination of the frequency of use of the classifications, classifications recently selected by the user of the client application, classifications corresponding to additional content items viewed by the user of the client application, and similarity metrics between the candidate classifications and alphanumeric characters entered by the user of the client application in relation to at least one classification for the content item. In one or more additional illustrative examples, a ranked list may be determined that includes at least a portion of the subset of the group of candidate classifications. The ranked list may be determined based on one or more criteria, such as an amount of similarity between a number of alphanumeric characters of the group of candidate classifications and the one or more alphanumeric characters captured in the user interface element and an order of the number of alphanumeric characters of the group of candidate classifications and the one or more alphanumeric characters captured in the user interface element. The ranked list may also be determined based on a frequency of use of the classifications by a number of additional users of the client application, a period of time elapsed between selection of a respective classification by the user of the client application and a current time, or a number of views of content items associated with one or more respective classifications by the user of the client application. In various example, the ranked list of candidate classifications may be displayed in an order of the ranked list in the second user interface.

Additionally, the process 900 can include, at operation 912, generating second user interface data corresponding to a second user interface that includes the one or more alphanumeric characters and the subset of the group of candidate classifications. In one or more examples, a number of the one or more alphanumeric characters may be determined and analyzed with respect to a threshold number of alphanumeric characters. In response to the number of alphanumeric characters satisfying the threshold number of alphanumeric characters, the subset of the group of candidate classifications may be displayed in the second user interface. In various examples, a category of the individual classifications displayed in the user interface may also be displayed. Illustrative examples of the category may include "Recently Used," "Trending," "Popular," "Recently Viewed," and the like. Further, a number of content items that correspond to the respective classifications displayed in the second user interface may also be displayed.

The process can include, at operation 914, identifying third input data indicating selection of a candidate classification included in the subset of the group of candidate classifications. Also, at operation 916, the process 900 can include storing the content item in association with a classification that corresponds to the candidate classification. In this way, the content item may be viewed by additional users of the client application in response to requests by the additional users to access user content that corresponds to the classification.

Figure 10:
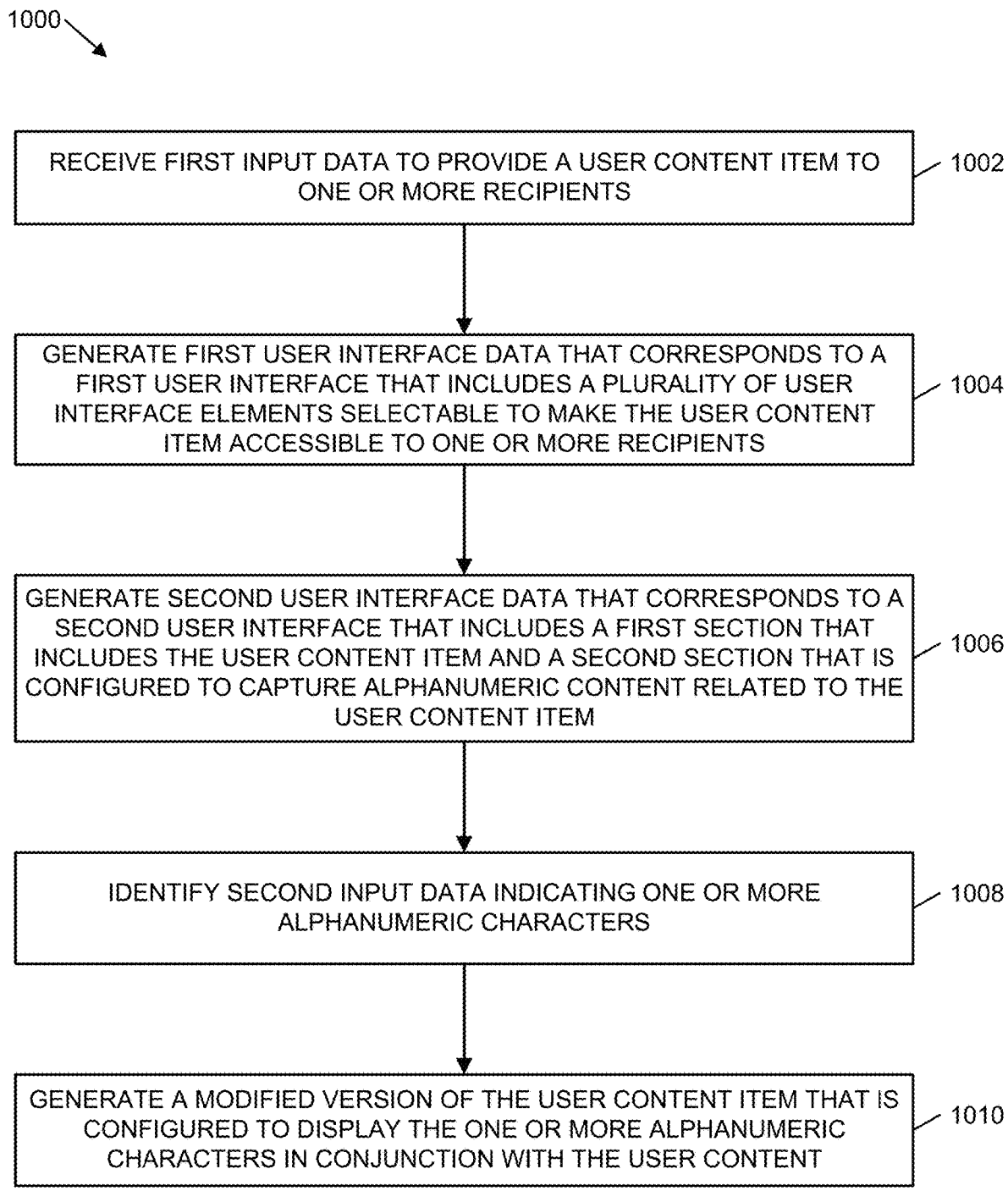
FIG. 10 is a flowchart illustrating example operations to generate modified user content that includes addition alphanumeric content, according to one or more example implementations.

FIG. 10 is a flowchart illustrating example operations of a process 1000 to generate modified user content that includes addition alphanumeric content, according to one or more example implementations. The process 1000 can include, at operation 1002, receiving first input data to provide a content item to one or more recipients. The content item can include user content comprising at least one of image content, video content, or audio content captured via a client application. In various examples, an instance of the client application may be executed by a client device of a user of the client application. In one or more examples, the content item may be associated with an account of the user of the client application. The user content of the content item may be captured using one or more input devices of the client device, such as at least one of a camera or microphone. The content item may be displayed in a user interface of the client application. The user interface may include a user interface element that is selectable to request that the content item is sent to one or more recipients. In one or more illustrative examples, the one or more recipients may include one or more additional users of the client application. In one or more additional illustrative examples, the one or more recipients may include at least one of a repository of content items or a content collection that corresponds to a classification of content items. In these scenarios, a number of content items having a same or similar classification may be stored with a common identifier and accessed by users of the client application.

In addition, at 1004, the process 1000 may include generating first user interface data that corresponds to a first user interface that includes a plurality of user interface elements selectable to make the content item accessible to one or more recipients. In one or more examples, the one or more recipients may include additional users of the client application that are contacts of the user within the client application. In one or more additional examples, the one or more recipients may include one or more repositories of content items that are accessible to additional users of the client application that are not contacts of the user within the client application. In various examples, the one or more repositories may be associated with one or more classifications of content items.

At 1006, the process 1000 may include generating second user interface data that corresponds to a second user interface. The second user interface may include a first section that includes the user content of the content item. The second user interface may also include a second section that is configured to capture alphanumeric content or other content related to the content item. In this way, at least one of text content, image content, animation content, video content, or one or more additional annotations related to the user content may be added to the content item. Further, at 1008, the process 1000 may include identifying input data indicating one or more alphanumeric characters. In various examples, the alphanumeric characters may be entered via a user input device, such as a keyboard touchscreen display. The alphanumeric characters may correspond to at least one of a description related to the content item, a message, a social media post, or one or more additional forms of text content. Additionally, the alphanumeric characters may indicate one or more classifications related to the content item. In one or more examples, as the alphanumeric input is being captured, the content item and the text content related to the content item may be displayed as an overlay with respect to a user interface that displays a number of recipients for the content item. The second user interface may also include one or more candidate classifications for the content item based on the alphanumeric input.

The process 1000 may also include, at operation 1010, generating a modified version of the content item that is configured to display the one or more alphanumeric characters in conjunction with the user content. In this way, additional users of the client application that are not contacts of the user within the client application may access the content item. In one or more examples, the modified version of the content item may be stored in a content collection that is curated by an entity that at least one of maintains, controls, or updates the client application. Additionally, the content items included in the content collection may be created by a specified group of content creators. That is, the group of content creators that are enabled to provide content items to the content collection is limited by the entity. Further, although restrictions may be present with respect to content creators that provide content items to the content collection, access to the content collection may be unrestricted. To illustrate, at least substantially all of the users of the client application may have access to the content collection. In one or more illustrative examples, the content collection may be a highlighted content collection that includes content items that are intended to be highlighted or otherwise promoted by the entity that at least one of maintains, controls, or updates the client application.

In one or more illustrative examples, additional users of the client application may access the content item and the corresponding text content by selection of the highlighted content collection within the client application. In various examples, one or more classifications may be associated with the content item. In these scenarios, in response to an additional user accessing the content item, at least one of image or video content of the content item may be displayed in an additional user interface. Further, the one or more classifications may also be displayed. In at least some scenarios, a truncated version of the content item may be displayed. The truncated version of the content item may include user content of the content item, such as image content, and a portion of text content of the content item. The truncated version may also include the one or more classifications of the content item. Further, the truncated version of the content item may indicate one or more augmented reality content items applied to user content of the content item.

Additionally, the truncated version may also include at least a portion of the additional content, such as text content, of the content item. To illustrate, the truncated version of the content item may include user content of the content item and a portion of text content of the content item. In one or more scenarios, the portion of the text content may include only one or more classifications related to the content item. The remainder of the text content may be displayed in response to selection of a user interface element to display a full version of the content item that includes the entire content item. In one or more additional examples, the truncated version of the content item may display a threshold number of words of the text content in addition to the user content. The threshold number of words may include one or more classifications of the content item. In these situations, the remainder of the text content may be displayed in response to selection of a user interface element to display the entire content item. The entire content item may include the user content, additional content, such as text content, identifiers of one or more augmented reality content items applied to the user content, and identifiers of one or more classifications included in the text content. The identifiers of the one or more augmented reality content items or the one or more classifications may be selectable to access the one or more augmented reality content items or a content collection related to the one or more classifications. The truncated version of the content item may be provided to an additional user of the client application based on a screen size of a client device displaying content of the client application. Additionally, the truncated version of the content item may be provided to an additional user of the client application based on at least one of network resources or computing resources of a client device displaying content of the client application.

In one or more examples, the one or more alphanumeric characters may include a classification of content items. In various examples, based on the one or more alphanumeric characters, a group of candidate classifications for the content item may be determined. In various examples, a similarity metric may be determined with respect to the one or more alphanumeric characters entered into the user interface element and alphanumeric characters of a number of candidate classifications. For example, the group of candidate classifications may have at least a threshold similarity metric with respect to the one or more alphanumeric characters included in the second input data. In one or more illustrative examples, the similarity metric may be determined according to a number of the one or more alphanumeric characters of the second input data that correspond to alphanumeric characters of candidate classifications. In one or more additional illustrative examples, the similarity metric may be determined according to an order of the one or more alphanumeric characters of the second input data with respect to alphanumeric characters of the classifications. For example, the similarity metric may be determined based on a number of the one or more alphanumeric characters of the second input data that match corresponding alphanumeric characters of the candidate classifications of the content item.

In various examples, a subset of the group of candidate classifications for the content item may be determined. The subset of the group of candidate classifications may be determined by analyzing at least one of profile data of the user or content usage data of the user. In one or more examples, candidate classifications having a similarity metric that satisfies one or more criteria may be included in the subset of the group of candidate classifications. The one or more criteria may correspond to a threshold similarity metric that indicates a number of the one or more alphanumeric characters of the second input data that are the same as one or more alphanumeric characters of the candidate classifications. In various examples, the threshold similarity metric may also indicate that an order in which the one or more alphanumeric characters entered into the user interface element corresponds to an order of alphanumeric characters of the classifications.

In one or more additional examples, frequency of use of classifications may be used to determine the subset of the group of candidate classifications from among a larger group of candidate classifications. For example, a number of selections by users of the client application over a period of time may be determined for individual classifications that users have associated with respective content items. The number of times that a classification is selected to be associated with content items over a period of time may correspond to the frequency of use of the classification. In various examples, classifications having at least at threshold frequency of use may be included in the subset of the group of candidate classifications.

In one or more examples, classifications of additional content items viewed by the user within a period of time may be used to determine the subset of the group of candidate classifications for the content item. To illustrate, classifications of additional content items viewed within a threshold period of time from a current time may be determined. In this way, classifications of content item recently viewed by the user may be used to determine at least a portion of the subset of the group of candidate classifications.

In one or more further examples, classifications of content items previously selected by the user with respect to additional content items of the user may be determined. In one or more illustrative examples, one or more classifications previously selected by the user to associate with respect to additional content items of the user may be identified. The classifications of content items selected by the user of the client application may be used to determine at least a portion of the subset of the group of candidate classifications.

In one or more illustrative examples, the subset of the group of candidate classifications may be determined according to a combination of the frequency of use of the classifications, classifications recently selected by the user, classifications corresponding to additional content items viewed by the user, and similarity metrics between the candidate classifications and alphanumeric characters entered by the user in relation to at least one classification for the content item. In one or more additional illustrative examples, a ranked list may be determined that includes at least a portion of the subset of the group of candidate classifications. The ranked list may be determined based on one or more criteria, such as an amount of similarity between a number of alphanumeric characters of the group of candidate classifications and the one or more alphanumeric characters included in the second input data and an order of the number of alphanumeric characters of the group of candidate classifications and the one or more alphanumeric characters of the second input data. The ranked list may also be determined based on a frequency of use of the classifications by a number of additional users of the client application, a period of time elapsed between selection of a respective classification by the user and a current time, or a number of views of content items associated with one or more respective classifications by the user. In various example, the ranked list of candidate classifications may be displayed in an order of the ranked list in the second user interface.

Figure 11:
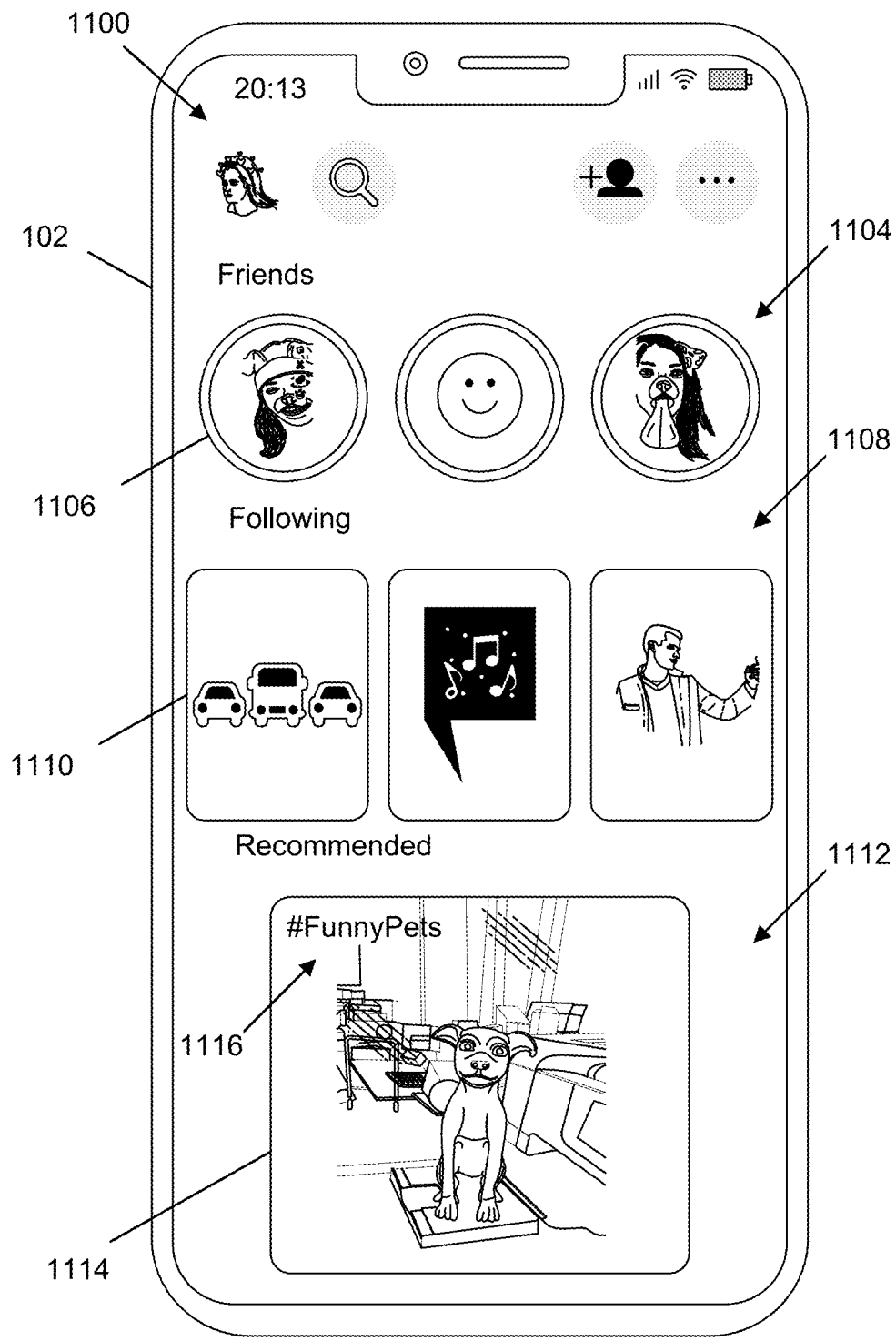
FIG. 11 is an illustration of a user interface that includes content associated with a classification, according to one or more example implementations.

FIG. 11 is an illustration of a user interface 1100 that includes content associated with a classification, according to one or more example implementations. The user interface 1100 may be displayed by a display device of a client device 102. In addition, the user interface 1100 may be displayed in conjunction with a client application executed by the client device 102, such as the client application 104 described with respect to FIG. 1. The user interface 1100 may include a first section 1104 that includes user interface elements that are selectable to view content related to contacts of a user of a client application. For example, the first section 1104 may include a first user interface element 1106 that is selectable to view content related to a contact of the user. The content related to contacts of the user may include at least one of text content, image content, message content, video content, audio content, content produced by one or more creative tools, or annotation content.

The user interface 1100 may also include a second section 1108 that includes user interface elements that are selectable to access content related to one or more individuals, one or more groups of individuals, or one or more organizations that the user of the client device 102 is following using the client application. The user may be following an individual, group, or organization by subscribing to content that is produced by or otherwise published by the individual, group, or organization. In the illustrative example of FIG. 11, the second section 1108 may include a second user interface element 1110 that is selectable to view content related to an individual, group, or organization that corresponds to the second user interface element 1110.

Additionally, the user interface 1100 may include a third section 1112 that includes one or more user interface elements that may be selectable to view content that is recommended for a user of the client device 102 in relation to the client application. In one or more examples, content included in the third section 1112 may have a predicted level of interest for the user. The predicted level of interest may be determined by a server system based on an analysis of characteristics of the user in relation to characteristics of a number of content items. In one or more examples, the third section 1112 may include a third user interface element 1114 that is selectable to view content related to the image displayed by the third user interface element 1114. In various examples, the third user interface element 1114 may indicate an identifier 1116 of a classification associated with content displayed by the third user interface element 1114. In one or more implementations, the content included in the third section 1112 may correspond to one or more classifications that are related to content produced by the user of the client application. To illustrate, a server system may determine that content having a classification that is the same or similar to a classification of content produced by the user may have at least a threshold level of interest for the user. In the illustrative example of FIG. 11, the user of the client application may have previously generated content that is related to the classification "FunnyPets". Accordingly, the server system may determine that additional content related to the classification "FunnyPets" may have at least a threshold level of interest for the user and include content items corresponding to the classification "FunnyPets" in the third section 1112.

Figure 12:
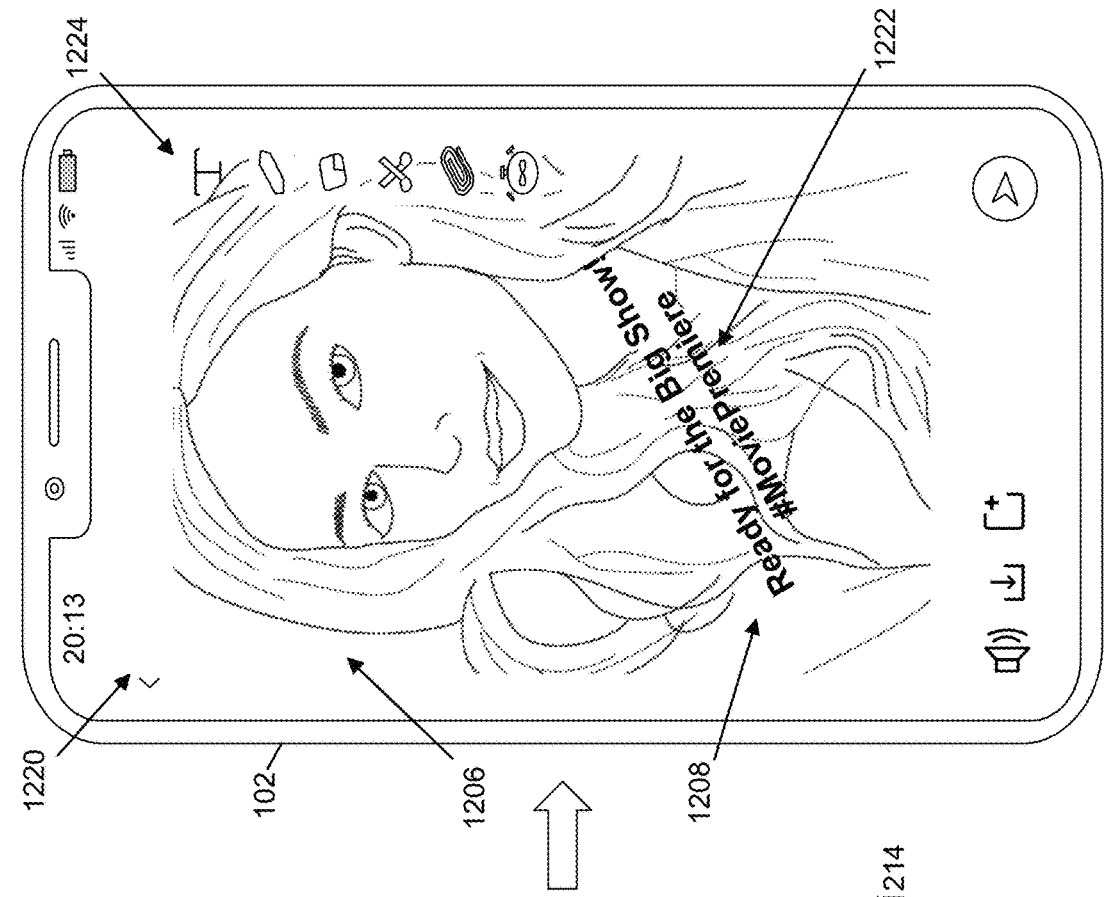
FIG. 12 is an illustration of a user interface to add a classification to content based on text input, according to one or more example implementations.
Figure 12:
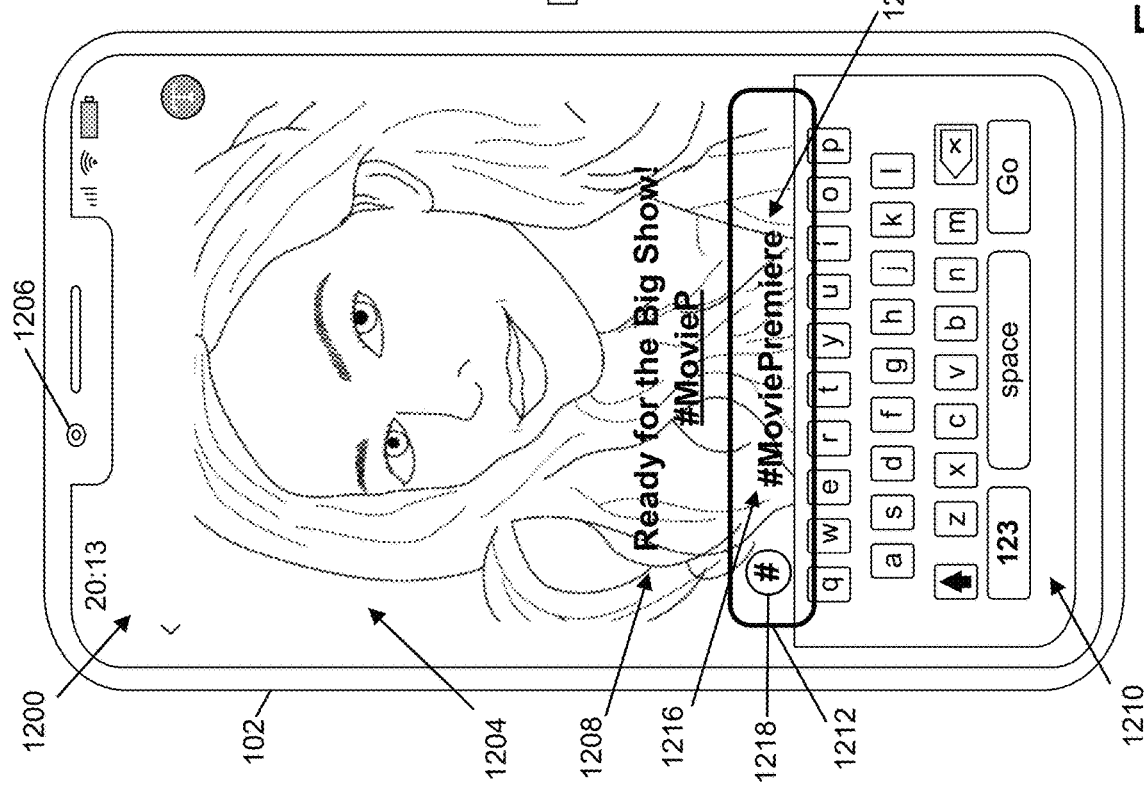

FIG. 12 is an illustration of a user interface 1200 to add a classification to content based on text input, according to one or more example implementations. The user interface 1200 may be displayed by a display device of a client device 102. In addition, the user interface 1200 may be displayed in conjunction with a client application executed by the client device 102, such as the client application 104 described with respect to FIG. 1. The user interface 1200 may include an image 1204. The image 1204 may have been captured using at least one camera of the client device 102, such as a camera 1206. The user interface 1200 may also include an overlay 1208 displayed atop the image 1204. In the illustrative example of FIG. 12, the overlay 1208 includes text content. The text content of the overlay 1208 may be entered via a keyboard input device 1210 included in the user interface 1200.

In various examples, the keyboard input device 1210 may be used to enter an identifier of a classification that may be related to at least one of the image 1204 or the overlay 1208. For example, the user interface 1200 may include a user interface element 1212 that may display text 1214 that is directed to a classification of at least one of the image 1204 or the overlay 1208. In one or more illustrative examples, the text 1214 may include a symbol 1216 that may indicate that the text 1214 is related to a classification for at least one of the image 1204 or the overlay 1208. In one or more implementations, selection of an additional user interface element 1218 may cause the user interface element 1212 to be displayed such that a user of the client device 102 may enter at least one of the text 1214 or the symbol 1216 using the keyboard input device 1210 to indicate an identifier of a classification for at least one of the image 1204 or the overlay 1208. FIG. 12 also includes an additional user interface 1220 corresponding to an additional version of the user interface 1200 that includes a final version of the overlay 1208 that includes an identifier 1222 of a classification corresponding to at least one of the image 1204 of the overlay 1208. The final version of the overlay 1208 may also include text in addition to the identifier 1222. Further, the additional user interface 1220 may include a number of user interface elements 1224 that are selectable to activate one or more creative tools to generate one or more additional overlays for the image 1204.

Figure 13:
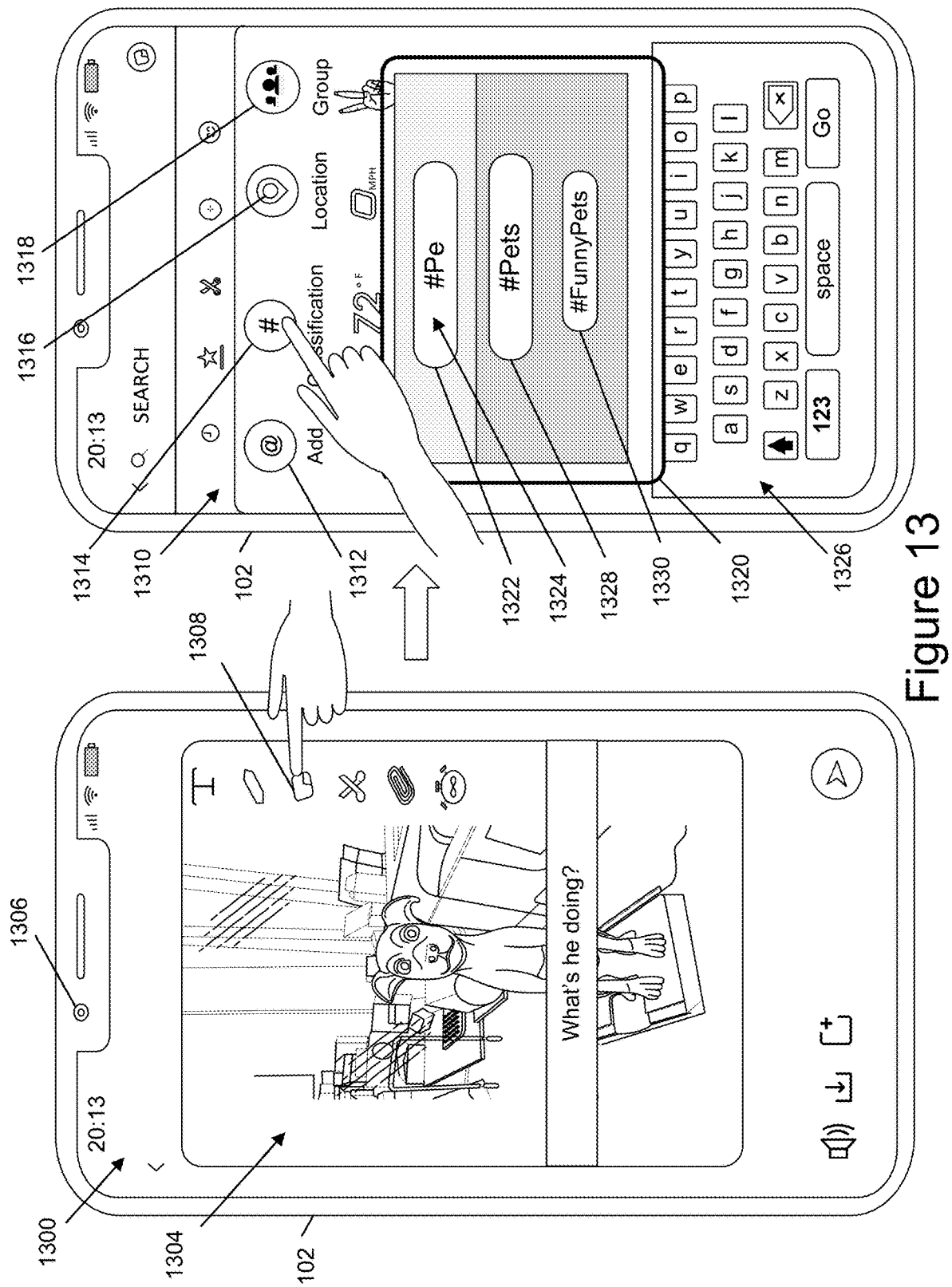
FIG. 13 is an illustration of a user interface to add a classification to content using a creative tool, according to one or more example implementations.

FIG. 13 is an illustration of a user interface 1300 to add a classification to content using a creative tool, according to one or more example implementations. The user interface 1300 may be displayed by a display device of a client device 102. In addition, the user interface 1300 may be displayed in conjunction with a client application executed by the client device 102, such as the client application 104 described with respect to FIG. 1. The user interface 1300 may include an image 1304. The image 1304 may have been captured using at least one camera of the client device 102, such as a camera 1306. The user interface 1300 may also include a number of user interface elements that may be selectable to perform one or more operations with respect to the image 1304. In various examples, the user interface 1300 may include one or more user interface elements to modify an appearance of the image 1304. For example, the user interface 1300 may include a user interface element 1308 to generate an overlay for the image 1304.

In one or more illustrative examples, selection of the user interface element 1308 may cause the client device 102 to generate an additional user interface 1310. The additional user interface 1310 may include a number of user interface elements that are selectable to add a number of different types of overlays with respect to the image 1304. To illustrate, the additional user interface 1310 may include a first user interface element 1312 that is selectable to mention an additional user within an overlay of the image 1304, such as by adding an identifier of the user as an overlay of the image 1304. The additional user interface 1310 may include a second user interface element 1314 that may be selectable to add a classification identifier as an overlay to the image 1304. Further, the additional user interface 1310 may include a third user interface element 1316 that is selectable to add an overlay to the image 1304 that indicates a location that may be related to the image 1304. Additionally, the additional user interface 1310 may include a fourth user interface element 1318 to add an overlay of the image 1304 that includes an identifier of a group.

In the illustrative example of FIG. 13, selection of the second user interface element 1314 may cause a first additional user interface element 1320 to be displayed. The first additional user interface element 1320 may include a second additional user interface element 1322 that may be used to capture text 1324 that corresponds to an identifier of a classification. The additional user interface 1310 may also include a touch input device keyboard 1326 that includes user interface elements that are selectable to add letters, numbers, symbols, or characters to the text 1324. In various examples, as letters, numbers, symbols, or characters are added to the text 1324 via the touch input device keyboard 1326, recommendations for identifiers for classifications may be displayed in the first additional user interface element 1320. For example, the first additional user interface element 1320 may include a third additional user interface element 1328 that includes a first recommendation for a classification identifier based at least partly on the text 1324 included in the second additional user interface element 1322. Further the first additional user interface element 1320 may include a fourth additional user interface element 1330 that includes a second recommendation for another classification identifier based at least partly on the text 1324 included in the second additional user interface element 1322.

Figure 14:
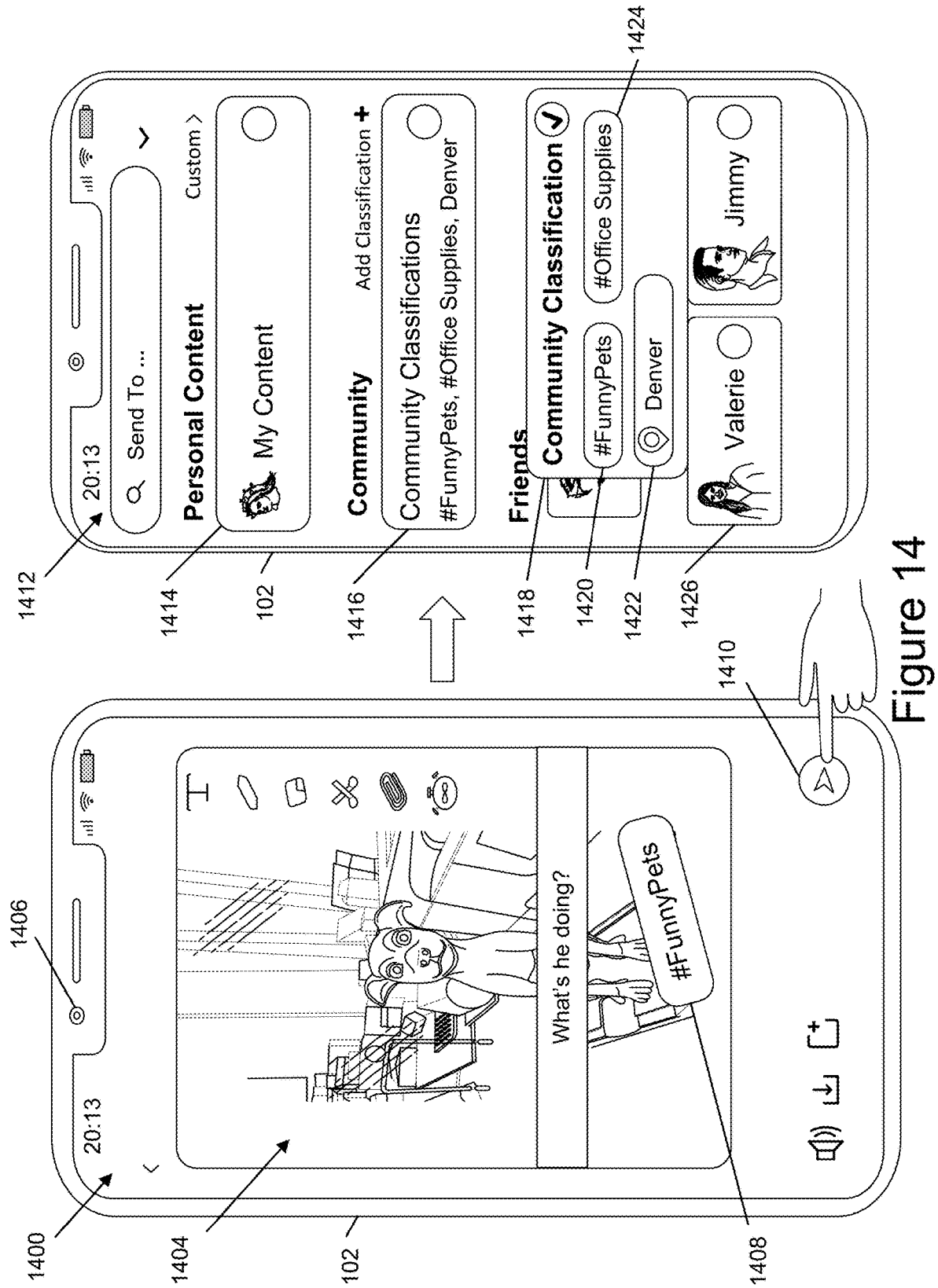
FIG. 14 is an illustration of a user interface to add a classification to content in relation to sharing the content, according to one or more example implementations.

FIG. 14 is an illustration of a user interface 1400 to add a classification to content in relation to sharing the content, according to one or more example implementations. The user interface 1400 may be displayed by a display device of a client device 102. In addition, the user interface 1400 may be displayed in conjunction with a client application executed by the client device 102, such as the client application 104 described with respect to FIG. 1. The user interface 1400 may include an image 1404. The image 1404 may have been captured using at least one camera of the client device 102, such as a camera 1406. The user interface 1400 may include an overlay 1408 that indicates an identifier of a classification of the image 1404. Further, the user interface 1400 may include a user interface element 1410 that is selectable to cause the client application 104 to generate an additional user interface 1412.

The additional user interface 1412 may include a number of user interface elements that are selectable to identify one or more recipients of a content item including the image 1404 and the overlay 1408. For example, the additional user interface 1412 may include a first additional user interface element 1414 to add the image 1404 and the overlay 1408 to a personal collection of the user that captured the image 1404 using the camera 1406. The additional user interface 1412 may also include a second additional user interface element 1416 that indicates a number of classifications that may correspond to the image 1404. Selection of the second additional user interface element 1416 may cause the image 1404 and the overlay 1408 to be associated with the classifications indicated by the second additional user interface element 1416.

In addition, the additional user interface 1412 may include a third additional user interface element 1418 that includes a fourth additional user interface element 1420, a fifth additional user interface element 1422, and a sixth additional user interface element 1426. The fourth additional user interface element 1420 may correspond to text of the overlay 1408. The fifth additional user interface element 1422 may correspond to a location associated with the image 1404 and the sixth additional user interface element 1426 may correspond to one or more objects included in the image 1404. Each of the additional user interface elements 1420, 1422, 1424 may be selectable to remove the corresponding classification from the second additional user interface element 1416. To illustrate, selection of the sixth additional user interface element 1426 may remove the classification "Office Supplies" from the second additional user interface element 1416. Further, the additional user interface 1412 may include at least a seventh additional user interface element 1426 that is selectable to share a content item including the image 1404 and the overlay 1408 with a contact of a user of the client device 102.

Figure 15:
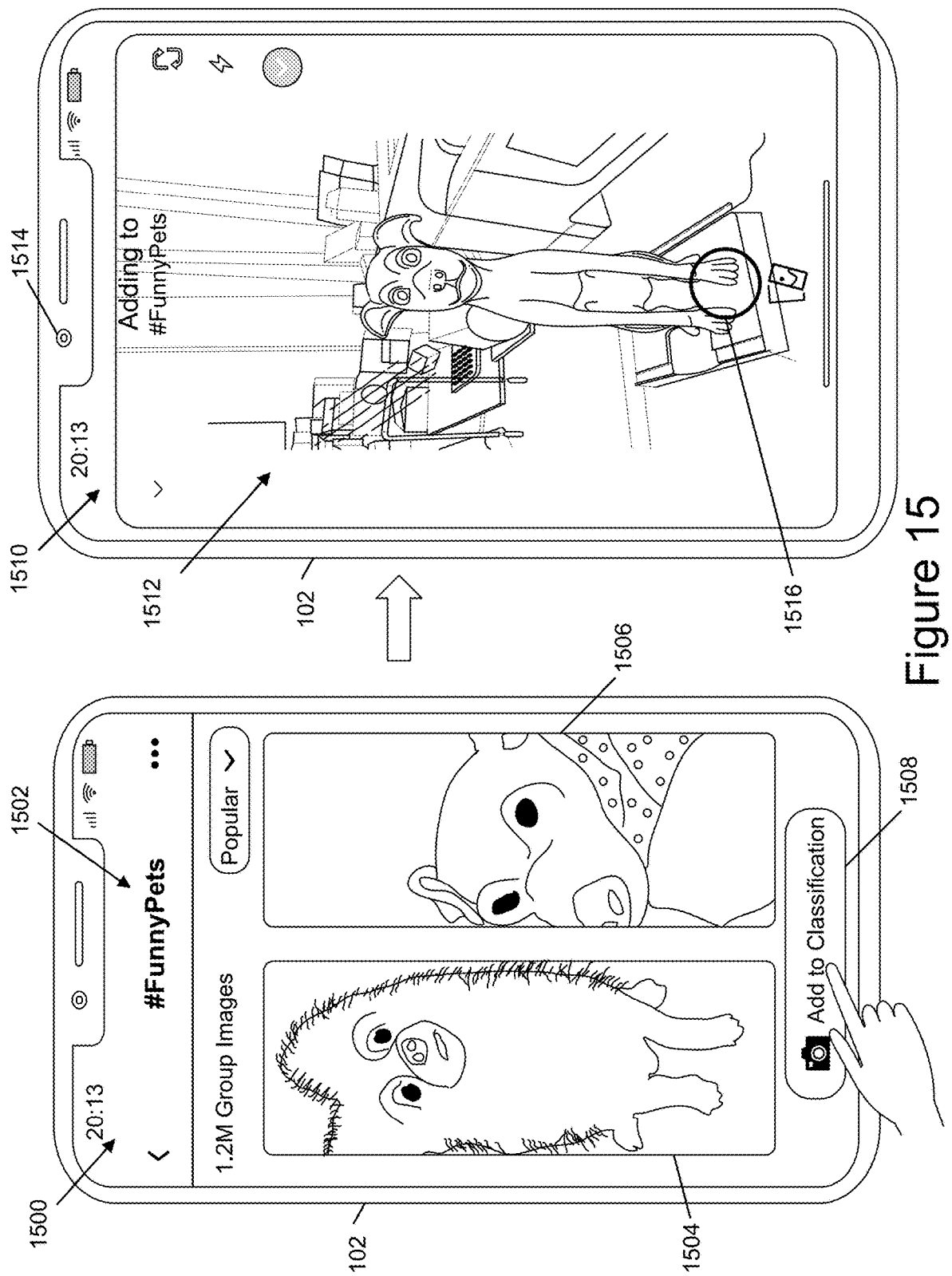
FIG. 15 is an illustration of a user interface to add content to a collection of content having a classification, according to one or more example implementations.

FIG. 15 is an illustration of a user interface 1500 to add content to a collection of content having a classification, according to one or more example implementations. The user interface 1500 may be displayed by a display device of a client device 102. In addition, the user interface 1500 may be displayed in conjunction with a client application executed by the client device 102, such as the client application 104 described with respect to FIG. 1. The user interface 1500 may include a number of user interface elements that correspond to content items associated with a classification 1502. For example, the user interface 1500 may include a first user interface element 1504 that corresponds to a first content item having the classification 1502 and a second user interface element 1506 that corresponds to a second content item having the classification 1502. In various examples, the first user interface element 1504 and the second user interface element 1506 may be selectable to cause the respective content item corresponding to the first user interface element 1504 to be displayed in a single page view.

The user interface 1500 may also include a third user interface element 1508 that is selectable to add a content item to the classification 1502. For example, selection of the third user interface element 1508 may cause the client device 102 to display an additional user interface 1510. The additional user interface 1510 may indicate an image 1512 that may be captured by a camera 1514 of the client device 102 in response to selection of an additional user interface element 1516. Selection of the additional user interface element 1516 may cause the image 1512 to be captured by the camera 1514 and may also cause a content item that includes the image to be classified according to the classification 1502. In this way, a content item that includes the image 1512 may be added to a collection of content items having the classification 1502 via a page dedicated to content items having the classification 1502, such as the page shown in the user interface 1500.

Figure 16:
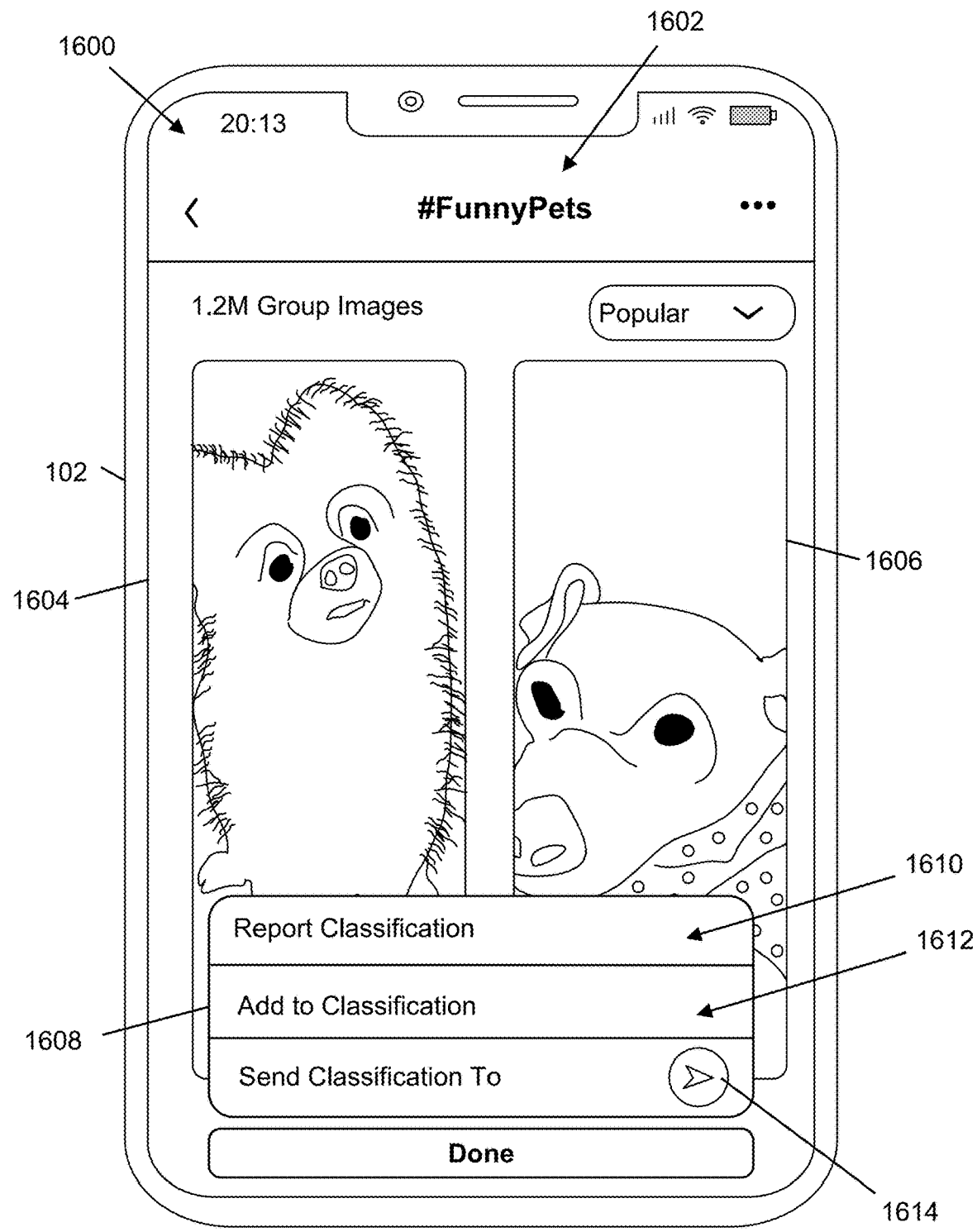
FIG. 16 is an illustration of a user interface that includes an option to share a classification, according to one or more example implementations.

FIG. 16 is an illustration of a user interface 1600 that includes an option to share a classification, according to one or more example implementations. The user interface 1600 may be displayed by a display device of a client device 102. In addition, the user interface 1600 may be displayed in conjunction with a client application executed by the client device 102, such as the client application 104 described with respect to FIG. 1. The user interface 1600 may include a number of user interface elements that correspond to content items associated with a classification 1602. For example, the user interface 1600 may include a first user interface element 1604 that corresponds to a first content item having the classification 1602 and a second user interface element 1606 that corresponds to a second content item having the classification 1602. The user interface 1600 may also include a third user interface element 1608 that includes a first selectable option 1610 to report the classification 1602 as being inappropriate, a second selectable option 1612 to add a content item to the classification 1602, and an additional option to share the classification 1602 with one or more additional users of the client application 104. In various examples, the classification 1602 may be shared with one or more additional users of the client application 104 by selection of a fourth user interface element 1614. In one or more implementations, selection of the fourth user interface element 1614 may cause an additional user interface to be displayed that includes one or more selectable user interface elements that individually correspond to additional users of the client application 104 with whom the classification 1602 and content items associated with the classification 1602 may be shared. Further, selection of the second selectable option 1612 may cause an additional user interface to be displayed that may be used to capture an image for which a content item may be created and associated with the classification 1602. In one or more illustrative examples, a user interface that is the same as or similar to the additional user interface 1510 may be displayed in response to selection of the second selectable option 1612.

Figure 17:
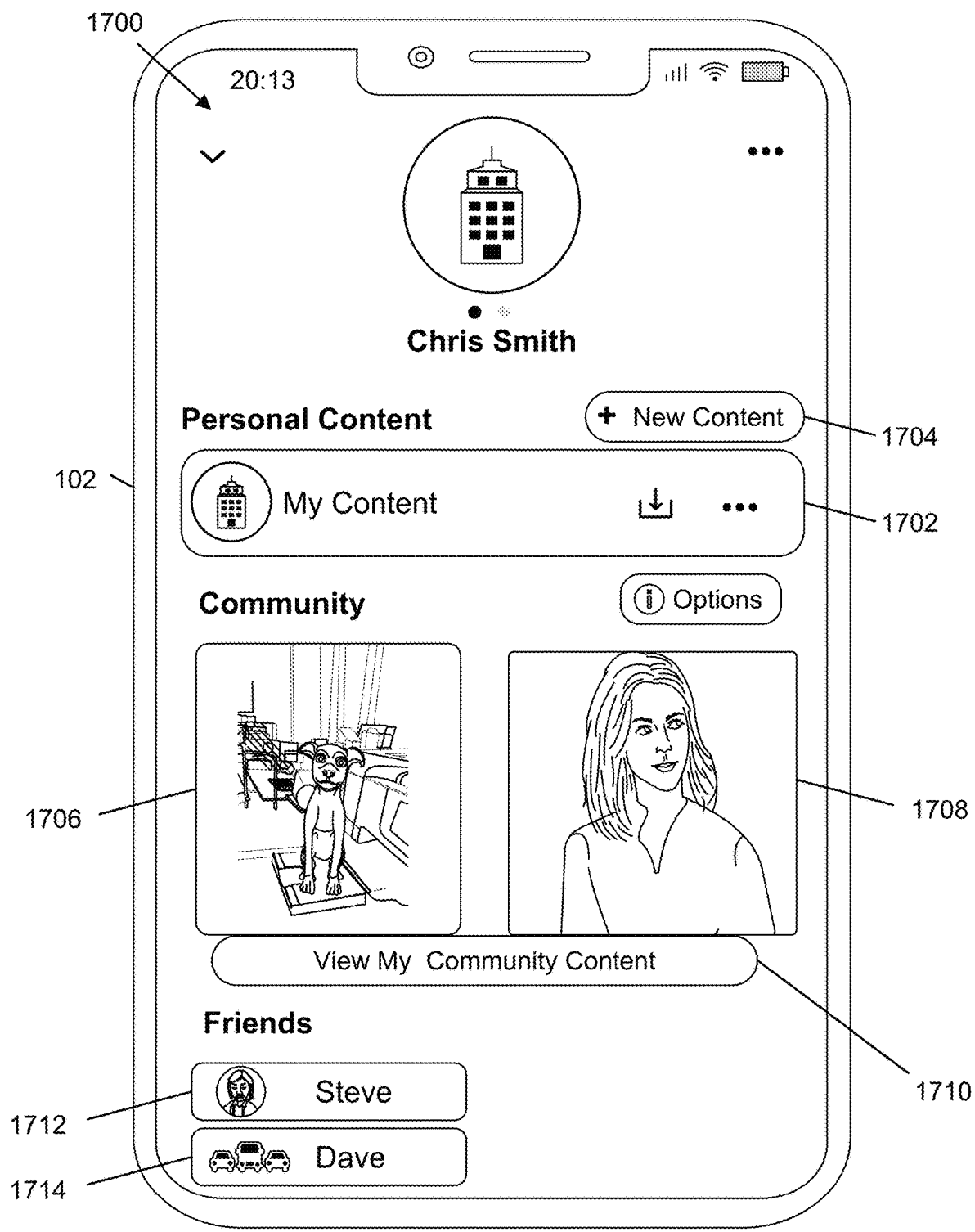
FIG. 17 is an illustration of a user interface to manage content associated with one or more classifications, according to one or more example implementations.

FIG. 17 is an illustration of a user interface 1700 to manage content associated with one or more classifications, according to one or more example implementations. The user interface 1700 may be displayed by a display device of a client device 102. In addition, the user interface 1700 may be displayed in conjunction with a client application executed by the client device 102, such as the client application 104 described with respect to FIG. 1. The user interface 1700 may include a number of user interface elements that may be selectable to manage content of a user of the client application 104. The user interface 1700 may include a first user interface element 1702 that is selectable to view one or more content items related to the user of the client application 104. In various examples, the first user interface element 1702 may be selectable to view one or more collections of content items related to the user of the client application 104. In addition, the user interface 1700 may include a second user interface element 1704 that is selectable to add content to one or more collections of content related to the user of the client application.

The user interface 1700 may also include a third user interface element 1706 and a fourth user interface element 1708 that may be selectable to view content of the user of the client application 104 that is associated with a respective classification. In one or more examples, the content items corresponding to the third user interface element 1706 and the fourth user interface element 1708 may be accessible to a larger audience than the content corresponding to the first user interface element 1702 and the second user interface element 1704. To illustrate, content corresponding to the first user interface element 1702 and the second user interface element 1704 may correspond to content that is accessible to one or more contacts of the user of the client application 104. Additionally, the content corresponding to the third user interface element 1706 and the fourth user interface element 1708 may be accessible publicly, such as accessible to users of the client application 104 that are not included in the contacts of the user of the client application 104. Selection of the third user interface element 1706 may cause a full-page version of the content corresponding to the third user interface element 1706 to be displayed in a user interface. Also, selection of the fourth user interface element 1708 may cause a full-page version of the content corresponding to the third user interface element 1706 to be displayed in a user interface.

The user interface 1700 may also include a fifth user interface element 1710 that is selectable to view additional content items of the user of the client application 104 having at least one classification in one or more additional user interfaces. In one or more examples, selection of the fifth user interface element 1710 may cause content items of the user of the client application 104 to be displayed according to at least one of date, location, or classification of the content items. Additionally, selection of the fifth user interface element 1710 may cause one or more user interfaces to be displayed that may include user interface elements to add content items, delete content items, modify a classification of content items, or combinations thereof. Additionally, the user interface 1700 may include a sixth user interface element 1712 to view content corresponding to a first contact of the user of the client application 104 and a seventh user interface element 1714 to view content corresponding to a second contact of the user of the client application 104.

Figure 18:
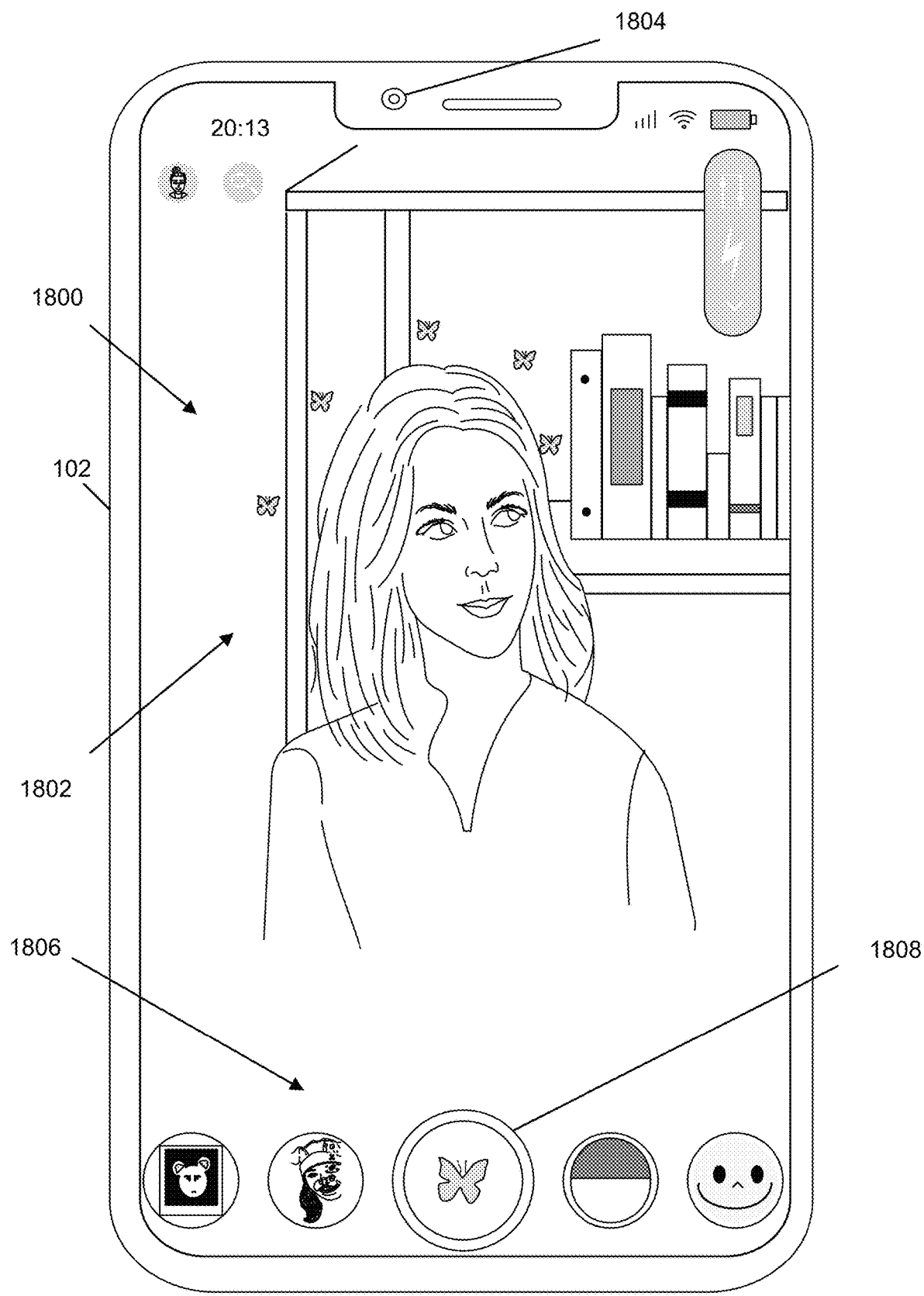
FIG. 18 is an illustration of a user interface to apply an augmented reality content item to user content, according to one or more example implementations.

FIG. 18 is an illustration of a user interface 1800 to apply an augmented reality content item to user content, according to one or more example implementations. The user interface 1800 may be displayed via a display device of the client device 102. In addition, the user interface 1800 may be displayed by a client application, such as the client application 104, that includes at least one of messaging functionality or social networking functionality. In one or more examples, the user interface 1800 may include user content 1802 that is captured within a field of view of at least one camera 1804 of the client device 102.

The user interface 1800 may also include a plurality of user interface elements 1806 that may be part of a carousel user interface element that may be used to display a number of user interface elements at a given time. In one or more implementations, the user interface elements included in the carousel user interface elements may be modified based on input provided to the client device 102, such as at least one of a swipe left input or a swipe right input. Each of the plurality of user interface elements 1806 may be selectable to execute at least one augmented reality content item that is associated with the respective user interface element of the plurality of user interface elements 1806. In the illustrative example of FIG. 18, the user interface element 1808 has been selected to cause augmented reality content to be executed to apply a visual graphic to the user content 1802.

Figure 19:
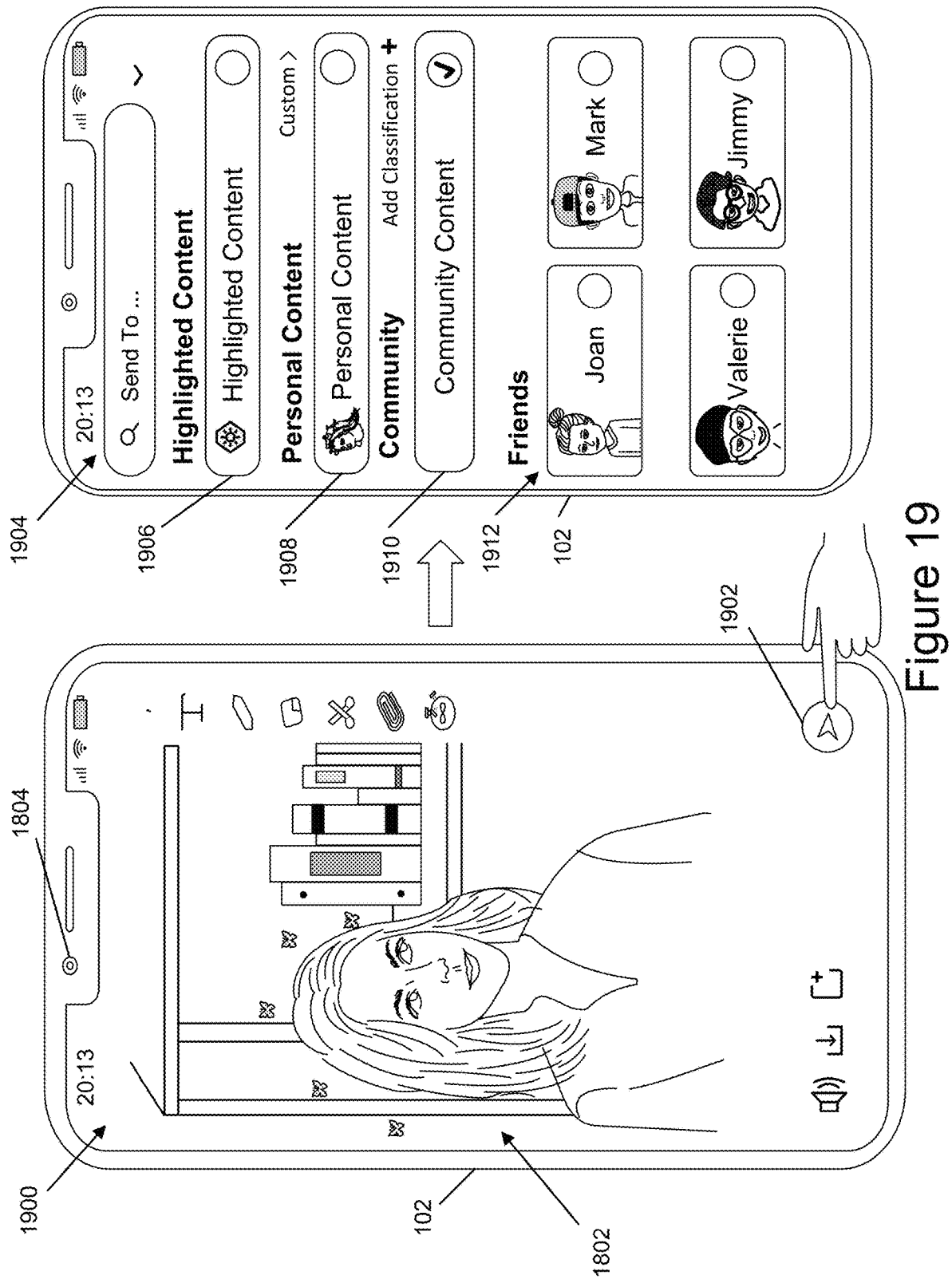
FIG. 19 is an illustration of user interfaces to select one or more recipients of user content, according to one or more example implementations.

FIG. 19 is an illustration of user interfaces to select one or more recipients of user content, according to one or more example implementations. The user interface 1900 may be displayed by a display device of a client device 102. In addition, the user interface 1900 may be displayed in conjunction with a client application executed by the client device 102, such as the client application 104 described with respect to FIG. 1. The user interface 1900 may include a version of the user content 1802 that has been modified by augmented reality content selected in FIG. 19. The user content 1802 may have been captured using at least one camera of the client device 102, such as a camera 1804. The user interface 1900 may also include a user interface element 1902 that is selectable to send the user content 1802 to one or more recipients.

In one or more illustrative examples, selection of the user interface element 1902 may cause the client device 102 to generate an additional user interface 1904. The additional user interface 1904 may include a number of user interface elements that are selectable to identify one or more recipients of the user content 1802. For example, the additional user interface 1904 may include a first additional user interface element 1906 to add the user content 1802 to highlighted content that is accessible to users of the client application. In various examples, the highlighted content may be accessible to users of the client application that are not contacts of or connected to the user of the client application that generated the user content 1802.

Additionally, the user interface 1904 may include a second additional user interface element 1908 to add the user content 1802 to a personal collection of the user that captured the user content 1802 using the camera 1804. The additional user interface 1904 may also include a third additional user interface element 1910 to select a classification to associate with the user content 1802. Further, the additional user interface 1904 may include at least a fourth additional user interface element 1912 that is selectable to share the user content 1802 with a contact of a user of the client device 102.

Figure 20:
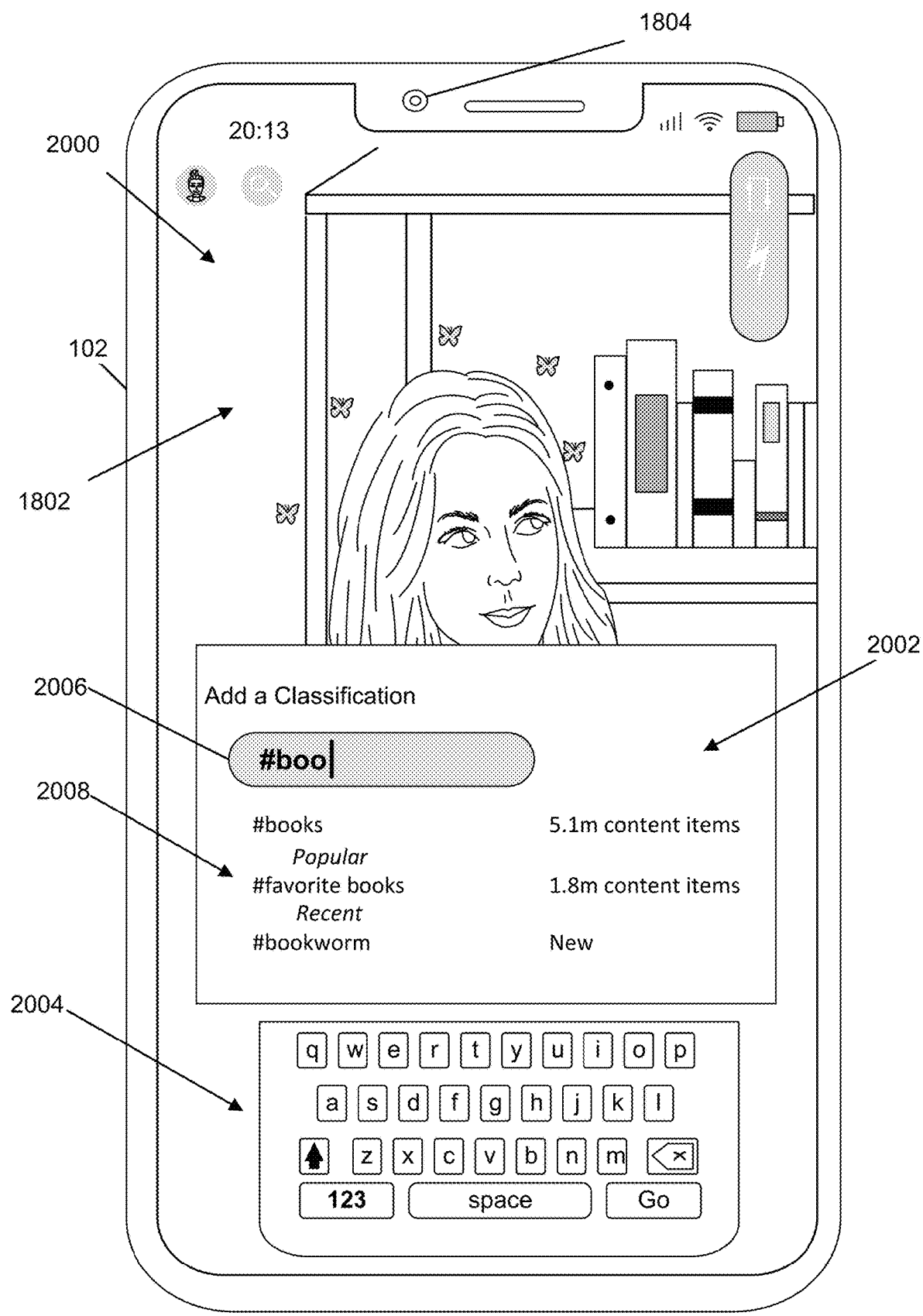
FIG. 20 is an illustration of a user interface to display recommendations for classifications of content items based on input entered by a user of a client application and based on at least one of user profile data or classification usage data, according to one or more example implementations.

FIG. 20 is an illustration of a user interface 2000 to display recommendations for classifications of content items based on input entered by a user of a client application and based on at least one of user profile data or classification usage data, according to one or more example implementations. The user interface 2000 may be displayed via a display device of the client device 102. In addition, the user interface 2000 may be displayed by a client application, such as the client application 104, that includes at least one of messaging functionality or social networking functionality. In one or more examples, the user interface 2000 may include user content 1802 that is captured within a field of view of at least one camera 1804 of the client device 102. In various examples, the user interface 2000 may be displayed in response to selection of a user interface element of the additional user interface 1904 to add a classification to the user content 1802.

The user interface 2000 may include a classification display portion 2002 and a user input portion 2004. The classification display portion 2002 may include a user interface element 2006 that displays alphanumeric characters entered via the user input portion 2004. The classification display portion 2002 may also display a plurality of recommendations 2008 of classifications for the user content 1802. In various examples, the plurality of recommendations 2008 may be individually selectable to associate the user content 1802 with the selected classification. In one or more examples, selection of an individual recommendation of the plurality of recommendations may cause the selected classification to be displayed in the user interface element 2006.

Figure 21:
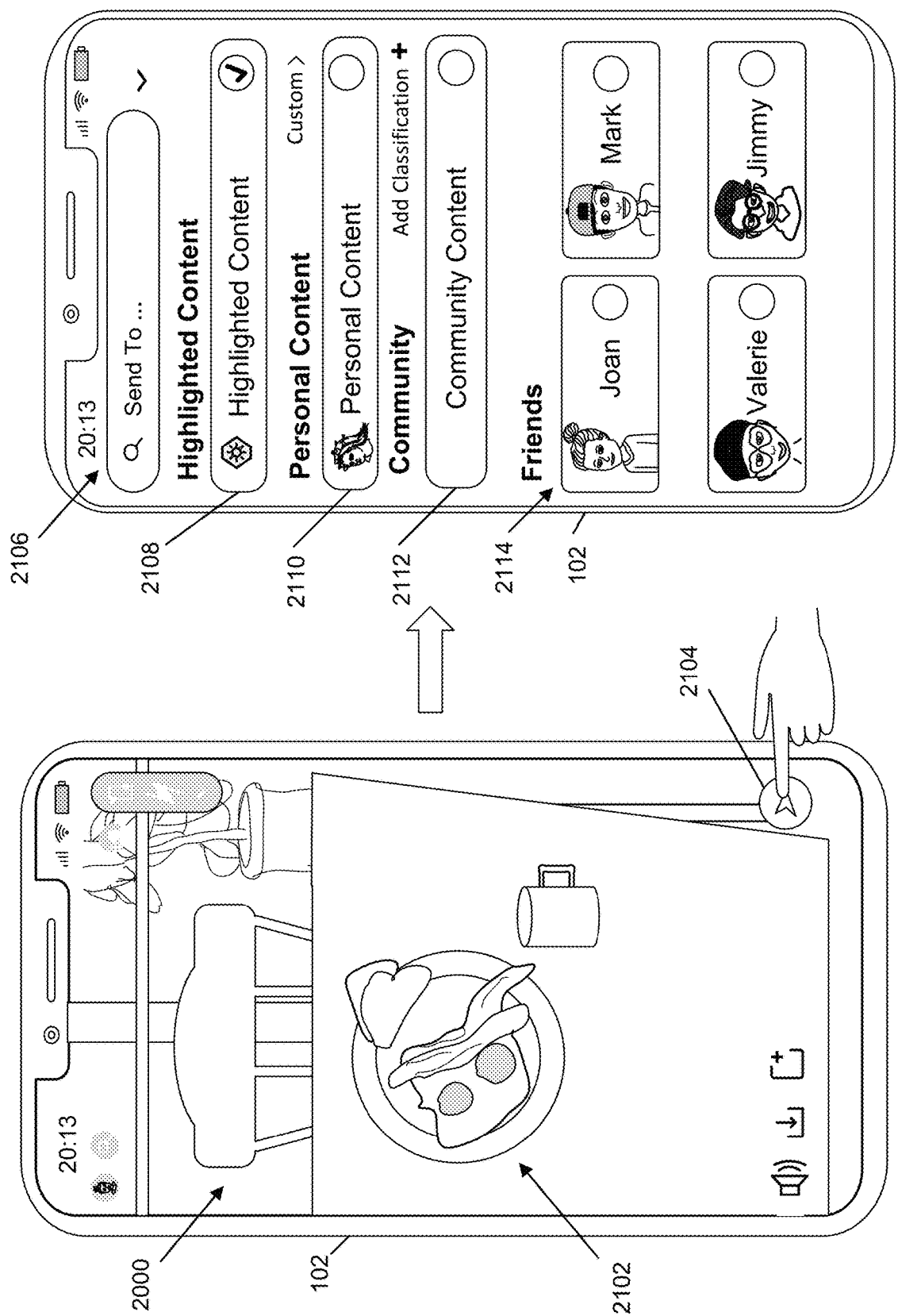
FIG. 21 is an illustration of a user interface to select one or more recipients of user content, according to one or more example implementations.

FIG. 21 is an illustration of a user interface 2100 to select one or more recipients of user content 2102, according to one or more example implementations. The user interface 2100 may be displayed by a display device of a client device 102. In addition, the user interface 2100 may be displayed in conjunction with a client application executed by the client device 102, such as the client application 104 described with respect to FIG. 1. The user content 2102 may have been captured using at least one camera of the client device 102. The user interface 2100 may also include a user interface element 2104 that is selectable to send the user content 2102 to one or more recipients.

In one or more illustrative examples, selection of the user interface element 2104 may cause the client device 102 to generate an additional user interface 2106. The additional user interface 2106 may include a number of user interface elements that are selectable to identify one or more recipients of the user content 2102. For example, the additional user interface 2106 may include a first additional user interface element 2108 to add the user content 2102 to highlighted content that is accessible to users of the client application. In various examples, the highlighted content may be accessible to users of the client application that are not contacts of or connected to the user of the client application that generated the user content 2102.

Additionally, the user interface 2106 may include a second additional user interface element 2110 to add the user content 2102 to a personal collection of the user that captured the user content 2102 using a camera of the client device 102. The additional user interface 2106 may also include a third additional user interface element 2112 to select a classification to associate with the user content 2102. Further, the additional user interface 2106 may include at least a fourth additional user interface element 2114 that is selectable to share the user content 2102 with a contact of a user of the client device 102.

Figure 22:
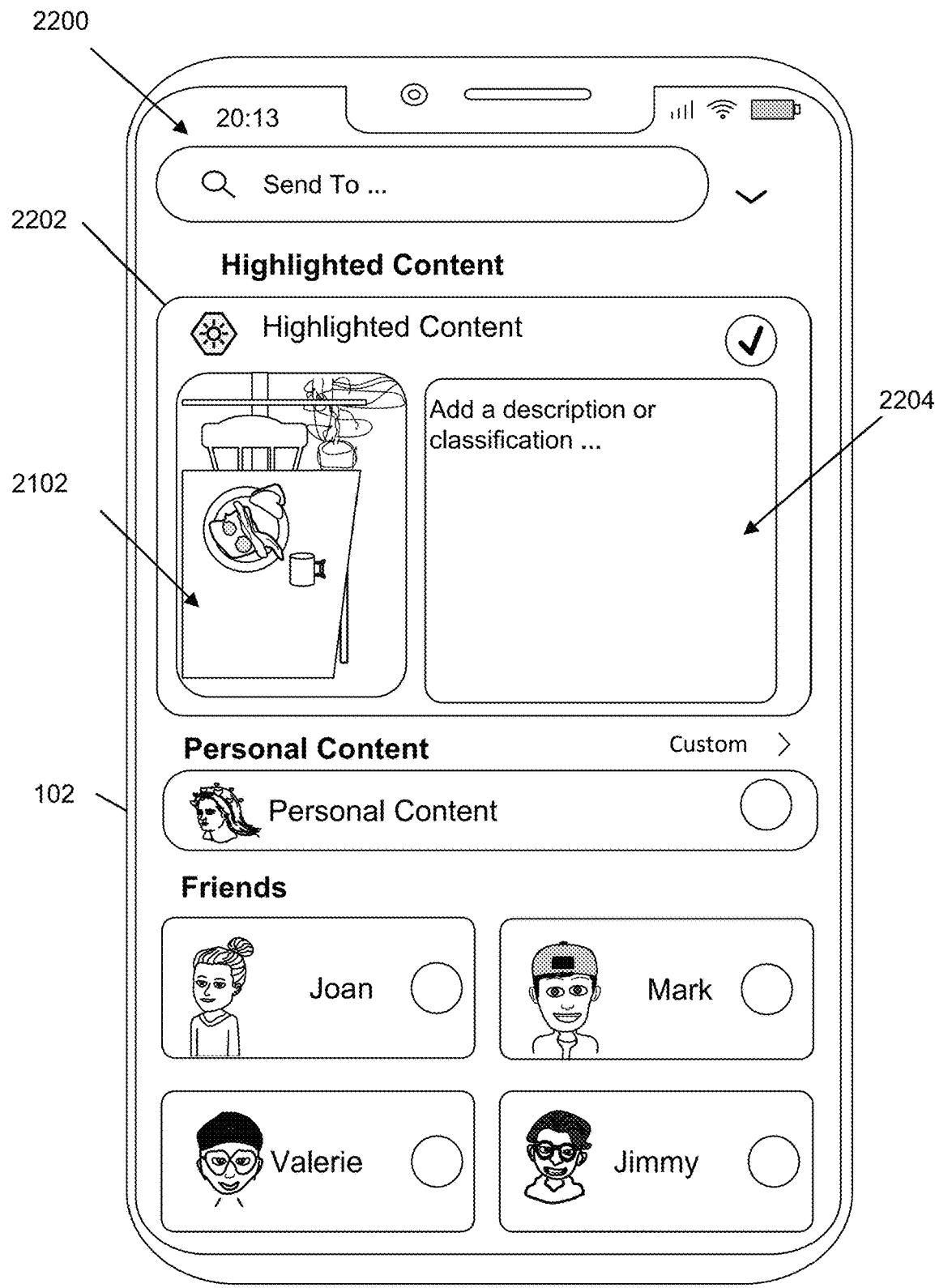
FIG. 22 is an illustration of a user interface to generate modified user content that includes additional text content, according to one or more example implementations.

FIG. 22 is an illustration of a user interface 2200 to generate modified user content that includes additional text content, according to one or more example implementations. The user interface 2200 may be displayed via a display device of the client device 102. In addition, the user interface

2200 may be displayed by a client application, such as the client application 104, that includes at least one of messaging functionality or social networking functionality. In one or more examples, the user interface 2200 may include user content 2102 that is captured within a field of view of at least one camera of the client device 102. In various examples, the user interface 2200 may be displayed in response to selection of a user interface element of the additional user interface 2106 to make the user content 2102 accessible to users of the client application that are not contacts of the user that generated the user content 2102.

The user interface 2200 may include an expanded version of the user interface element 2108. The expanded version of the user interface element 2108 may include a first section 2202 that includes the user content 2102. In addition, the expanded version of the user interface element 2108 may include a second section 2204 that is configured to capture at least one of text content, image content, video content, or animation content related to the user content 2102. The second section 2204 may include information related to a social networking post corresponding to the user content 2102. Additionally, the second section 2204 may include information related to a message, description, or opinion related to the user content 2102. In various examples, alphanumeric characters corresponding to one or more content classifications may be entered in the second section 2204. In one or more additional examples, the user interface 2200 may include an overlay that includes a thumbnail of the user content 2102, information entered into the second section 2204, and recommendations for content classifications related to the user content 2201. The recommendations for content classifications related to the user content 2102 may be based on at least partial text of an intended classification entered into the second section 2204. In one or more further examples, the user interface 2200 may include a keyboard user interface element to enter text into the second section 2204 that is an overlay of the user interface 2200.

Figure 23:
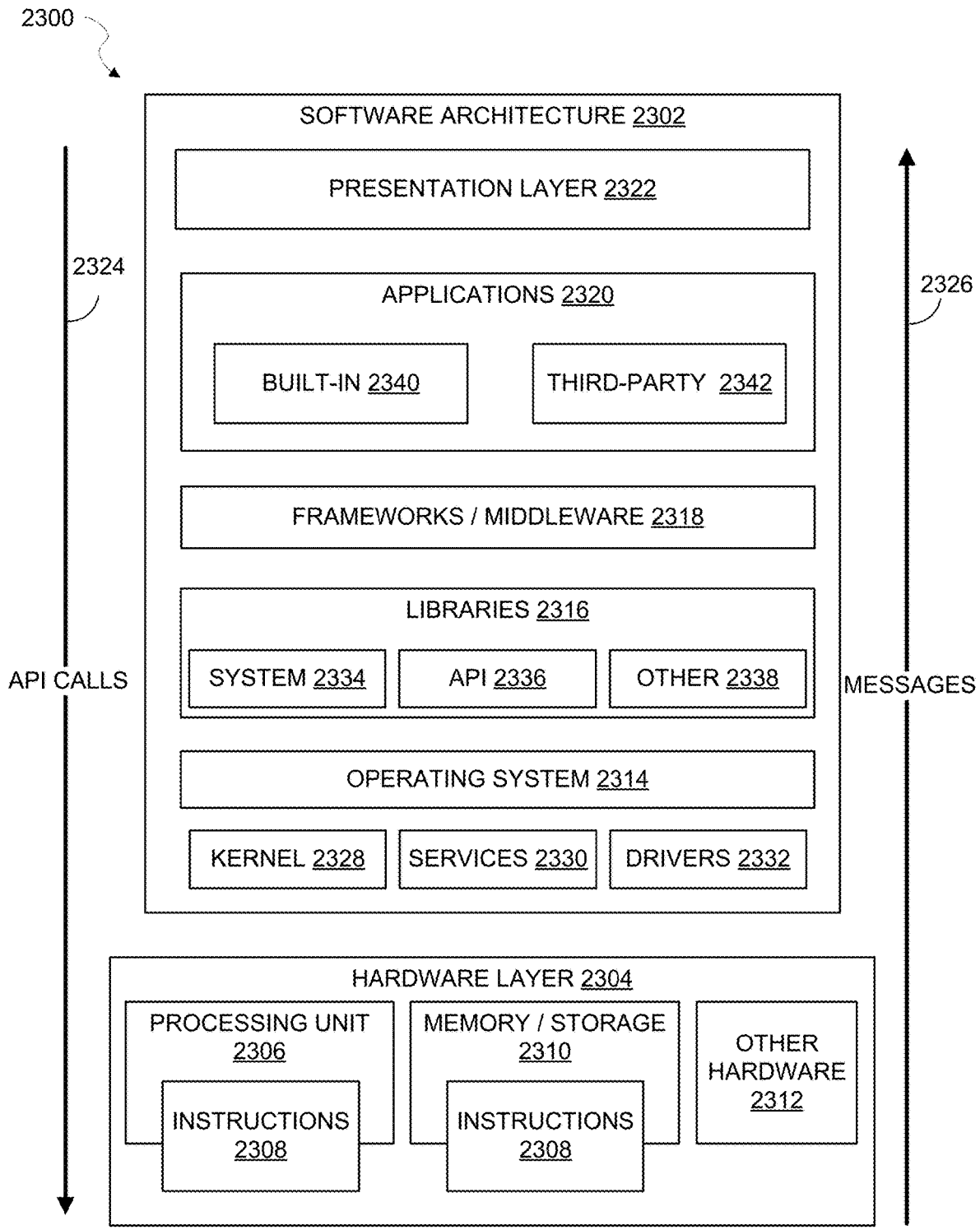
FIG. 23 is block diagram illustrating a representative software architecture that may be used in conjunction with one or more hardware architectures described herein, in accordance with one or more example implementations.

FIG. 23 is a block diagram illustrating system 2300 that includes an example software architecture 2302, which may be used in conjunction with various hardware architectures herein described. FIG. 23 is a non-limiting example of a software architecture, and it will be appreciated that many other architectures may be implemented to facilitate the functionality described herein. The software architecture 2302 may execute on hardware such as machine 2400 of FIG. 24 that includes, among other things, processors 2404, memory/storage 2406, and input/output (I/O) components 2408. A representative hardware layer 2304 is illustrated and can represent, for example, the machine 2400 of FIG. 24. The representative hardware layer 2304 includes a processing unit 2306 having associated executable instructions 2308. Executable instructions 2308 represent the executable instructions of the software architecture 2302, including implementation of the methods, components, and so forth described herein. The hardware layer 2304 also includes at least one of memory or storage modules memory/storage 2310, which also have executable instructions 2308. The hardware layer 2304 may also comprise other hardware 2312.

In the example architecture of FIG. 23, the software architecture 2302 may be conceptualized as a stack of layers where each layer provides particular functionality. For example, the software architecture 2302 may include layers such as an operating system 2314, libraries 2316, frameworks/middleware 2318, applications 2320, and a presentation layer 2322. Operationally, the applications 2320 or other components within the layers may invoke API calls 2324 through the software stack and receive messages 2326 in response to the API calls 2324. The layers illustrated are representative in nature and not all software architectures have all layers. For example, some mobile or special purpose operating systems may not provide a frameworks/middleware 2318, while others may provide such a layer. Other software architectures may include additional or different layers.

The operating system 2314 may manage hardware resources and provide common services. The operating system 2314 may include, for example, a kernel 2328, services 2330, and drivers 2332. The kernel 2328 may act as an abstraction layer between the hardware and the other software layers. For example, the kernel 2328 may be responsible for memory management, processor management (e.g., scheduling), component management, networking, security settings, and so on. The services 2330 may provide other common services for the other software layers. The drivers 2332 are responsible for controlling or interfacing with the underlying hardware. For instance, the drivers 2332 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2316 provide a common infrastructure that is used by at least one of the applications 2320, other components, or layers. The libraries 2316 provide functionality that allows other software components to perform tasks in an easier fashion than to interface directly with the underlying operating system 2314 functionality (e.g., kernel 2328, services 2330, drivers 2332). The libraries 2316 may include system libraries 2334 (e.g., C standard library) that may provide functions such as memory allocation functions, string manipulation functions, mathematical functions, and the like. In addition, the libraries 2316 may include API libraries 2336 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 2316 may also include a wide variety of other libraries 2438 to provide many other APIs to the applications 2320 and other software components/modules.

The frameworks/middleware 2318 (also sometimes referred to as middleware) provide a higher-level common infrastructure that may be used by the applications 2320 or other software components/modules. For example, the frameworks/middleware 2318 may provide various graphical user interface functions, high-level resource management, high-level location services, and so forth. The frameworks/middleware 2318 may provide a broad spectrum of other APIs that may be utilized by the applications 2320 or other software components/modules, some of which may be specific to a particular operating system 2314 or platform.

The applications 2320 include built-in applications 2340 and third-party applications 2342. Examples of representative built-in applications 2340 may include, but are not limited to, a contacts application, a browser application, a book reader application, a location application, a media application, a messaging application, or a game application. Third-party applications 2342 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 2342 may invoke the API calls 2324 provided by the mobile operating system (such as operating system 2314) to facilitate functionality described herein.

The applications 2320 may use built-in operating system functions (e.g., kernel 2328, services 2330, drivers 2332), libraries 2316, and frameworks/middleware 2318 to create UIs to interact with users of the system. Alternatively, or additionally, in some systems, interactions with a user may occur through a presentation layer, such as presentation layer 2322. In these systems, the application/component "logic" can be separated from the aspects of the application/component that interact with a user.

Figure 24:
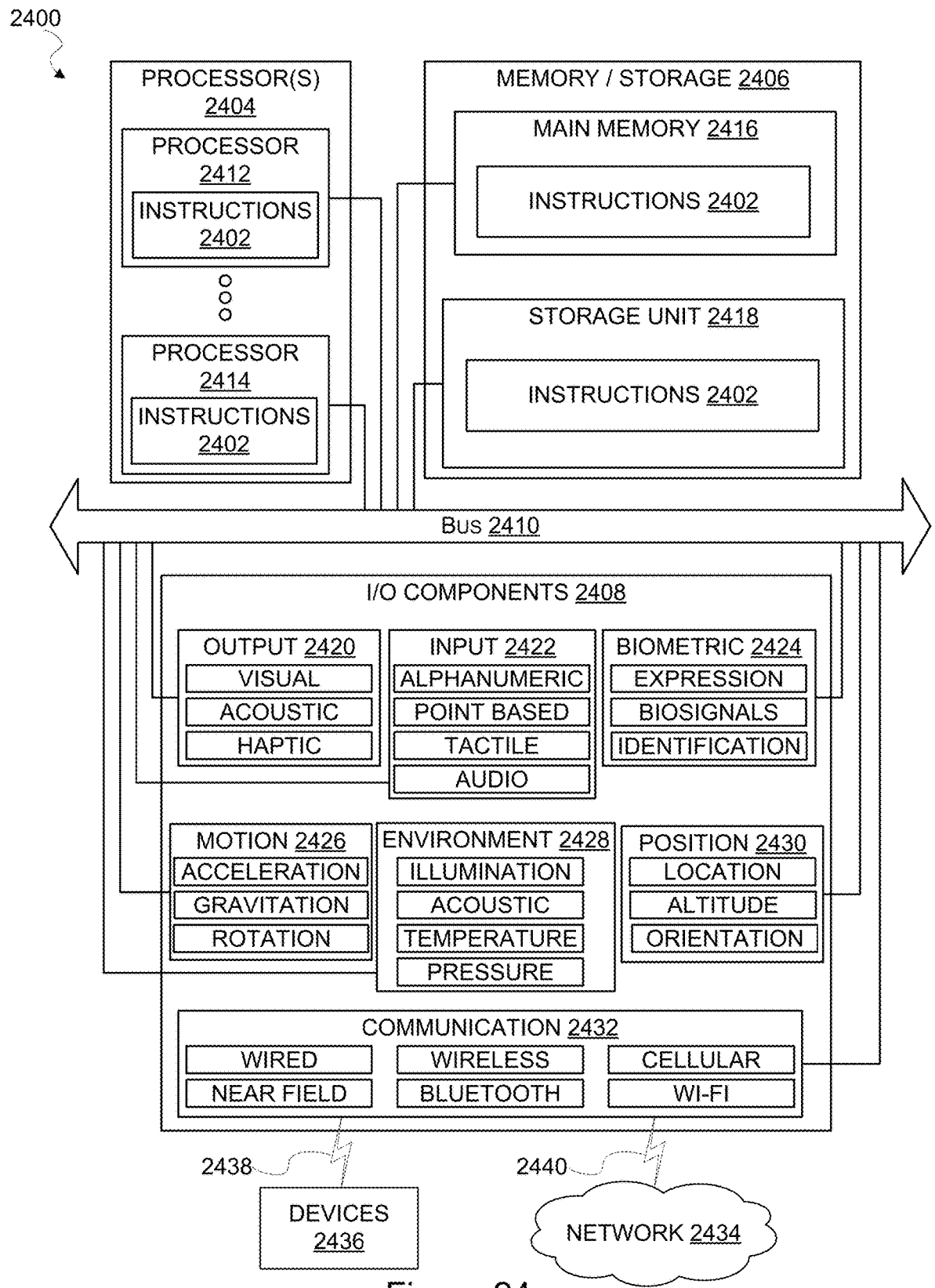
FIG. 24 is a block diagram illustrating components of a machine, in the form of a computer system, that may read and execute instructions from one or more machine-readable media to perform any one or more methodologies described herein, in accordance with one or more example implementations.

FIG. 24 is a block diagram illustrating components of a machine 2400, according to some example implementations, able to read instructions from a machine-readable medium (e.g., a machine-readable storage medium) and perform any one or more of the methodologies discussed herein. Specifically, FIG. 24 shows a diagrammatic representation of the machine 2400 in the example form of a computer system, within which instructions 2402 (e.g., software, a program, an application, an applet, an app, or other executable code) for causing the machine 2400 to perform any one or more of the methodologies discussed herein may be executed. As such, the instructions 2402 may be used to implement modules or components described herein. The instructions 2402 transform the general, non-programmed machine 2400 into a particular machine 2400 programmed to carry out the described and illustrated functions in the manner described. In alternative implementations, the machine 2400 operates as a standalone device or may be coupled (e.g., networked) to other machines. In a networked deployment, the machine 2400 may operate in the capacity of a server machine or a client machine in a server-client network environment, or as a peer machine in a peer-to-peer (or distributed) network environment. The machine 2400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2402, sequentially or otherwise, that specify actions to be taken by machine 2400. Further, while only a single machine 2400 is illustrated, the term "machine" shall also be taken to include a collection of machines that individually or jointly execute the instructions 2402 to perform any one or more of the methodologies discussed herein.

The machine 2400 may include processors 2404, memory/storage 2406, and I/O components 2408, which may be configured to communicate with each other such as via a bus 2410. In an example implementation, the processors 2404 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2412 and a processor 2414 that may execute the instructions 2402. The term "processor" is intended to include multi-core processors 2404 that may comprise two or more independent processors (sometimes referred to as "cores") that may execute instructions 2402 contemporaneously. Although FIG. 24 shows multiple processors 2404, the machine 2400 may include a single processor 2412 with a single core, a single processor 2412 with multiple cores (e.g., a multi-core processor), multiple processors 2412, 2414 with a single core, multiple processors 2412, 2414 with multiple cores, or any combination thereof.

The memory/storage 2406 may include memory, such as a main memory 2416, or other memory storage, and a storage unit 2418, both accessible to the processors 2404 such as via the bus 2410. The storage unit 2418 and main memory 2416 store the instructions 2402 embodying any one or more of the methodologies or functions described herein. The instructions 2402 may also reside, completely or partially, within the main memory 2416, within the storage unit 2418, within at least one of the processors 2404 (e.g., within the processor's cache memory), or any suitable combination thereof, during execution thereof by the machine 2400. Accordingly, the main memory 2416, the storage unit 2418, and the memory of processors 2404 are examples of machine-readable media.

The I/O components 2408 may include a wide variety of components to receive input, provide output, produce output, transmit information, exchange information, capture measurements, and so on. The specific I/O components 2408 that are included in a particular machine 2400 will depend on the type of machine. For example, portable machines such as mobile phones will likely include a touch input device or other such input mechanisms, while a headless server machine will likely not include such a touch input device. It will be appreciated that the I/O components 2408 may include many other components that are not shown in FIG. 24. The I/O components 2408 are grouped according to functionality merely for simplifying the following discussion and the grouping is in no way limiting. In various example implementations, the I/O components 2408 may include output components 2420 and input components 2422. The output components 2420 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2422 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example implementations, the I/O components 2408 may include biometric components 2424, motion components 2426, environmental components 2428, or position components 2430 among a wide array of other components. For example, the biometric components 2424 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2426 may include acceleration sensor components (e.g., accelerometer), gravitation sensor components, rotation sensor components (e.g., gyroscope), and so forth. The environmental components 2428 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2430 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2408 may include communication components 2432 operable to couple the machine 2400 to a network 2434 or devices 2436 via coupling 2338 and coupling 2440, respectively. For example, the communication components 2432 may include a network interface component or other suitable device to interface with the network 2434. In further examples, communication components 2432 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2436 may be another machine 2400 or any of a wide variety of peripheral devices (e.g., a peripheral device coupled via a USB).

Moreover, the communication components 2432 may detect identifiers or include components operable to detect identifiers. For example, the communication components 2432 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2432, such as location via Internet Protocol (IP) geo-location, location via Wi-Fi® signal triangulation, location via detecting an NFC beacon signal that may indicate a particular location, and so forth.

Glossary

"CARRIER SIGNAL," in this context, refers to any intangible medium that is capable of storing, encoding, or carrying transitory or non-transitory instructions 2402 for execution by the machine 2400, and includes digital or analog communications signals or other intangible medium to facilitate communication of such instructions 2402. Instructions 2402 may be transmitted or received over the network 110, 2434 using a transitory or non-transitory transmission medium via a network interface device and using any one of a number of well-known transfer protocols.

"CLIENT DEVICE," in this context, refers to any machine 2400 that interfaces to a communications network 110, 2434 to obtain resources from one or more server systems or other client devices 102. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network 110, 2434.

"COMMUNICATIONS NETWORK," in this context, refers to one or more portions of a network 110 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 110, 2434 or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE," in this context, refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM," in this context, refers to a component, device, or other tangible media able to store instructions 2402 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) or any suitable combination thereof. The term "machine-readable medium" should be taken to include a single medium or multiple media (e.g., a centralized or distributed database, or associated caches and servers) able to store instructions 2402. The term "machine-readable medium" shall also be taken to include any medium, or combination of multiple media, that is capable of storing instructions 2402 (e.g., code) for execution by a machine 2400, such that the instructions 2402, when executed by one or more processors 2404 of the machine

2400, cause the machine 2400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT," in this context, refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example implementations, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor 2404 or other programmable processor. Once configured by such software, hardware components become specific machines (or specific components of a machine 2400) uniquely tailored to perform the configured functions and are no longer general-purpose processors 2404. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering implementations in which hardware components are temporarily configured (e.g., programmed), each of the hardware components need not be configured or instantiated at any one instance in time. For example, where a hardware component comprises a general-purpose processor 2404 configured by software to become a special-purpose processor, the general-purpose processor 2404 may be configured as respectively different special-purpose processors (e.g., comprising different hardware components) at different times. Software accordingly configures a particular processor 2412, 2414 or processors 2404, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In implementations in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors 2404 that are temporarily configured (e.g., by software) or permanently configured to perform the relevant operations. Whether temporarily or permanently configured, such processors 2404 may constitute processor-implemented components that operate to perform one or more operations or functions described herein. As used herein, "processor-implemented component" refers to a hardware component implemented using one or more processors 2404. Similarly, the methods described herein may be at least partially processor-implemented, with a particular processor 2412, 2414 or processors 2404 being an example of hardware. For example, at least some of the operations of a method may be performed by one or more processors 2404 or processor-implemented components. Moreover, the one or more processors 2404 may also operate to support performance of the relevant operations in a "cloud computing" environment or as a "software as a service" (SaaS). For example, at least some of the operations may be performed by a group of computers (as examples of machines 2400 including processors 2404), with these operations being accessible via a network 110 (e.g., the Internet) and via one or more appropriate interfaces (e.g., an API). The performance of certain of the operations may be distributed among the processors, not only residing within a single machine 2400, but deployed across a number of machines. In some example implementations, the processors 2404 or processor-implemented components may be located in a single geographic location (e.g., within a home environment, an office environment, or a server farm). In other example implementations, the processors 2404 or processor-implemented components may be distributed across a number of geographic locations.

"PROCESSOR," in this context, refers to any circuit or virtual circuit (a physical circuit emulated by logic executing on an actual processor 2404) that manipulates data values according to control signals (e.g., "commands," "op codes," "machine code," etc.) and which produces corresponding output signals that are applied to operate a machine 2400. A processor 2404 may, for example, be a CPU, a RISC processor, a CISC processor, a GPU, a DSP, an ASIC, a RFIC or any combination thereof. A processor 2404 may further be a multi-core processor having two or more independent processors 2404 (sometimes referred to as "cores") that may execute instructions 2402 contemporaneously.

"TIMESTAMP," in this context, refers to a sequence of characters or encoded information identifying when a certain event occurred, for example giving date and time of day, sometimes accurate to a small fraction of a second.

Changes and modifications may be made to the disclosed implementations without departing from the scope of the present disclosure. These and other changes or modifications are intended to be included within the scope of the present disclosure, as expressed in the following claims.

What is claimed is:

1. A method comprising:
   receiving, by a computing system including one or more computing devices that each include a processor and memory, first input data to provide a content item to one or more recipients, the content item comprising user content that includes at least one of image content or video content captured via a client application, wherein the content item is associated with an account of a first user of the client application;
   generating, by the computing system, a first user interface that includes a plurality of user interface elements selectable to make the content item accessible to one or more recipients, the first user interface including (i) a first section displaying the plurality of user interface elements, the plurality of user interface elements being individually selectable to make the content item accessible to an individual user of the client application that is a contact of the first user with respect to the client application, (ii) a second section that includes a user interface element that is selectable to make the content item publicly accessible to a number of additional users of the client application that are not contacts of the first user with respect to the client application, and (iii) a third section that includes a first additional user interface element selectable to select one or more classifications to correspond to the content item and a second additional user interface element selectable to cause the content item to be stored in a database within a collection of content items related to the one or more classifications and to be accessible to a number of further users of the client application in relation to the one or more classifications;
   generating, by the computing system and in response to selection of the user interface element in the second section, a second user interface that includes at least a portion of the plurality of user interface elements of the first section and an expanded version of the user interface element in the second section, the expanded version of the user interface element including an additional first section within the expanded version of the user interface element that includes a thumbnail of the content item and an additional second section within the expanded version of the user interface element that is configured to capture alphanumeric content related to the content item;
   identifying, by the computing system, second input data indicating one or more alphanumeric characters entered in the additional second section; and
   generating, by the computing system, a modified version of the content item for display in a third user interface, the modified version of the content item comprising the one or more alphanumeric characters overlaid on the user content.

2. The method of claim 1, comprising:
   determining, by the computing system, that the content item is prevented from being modified by one or more additional users of the client application.

3. The method of claim 2, wherein the second user interface includes a user interface element that is selectable to indicate that the content item is modifiable by the one or more additional users of the client application or to indicate that the user content is prevented from being modified by the one or more additional users of the client application.

4. The method of claim 1, comprising:
   determining, by the computing system, that the modified version of the content item is accessible to users of the client application that are contacts of the first user with respect to the client application via the third user interface.

5. The method of claim 1, wherein the second user interface includes a user interface element that is selectable to indicate that the content item is accessible to users of the client application that are contacts of the first user with respect to the client application via an additional user interface or to indicate that the content item is not accessible to users of the client application that are contacts of the first user with respect to the client application.

6. The method of claim 1, comprising:
   determining, by the computing system, that at least a portion of the one or more alphanumeric characters entered in the additional second section of the second user interface correspond to a classification of the content item; and
   determining, by the computing system, a plurality of candidate classifications of the content item based on the at least a portion of the one or more alphanumeric characters.

7. The method of claim 6, comprising:
   receiving, by the computing system, third input data indicating selection of a candidate classification included in the plurality of candidate classifications; and
   storing, by the computing system, the content item in association with a classification that corresponds to the candidate classification.

8. The method of claim 6, wherein the second user interface includes a third section that includes a subset of the plurality of candidate classifications, individual candidate classifications of the subset of the plurality of candidate classifications being selectable to cause an individual classification to be associated with the content item.

9. The method of claim 1, comprising:
   identifying, by the computing system, additional input data indicating selection of a user interface element to execute an augmented reality content item with respect to the user content; and
   generating, by the computing system, a modified version of the user content that includes the user content modified with one or more visual effects caused by execution of the augmented reality content item;
   wherein the additional first section of the second user interface displays the modified version of the user content.

10. A system comprising:
    one or more hardware processors; and
    one or more non-transitory computer-readable storage media including computer-readable instructions that, when executed by the one or more hardware processors, cause the one or more hardware processors to perform operations comprising:

receiving first input data to provide a content item to one or more recipients, the content item comprising user content that includes at least one of image content or video content captured via a client application, wherein the content item is associated with an account of a first user of the client application;

generating a first user interface that includes a plurality of user interface elements selectable to make the content item accessible to one or more recipients, the first user interface including (i) a first section displaying the plurality of user interface elements, the plurality of user interface elements being individually selectable to make the content item accessible to an individual user of the client application that is a contact of the first user with respect to the client application, (ii) a second section that includes a user interface element that is selectable to make the content item publicly accessible to a number of additional users of the client application that are not contacts of the first user with respect to the client application, and (iii) a third section that includes a first additional user interface element selectable to select one or more classifications to correspond to the content item and a second additional user interface element selectable to cause the content item to be stored in a database within a collection of content items related to the one or more classifications and to be accessible to a number of further users of the client application in relation to the one or more classifications;

generating, in response to selection of the user interface element in the second section, a second user interface that includes at least a portion of the plurality of user interface elements of the first section and an expanded version of the user interface element in the second section, the expanded version of the user interface element including an additional first section within the expanded version of the user interface element that includes a thumbnail of the user content and an additional second section within the expanded version of the user interface element that is configured to capture alphanumeric content related to the content item;

identifying second input data indicating one or more alphanumeric characters entered in the additional second section; and generating a modified version of the content item for display in a third user interface, the modified version of the content item comprising the one or more alphanumeric characters overlaid on the user content.

11. The system of claim 10, wherein:

the one or more non-transitory computer-readable storage media include additional computer-readable instructions that, when executed by the one or more hardware processors, cause the one or more hardware processors to perform additional operations comprising:

determining that at least a portion of the one or more alphanumeric characters indicated by the second input data correspond to a classification of the content item;

determining, based on the one or more alphanumeric characters of the second input data, a group of candidate classifications for the content item; and analyzing at least one of profile data of the first user or content usage data of the first user to determine a subset of the group of candidate classifications for the content item.

12. The system of claim 11, wherein the one or more non-transitory computer-readable storage media include additional computer-readable instructions that, when executed by the one or more hardware processors, cause the one or more hardware processors to perform additional operations comprising:

determining a plurality of similarity metrics for the one or more alphanumeric characters of the second input data with respect to a plurality of classifications;

determining that a similarity metric of the plurality of similarity metrics satisfies one or more criteria, the similarity metric corresponding to an amount of similarity between alphanumeric characters of the classification and the one or more alphanumeric characters of the second input data; and determining that the classification is included in the subset of the group of candidate classifications based on the similarity metric satisfying the one or more criteria.

13. The system of claim 12, wherein the one or more criteria include at least one of a frequency of use of the plurality of classifications by a number of additional users of the client application, a period of time elapsed between selection of a respective classification by the first user of the client application and a current time, or a number of views of content items associated with one or more respective classifications by the first user of the client application.

14. The system of claim 11, wherein the one or more non-transitory computer-readable storage media include additional computer-readable instructions that, when executed by the one or more hardware processors, cause the one or more hardware processors to perform additional operations comprising:

determining that the one or more alphanumeric characters satisfy a threshold number of alphanumeric characters;

wherein the subset of the group of candidate classifications is displayed in the second user interface in response to the one or more alphanumeric characters satisfying the threshold number of alphanumeric characters.

15. The system of claim 11, wherein the one or more non-transitory computer-readable storage media include additional computer-readable instructions that, when executed by the one or more hardware processors, cause the one or more hardware processors to perform additional operations comprising:

determining one or more classifications previously selected by the first user to associate with additional content items related to the first user; and determining that an additional classification is included in the subset of the group of candidate classifications based on the additional classification being included in the one or more classifications previously selected by the first user.

16. The system of claim 10, wherein the one or more non-transitory computer-readable storage media include additional computer-readable instructions that, when executed by the one or more hardware processors, cause the one or more hardware processors to perform additional operations comprising:

analyzing at least one of first characteristics of the user content or second characteristics of the first user to determine rankings of candidate classifications for the content item; and causing the candidate classifications to be displayed in the second user interface in conjunction with the one or more alphanumeric characters according to an order of the rankings.

17. One or more non-transitory computer-readable storage media storing computer-readable instructions that, when executed by one or more hardware processors, cause the one or more hardware processors to perform operations comprising:

receiving first input data to provide a content item to one or more recipients, the content item comprising user content that includes at least one of image content or video content captured via a client application, wherein the content item is associated with an account of a first user of the client application;

generating a first user interface that includes a plurality of user interface elements selectable to make the content item accessible to one or more recipients, the first user interface including (i) a first section displaying the plurality of user interface elements, the plurality of user interface elements being individually selectable to make the content item accessible to an individual user of the client application that is a contact of the first user with respect to the client application, (ii) a second section that includes a user interface element that is selectable to make the content item publicly accessible to a number of additional users of the client application that are not contacts of the first user with respect to the client application, and (iii) a third section that includes a first additional user interface element selectable to select one or more classifications to correspond to the content item and a second additional user interface element selectable to cause the content item to be stored in a database within a collection of content items related to the one or more classifications and to be accessible to a number of further users of the client application in relation to the one or more classifications;

generating, in response to selection of the user interface element in the second section, a second user interface that includes at least a portion of the plurality of user interface elements of the first section and an expanded version of the user interface element in the second section, the expanded version of the user interface element including an additional first section within the expanded version of the user interface element that includes a thumbnail of the content item and an additional second section within the expanded version of the user interface element that is configured to capture alphanumeric content related to the content item;

identifying second input data indicating one or more alphanumeric characters entered in the additional second section; and generating a modified version of the content item for display in a third user interface, the modified version of the content item comprising the one or more alphanumeric characters overlaid on the user content.

18. The one or more non-transitory computer-readable storage media of claim 17, storing additional computer-readable instructions that, when executed by the one or more hardware processors, cause the one or more hardware processors to perform additional operations comprising:

generating an additional user interface that includes the user content and an additional user interface element that is selectable to cause display of the first user interface.

19. The one or more non-transitory computer-readable storage media of claim 17, storing additional computer-readable instructions that, when executed by the one or more hardware processors, cause the one or more hardware processors to perform additional operations comprising:

generating additional user interface data related to the content item, the additional user interface data being accessible to an additional user of the client application and the additional user interface data including the user content and at least a portion of the one or more alphanumeric characters, the at least a portion of the one or more alphanumeric characters indicating one or more classifications of the content item.

20. The one or more non-transitory computer-readable storage media of claim 19, wherein the additional user interface data corresponds to a truncated version of the content item, the truncated version of the content item including the user content, a portion of text content corresponding to the content item, and an additional user interface element that is selectable to display a full version of the content item.

* * * * *